United States Patent
Park et al.

(10) Patent No.: US 12,538,298 B2
(45) Date of Patent: Jan. 27, 2026

(54) METHOD AND APPARATUS FOR TRANSMITTING AND RECEIVING DATA IN WIRELESS COMMUNICATION SYSTEM

(71) Applicant: Samsung Electronics Co., Ltd., Gyeonggi-do (KR)

(72) Inventors: Sungjin Park, Gyeonggi-do (KR); Heedon Gha, Gyeonggi-do (KR); Jeongho Yeo, Gyeonggi-do (KR); Jinyoung Oh, Gyeonggi-do (KR); Suha Yoon, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 267 days.

(21) Appl. No.: 17/770,560

(22) PCT Filed: Oct. 22, 2020

(86) PCT No.: PCT/KR2020/014459
§ 371 (c)(1),
(2) Date: Apr. 20, 2022

(87) PCT Pub. No.: WO2021/080337
PCT Pub. Date: Apr. 29, 2021

(65) Prior Publication Data
US 2022/0295522 A1 Sep. 15, 2022

(30) Foreign Application Priority Data
Oct. 25, 2019 (KR) .......... 10-2019-0134119

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04L 5/0051* (2013.01); *H04W 72/23* (2023.01); *H04W 76/30* (2018.02)

(58) Field of Classification Search
CPC ............. H04W 72/1268; H04W 76/30; H04W 72/23; H04L 1/1812; H04L 5/0051
See application file for complete search history.

(56) References Cited

U.S. PATENT DOCUMENTS 9,203,457 B2   12/2015  Kim et al.
10,826,672 B2 * 11/2020 Kuang ................ H04L 27/2607
(Continued)

FOREIGN PATENT DOCUMENTS

KR   1020190043584   4/2019
KR   10-1984598      5/2019
(Continued)

OTHER PUBLICATIONS

European Search Report dated Oct. 10, 2022 issued in counterpart application No. 20879761.3-1213, 8 pages.
(Continued)

*Primary Examiner* — Michael J Moore, Jr.
(74) *Attorney, Agent, or Firm* — The Farrell Law Firm, P.C.

(57) ABSTRACT

A method performed by a terminal in a wireless communication system comprises receiving a physical downlink shared channel (PDSCH) or a physical downlink control channel (PDCCH) from a first serving cell among a plurality of serving cells configured for the terminal, the plurality of serving cells including the first serving cell and a second serving cell for transmitting a physical uplink control channel (PUCCH) or a physical uplink shared channel (PUSCH), in case that different processing capabilities are configured for each of the plurality of serving cells, determining a time
(Continued)

interval related to a timing at which the PUCCH or the PUSCH is transmitted in the second serving cell, from a last timing at which the PDSCH or the PDCCH is received in the first serving cell, and transmitting the PUCCH or the PUSCH to a base station, based on the determined time interval.

11 Claims, 29 Drawing Sheets

(51) Int. Cl.
  *H04L 5/00* (2006.01)
  *H04W 72/23* (2023.01)
  *H04W 76/30* (2018.01)

(56) References Cited

U.S. PATENT DOCUMENTS

| | | | |
|---|---|---|---|
| 11,336,396 | B2 | 5/2022 | Yang et al. |
| 2016/0134403 | A1* | 5/2016 | Xiong ............... H04W 72/0446 370/329 |
| 2017/0311173 | A1 | 10/2017 | Zhou |
| 2018/0324778 | A1* | 11/2018 | Farajidana ........ H04W 72/0446 |
| 2019/0116007 | A1* | 4/2019 | Yi ..................... H04W 72/0453 |
| 2019/0191429 | A1* | 6/2019 | Stern-Berkowitz ......................... H04W 72/542 |
| 2019/0230498 | A1 | 7/2019 | Lee et al. |
| 2020/0296673 | A1* | 9/2020 | Ouchi ................ H04W 52/325 |
| 2021/0037484 | A1* | 2/2021 | Zhou ................. H04W 52/325 |
| 2021/0119756 | A1* | 4/2021 | Takeda .............. H04W 72/1268 |
| 2021/0184804 | A1* | 6/2021 | Park ..................... H04L 1/1887 |
| 2022/0069965 | A1 | 3/2022 | Lee et al. |
| 2022/0295522 | A1* | 9/2022 | Park ..................... H04W 76/30 |
| 2023/0328737 | A1* | 10/2023 | Chen ..................... H04L 5/1469 370/329 |

FOREIGN PATENT DOCUMENTS

| | | |
|---|---|---|
| KR | 1020190108166 | 9/2019 |
| KR | 1020200012702 | 2/2020 |

OTHER PUBLICATIONS

Samsung, "Cross-slot Scheduling Power Saving Techniques", R1-1910498, 3GPP TSG RAN WG1 #98bis, Oct. 14-18, 2019, 11 pages.
Vivo, "Remaining Aspects of Cross-slot Scheduling Power Saving Techniques", R1-1910234, 3GPP TSG RAN WG1 #98bis, Oct. 14-20, 2019, 6 pages.
International Search Report dated Jan. 22, 2021 issued in counterpart application No. PCT/KR2020/014459, 13 pages.
European Search Report dated Jul. 29, 2024 issued in counterpart application No. 20879761.3-1206, 6 pages.
Huawei, HiSilicon, "Discussion on NR Timing Ambiguity", R1-1911264, 3GPP TSG RAN WG1 Meeting #98bis, Oct. 14-20, 2019, 12 pages.
Korean Office Action dated Feb. 17, 2025 issued in counterpart application No. 10-2019-0134119, 9 pages.

\* cited by examiner

METHOD AND APPARATUS FOR TRANSMITTING AND RECEIVING DATA IN WIRELESS COMMUNICATION SYSTEM

TECHNICAL FIELD

The present disclosure relates to a method and apparatus for transmitting and receiving data in a wireless communication system.

BACKGROUND ART

To meet the demand for wireless data traffic having increased since deployment of $4^{th}$ Generation (4G) communication systems, efforts have been made to develop an improved $5^{th}$ Generation (5G) or pre-5G communication system. For this reason, 5G or pre-5G communication system is also called 'Beyond 4G Network' or 'Post Long-Term Evolution (LTE) System'. The 5G communication system is considered to be implemented in ultra-high frequency (millimeter (mm)Wave) bands, (e.g., 60 gigahertz (GHz) bands), so as to accomplish higher data rates. In order to mitigate path loss of radio waves and increase a propagation distance of radio waves in an ultra-high frequency band, beamforming, massive multiple-input and multiple-output (MIMO), full-dimensional MIMO (FD-MIMO), array antenna, analog beamforming, and large-scale antenna technologies have been discussed in 5G communication systems. In addition, in order to improve a network of a 5G communication system, technologies such as evolved small cells, advanced small cells, cloud radio access networks (cloud RANs), ultra-dense networks, device-to-device (D2D) communication, wireless backhaul, moving networks, cooperative communication, Coordinated Multi-Points (CoMP), and interference cancelation, have been developed. In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet-of-Things (IoT) network that exchanges and processes information between distributed elements such as objects. Internet-of-Everything (IoE) technology in which a big data processing technology via a connection with a cloud server or the like is combined with the IoT technology has also emerged. In order to implement IoT, technical factors, such as sensing technology, wired/wireless communication, network infrastructure, service-interface technology, and security technology are required, and research on technologies, such as a sensor network, machine-to-machine (M2M) communication, machine-type communication (MTC), and the like for connection between objects has recently been conducted. In an IoT environment, via collection and analysis of data generated from connected objects, an intelligent internet technology (IT) service to create new value for peoples' lives may be provided. IoT may be applied to various fields, such as smart homes, smart buildings, smart cities, smart cars or connected cars, smart grids, health care, smart home appliances, or high-tech medical services, via the convergence and combination of existing information technologies and various industries.

Accordingly, various attempts are being made to apply 5G communication systems to IoT networks. For example, technologies such as a sensor network, M2M communication, and MTC are implemented by beamforming, MIMO, or array antenna schemes. The application of cloud RAN as the big data processing technology described above may be an example of convergence of 3eG communication technology and IoT technology.

As it is now possible to provide various services according to the development of wireless communication systems, there is a need for a method of seamlessly providing the services.

DESCRIPTION OF EMBODIMENTS

Technical Problem

Embodiments disclosed herein provide an apparatus and method for effectively providing a service in a mobile communication system.

BEST MODE

Figure 1:
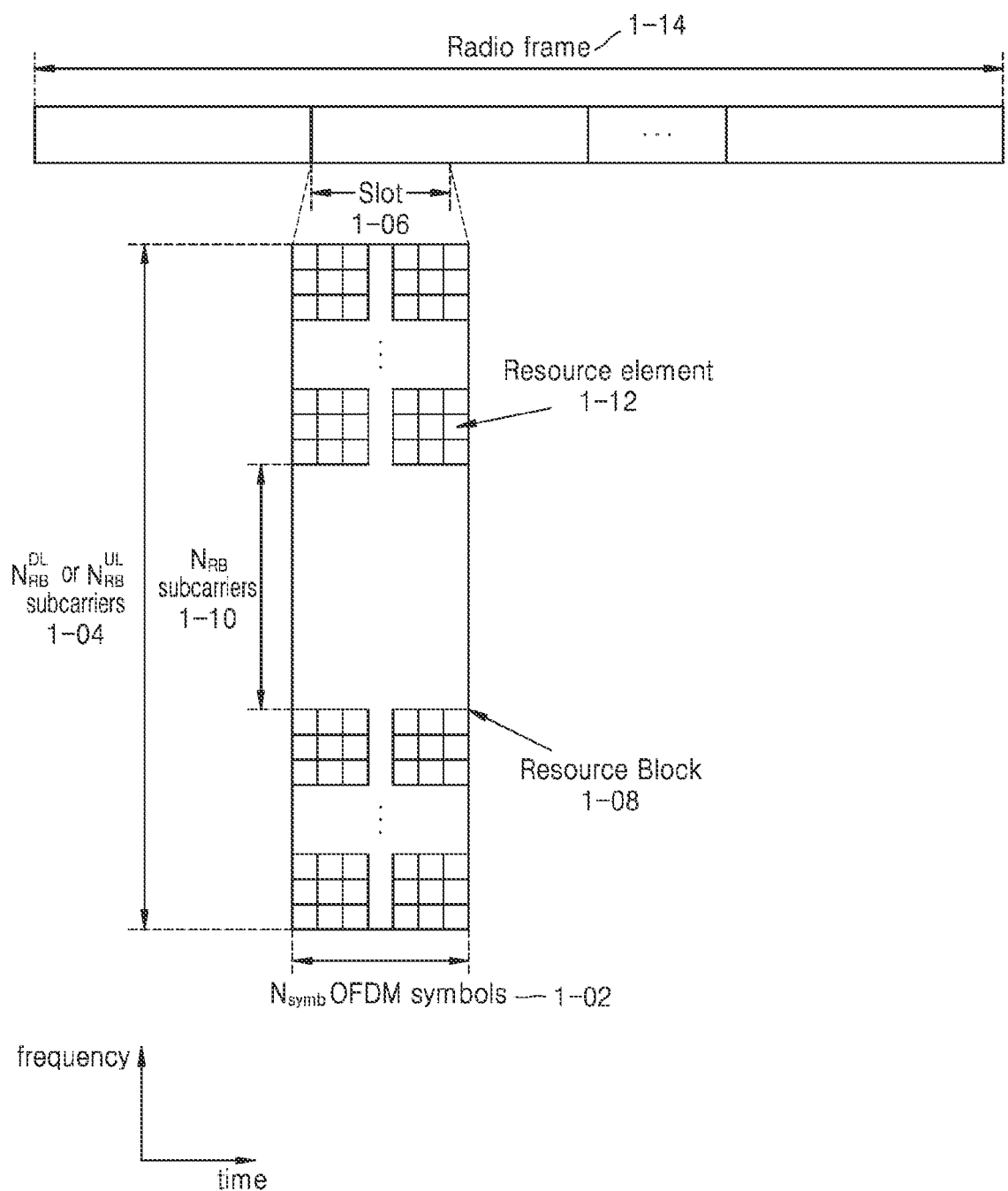
FIG. 1 is a diagram illustrating a basic structure of a time-frequency domain in a New Radio (NR) system, according to an embodiment of the present disclosure.

According to an embodiment of the present disclosure, a method performed by a terminal in a wireless communication system may comprise receiving, from a base station, a plurality of downlink control information (DCI) bits indicating uplink control information, arranging the plurality of DCI bits based on serving cell indices of the plurality of DCI bits and monitoring occasions of the plurality of DCI bits and determining a physical uplink control channel (PUCCH) resource for transmitting the uplink control information based on the arrangement result, and transmitting the uplink control information to the base station by using the determined PUCCH resource.

According to an embodiment of the present disclosure, a method performed by a terminal in a wireless communication system may comprise receiving a physical downlink shared channel (PDSCH) or a physical downlink control channel (PDCCH) from a first serving cell among a plurality of serving cells configured for the terminal, the plurality of serving cells including the first serving cell and a second serving cell for transmitting a physical uplink control channel (PUCCH) or a physical uplink shared channel (PUSCH), in case that different processing capabilities are configured for each of the plurality of serving cells, determining a time interval related to a timing at which the PUCCH or the PUSCH is transmitted in the second serving cell, from a last timing at which the PDSCH or the PDCCH is received in the first serving cell, and transmitting the PUCCH or the PUSCH to a base station, based on the determined time interval.

According to an embodiment of the present disclosure, a terminal in a wireless communication system may comprise a transceiver, and at least one processor configured to receive a physical downlink shared channel (PDSCH) or a physical downlink control channel (PDCCH) from a first serving cell among a plurality of serving cells configured for the terminal, the plurality of serving cells including the first serving cell and a second serving cell for transmitting a physical uplink control channel (PUCCH) or a physical uplink shared channel (PUSCH), in case that different processing capabilities are configured for each of the plurality of serving cells, determine a time interval related to a timing at which the PUCCH or the PUSCH is transmitted in the second serving cell, from a last timing at which the PDSCH or the PDCCH is received in the first serving cell, and transmit the PUCCH or the PUSCH to a base station by using the transceiver, based on the determined time interval.

MODE OF DISCLOSURE

To meet the demand for wireless data traffic having increased since deployment of $4^{th}$ Generation (4G) communication systems, efforts have been made to develop an improved $5^{th}$ Generation (5G) or pre-5G communication system. For this reason, 5G or pre-5G communication system is also called 'Beyond 4G Network' or 'Post Long-Term Evolution (LTE) System'. The 5G communication system defined by 3rd Generation Partnership Project (3GPP) is called a New Radio (NR) system. To achieve higher data transmission rates, implementation of a 5G communication system ultra-high frequency (millimeter (mm)Wave) bands, e.g., 60 GHz bands, as well as a band similar to a frequency used in existing 3G/4G networks has been considered. In order to mitigate path loss of radio waves and increase a propagation distance of radio waves in an ultra-high frequency band, beamforming, massive multiple-input and multiple-output (MIMO), full-dimensional MIMO (FD-MIMO), array antenna, analog beamforming, and large-scale antenna technologies have been discussed in 5G communication systems and have also been applied to NR systems. In addition, in order to improve a network of a 5G communication system, technologies such as evolved small cells, advanced small cells, cloud radio access networks (cloud RANs), ultra-dense networks, device-to-device (D2D) communication, wireless backhaul, moving networks, cooperative communication, Coordinated Multi-Points (CoMP), and interference cancelation, have been developed. In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet-of-Things (IoT) network that exchanges and processes information between distributed elements such as objects. Internet-of-Everything (IoE) technology in which a big data processing technology via a connection with a cloud server or the like is combined with the IoT technology has also emerged. In order to implement IoT, technical factors, such as sensing technology, wired/wireless communication, network infrastructure, service-interface technology, and security technology are required, and research on technologies, such as a sensor network, machine-to-machine (M2M) communication, machine-type communication (MTC), and the like for connection between objects has recently been conducted. In an IoT environment, via collection and analysis of data generated from connected objects, an intelligent internet technology (IT) service to create new value for peoples' lives may be provided. IoT may be applied to various fields, such as smart homes, smart buildings, smart cities, smart cars or connected cars, smart grids, health care, smart home appliances, or high-tech medical services, via the convergence and combination of existing information technologies and various industries.

Accordingly, various attempts are being made to apply 5G communication systems to IoT networks. For example, technologies such as a sensor network, M2M communication, and MTC are implemented by beamforming, MIMO, or array antenna schemes. The application of cloud RAN as the big data processing technology described above may be an example of convergence of 5G communication technology and IoT technology.

New radio (NR) access technology, which is new 5G communication, has been designed to allow various services to be freely multiplexed in time and frequency resources, and thus waveform/numerology, a reference signal, etc., may be dynamically or freely assigned according to the need of a service. In order to provide an optimal service to a terminal in wireless communication, data transmission optimized through measurement of the quality and interference of a channel is important, and thus accurate channel state measurement is mandatory. However, unlike 4G communication in which channel and interference characteristics do not largely change depending on frequency resources, the channel and interference characteristics of a 5G channel may significantly largely change depending on a service, and thus a subset of a frequency resource group (FRG) needs to be supported to divide and measure the channel and interference characteristics. Meanwhile, in an NR system, types of supported services may be divided into enhanced mobile broadband (eMBB), massive machine type communications (mMTC), ultra-reliable and low-latency communications (URLLC), etc. It may be understood that eMBB is a service aiming at high-speed transmission of a large amount of data, mMTC is a service aiming at terminal power minimization and multiple terminal connections, and URLLC is a service aiming at high reliability and low latency. Different requirements may be applied depending on types of services applied to a terminal.

Meanwhile, along with the recent on-going research on next-generation communication systems, various schemes for scheduling communication with a terminal have been discussed. Accordingly, there is a need for efficient scheduling and data transmission/reception schemes that consider characteristics of the next-generation communication systems.

As such, in a communication system, a plurality of services may be provided to a user, and to provide the plurality of services to the user, a method of providing each of the plurality of services in the same time period according to the characteristics and an apparatus using the method may be required.

Hereinafter, embodiments of the present disclosure are described in detail with reference to the accompanying drawings.

In the description of embodiments, technical features that are well known to the technical field to which the present disclosure belongs but are not directly associated with the present disclosure are not described. This is not to obscure but to clearly deliver the gist of the present disclosure by omitting an unnecessary description.

For the same reason, in the accompanying drawings, some elements are exaggerated, omitted, or schematically shown. In addition, sizes of elements do not fully reflect actual sizes thereof. Like reference numbers are used to refer to like elements through at the drawings.

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, rather, these embodiments are provided such that the present disclosure will be thorough and complete, and will fully convey the concept of the present disclosure to those of ordinary skill in the art, and the present disclosure will be defined only by the concept of the claims. Like reference numerals denote like elements throughout the specification.

Here, it could be understood that each block in processing flowchart drawings and combinations of flowchart drawings may be performed by computer program instructions. These computer program instructions may be loaded in a processor of a general-purpose computer, a particular-purpose computer, or other programmable data processing equipment, and thus, the instructions performed by a processor of a computer or other programmable data processing equipment may generate a means configured to perform functions described in flowchart block(s). These computer program instructions may also be stored in a computer-usable or computer-readable memory capable of orienting a computer or other programmable data processing equipment to implement a function in a particular mode, and thus, the instructions stored in the computer-usable or computer-readable memory may also produce a production item involving an instruction means configured to perform a function described in flowchart block(s). These computer program instructions may also be loaded in a computer or other programmable data processing equipment, and thus, a computer-executable process may also be generated by performing a series of operation steps on the computer or the other programmable data processing equipment so that the instructions executed in the computer or the other programmable data processing equipment provide steps for executing functions described in flowchart block(s).

In addition, each block may indicate a portion of a module, a segment, or a code including one or more executable instructions for executing particular logical function(s). Also, in several substitutional embodiments, functions described in blocks may also be out of a sequence. For example, two consecutively shown blocks may be substantially performed at the same time in fact, or the blocks may be sometimes performed in a reverse order according to a corresponding function.

The term ' . . . unit' used in the embodiments denotes a component including software or hardware, such as a field programmable gate array (FPGA) or an application-specific integrated circuit (ASIC), and the ' . . . unit' performs certain roles. However, the ' . . . unit' is not limited to software or hardware. The ' . . . unit' may be configured to be included in an addressable storage medium or to reproduce one or more processors. Therefore, for example, the ' . . . unit' includes components, such as software components, object-oriented software components, class components, and task components, processes, functions, attributes, procedures, subroutines, segments of program code, drivers, firmware, microcode, circuits, data, a database, data structures, Tables, arrays, and variables. A function provided inside components and ' . . . units' may be combined into a smaller number of components and ' . . . units' or be further divided into additional components and ' . . . units'. In addition, components and ' . . . units' may be implemented to reproduce one or more central processing units (CPUs) inside a device or a security multimedia card. Also, in an embodiment, the ' . . . unit' may include one or more processors.

Wireless communication systems have evolved from systems providing voice-oriented services to broadband wireless communication systems providing high-speed, high-quality packet data services of communication standards such as High Speed Packet Access (HSPA) of 3GPP, Long-Term Evolution (LTE) or Evolved Universal Terrestrial Radio Access (E-UTRA), LTE Advanced (LTE-A), High Rate Packet Data (HRPD) of 3GPP2, Ultra Mobile Broadband (UMB), and IEEE 802.16e. Also, as a 5G wireless communication system, the standards of 5G or New Radio (NR) are being created.

An NR system as a representative example of a broadband wireless communication system adopts orthogonal frequency division multiplexing (OFDM) in a downlink (DL) and an uplink (UL). In more detail, a cyclic-prefix OFDM (CP-OFDM) scheme is adopted in a DL, and a discrete Fourier transform spreading OFDM (DFT-S-OFDM) scheme is adopted in a UL together with the CP-OFDM scheme. A UL is a radio link through which a terminal (a user equipment (UE) or a mobile station (MS)) transmits data or a control signal to a base station (BS) (or a gNodeB), and a DL is a radio link through which a BS transmits data or a control signal to a terminal. In such a multiple access scheme, in general, data or control information of each user may be distinguished by assigning and operating time-frequency resources, at which the data or control information of each user is transmitted, so as not to overlap each other, i.e., to establish orthogonality.

The NR system adopts a hybrid automatic repeat request (HARQ) scheme that, when a failure of decoding occurs in initial transmission, retransmits corresponding data in a physical layer. In the HARQ scheme, when a receiver fails to correctly decode data, the receiver transmits, to a transmitter, a negative acknowledgement (NACK), which is information for informing the transmitter of the failure of decoding, so as to allow the transmitter to retransmit corresponding data in a physical layer. The receiver may improve data reception performance by combining the data retransmitted by the transmitter with the decoding-failed data. In addition, when the receiver correctly decodes the data, the receiver transmits, to the transmitter, an acknowledgement (ACK) for informing the transmitter of the success of decoding, so as to allow the transmitter to transmit new data.

The present disclosure relates to a method of determining a processing time of a terminal in a wireless mobile communication system.

A method, performed by a terminal, of transmitting and receiving data according to the present disclosure may include receiving, by the terminal, a plurality of cells from a BS, determining, by the BS and the terminal, when their processing time capability values set for each cell are different from each other, the processing time capability values to be equal to each other, and performing, by the BS and the terminal, transmission and reception of a first signal (a DL channel) and a second signal (a UL channel) based on the determined processing time capability value.

FIG. 1 is a diagram illustrating a basic structure of a time-frequency domain in an NR system, according to an embodiment of the present disclosure. In more detail, FIG. 1 illustrates a basic structure of a time-frequency domain that is a radio resource region in which the data or a control channel is transmitted in a DL or an UL in an NR system to which an embodiment of the present disclosure is applied.

In FIG. 1, a horizontal axis represents a time domain, and a vertical axis represents a frequency domain. Referring to FIG. 1, a minimum transmission unit in the time domain may be an OFDM symbol, and $N_{symb}$ OFDM symbols 1-02 may constitute one slot 102. The length of a subframe may be defined as 1.0 ms, and the length of a radio frame 1-14 may be defined as 10 ms. A minimum transmission unit in the frequency domain may be a subcarrier, and a bandwidth of an entire system transmission bandwidth may include a total of $N_{BW}$ subcarriers 1-04.

A basic unit of resources in the time-frequency domain may be a resource element (RE) 1-12 and may be represented by an OFDM symbol index and a subcarrier index. A resource block (RB)(or a physical resource block (PRB)) 1-08 may be defined by $N_{symb}$ consecutive OFDM symbols 1-02 in the time domain and $N_{RB}$ consecutive subcarriers 1-10 in the frequency domain. Accordingly, one RB 1-08 may include $N_{symb} \times N_{RB}$ REs 1-12. In general, a minimum transmission unit of data may be the aforementioned RB unit. In the NR system, in general, $N_{symb}=14$ and $N_{RB}=12$, and $N_{BW}$ and $N_{RB}$ may be proportional to a bandwidth of the system transmission band. A data rate may increase in proportion to the number of RBs scheduled for a terminal.

In the NR system, in a case of a frequency-division duplex (FDD) system that differentiates and operates a DL and a UL by frequency, the DL transmission bandwidth may differ from the UL transmission bandwidth. A channel bandwidth refers to a radio frequency (RF) bandwidth corresponding to the system transmission bandwidth. Tables 1 and 2 indicate a part of a correspondence relationship among a system transmission bandwidth, a subcarrier spacing, and a channel bandwidth, defined in an NR system in a frequency band less than 6 GHz and in a frequency band greater than 6 GHz, respectively. For example, in an NR system having a 100 MHz channel bandwidth with a 30 kHz subcarrier spacing, a transmission bandwidth may include 273 RBs. In Tables 1 and 2, 'N/A' refers to a combination of a bandwidth and a subcarrier, which is not supported in the NR system.

TABLE 1

| | Channel bandwidth BW$_{Channel}$ [MHz] | | | | | |
|---|---|---|---|---|---|---|
| Subcarrier spacing | 5 MHz | 10 MHz | 20 MHz | 50 MHz | 80 MHz | 100 MHz |
| Transmission bandwidth configuration N$_{RB}$ 15 kHz | 25 | 52 | 106 | 270 | N/A | N/A |
| 30 kHz | 11 | 24 | 51 | 133 | 217 | 273 |
| 60 kHz | N/A | 11 | 24 | 65 | 107 | 135 |

TABLE 2

| | Channel bandwidth BW$_{Channel}$ [MHz] | | | |
|---|---|---|---|---|
| Subcarrier spacing | 50 MHz | 100 MHz | 200 MHz | 400 MHz |
| Transmission bandwidth configuration N$_{RB}$ 60 kHz | 66 | 132 | 264 | N/A |
| 120 kHz | 32 | 66 | 132 | 264 |

In the NR system according to an embodiment, a frequency range (FR) may be defined separately for FR1 and FR2 as follows.

TABLE 3

| Frequency range designation | Corresponding frequency range |
|---|---|
| FR1 | 450 MHz-7125 MHz |
| FR2 | 24250 MHz-52600 MHz |

In the aforementioned embodiment, the ranges of FR1 and FR2 may be differently changed and applied. For example, the frequency range of FR1 may be changed to '450 MHz to 6000 MHz' and applied.

In the NR system, scheduling information regarding DL data or UL data may be transmitted from the BS to the terminal via downlink control information (DCI). The DCI may be defined in various formats, each of which may indicate whether the DCI is scheduling information about uplink data (i.e., an uplink grant) or scheduling information about downlink data (i.e., a downlink grant), whether the DCI is compact DCI having small-size control information, whether spatial multiplexing using a multiplexing antenna is applied, whether the DCI is for controlling power, or the like. For example, DCI format 1-1, which is scheduling control information about DL data (i.e., a DL grant), may include one of the following control information.

Carrier indicator: indicates the frequency carrier on which data is transmitted.
  DCI format indicator: indicates whether the DCI is for a DL or a UL.
  Bandwidth part (BWP) indicator: indicates a BWP in which transmission is performed.
  Frequency-domain resource assignment: indicates an RB of a frequency domain, which is assigned for data transmission. A resource to be expressed is determined according to a system bandwidth and a resource assignment scheme.
  Time-domain resource assignment: indicates a slot and an OFDM symbol of the slot, in which a data-related channel is to be transmitted.
  VRB-to-PRB mapping: indicates a mapping scheme by which a virtual RB (VRB) index is mapped to a physical RB (PRB) index.
  Modulation and coding scheme (MCS): indicates a modulation scheme and a coding rate used for data transmission. That is, this may indicate information regarding whether the modulation scheme is quadrature phase shift keying (QPSK), 16QAM, 64QAM, or 256QAM, together with a coding rate value indicating a transport block size (TBS) and channel coding information.
  Code-block group (CBG) transmission information: indicates information about a CBG to be transmitted when CBG retransmission is configured.
  HARQ process number: indicates a process number of HARQ.
  New data indicator (NDI): indicates whether HARQ transmission is initial transmission or retransmission.
  Redundancy version: indicates the redundancy version of HARQ.
  Transmit power control (TPC) command for physical uplink control channel (PUCCH): indicates a TPC command for the PUCCH serving as a UL control channel.

In PUSCH transmission, time domain resource assignment may be transmitted through information about a slot in which the PUSCH is transmitted, a start symbol position S in the slot, and a number L of symbols to which the PUSCH is mapped. Here, S may denote a relative position from the start of the slot, L may denote the number of consecutive symbols, and S and L may be determined based on a start and length indicator value (SLIV) defined as follows.

if $(L-1) \le 7$ then SLIV=$14 \cdot (L-1)+S$ else SLIV=$14 \cdot (14-L+1)+(14-1-S)$ where $0 < L \le 14-S$ In the NR system according to an embodiment, Table including, in one row, an SLIV, a physical downlink shared channel (PDSCH) or PUSCH mapping type, and information about a slot in which a PDSCH or PUSCH is to be transmitted may be generally configured through radio resource control (RRC) configuration. Thereafter, in the time domain resource assignment of the DCI, by indicating an index value of configured Table, the BS may transmit, to the terminal, an SLIV, a PDSCH or PUSCH mapping type, and information about a slot in which a PDSCH or PUSCH is to be transmitted.

In the NR system according to an embodiment, type A and type B may be defined as PUSCH mapping types. In PUSCH mapping type A, the first symbol of demodulation reference signal (DMRS) symbols may be located in the second or third OFDM symbol of a slot. In PUSCH mapping type B, the first symbol of DMRS symbols may be located in the first OFDM symbol in a time domain resource assigned for PUSCH transmission.

Meanwhile, in the NR system according to an embodiment, type A and type B may be defined as PDSCH mapping types. In this case, the first symbol of DMRS symbols may be located in the first symbol of the PDSCH.

Tables 4 and 5 show combinations of S and L supported in respective PDSCH and PUSCH types.

TABLE 4

| PDSCH | Normal cyclic prefix | | | Extended cyclic prefix | | |
|---|---|---|---|---|---|---|
| mapping type | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note 1:
S = 3 is applicable only if dmrs-TypeA-Position = 3

TABLE 5

| PUSCH | Normal cyclic prefix | | | Extended cyclic prefix | | |
|---|---|---|---|---|---|---|
| mapping type | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 12} | {1, . . . , 12} | {1, . . . , 12} |

The DCI may be transmitted on a physical downlink control channel (PDCCH)(or control information, hereinafter used interchangeably) through channel coding and modulation.

In general, the DCI is scrambled with a certain radio network temporary identifier (RNTI) (or a terminal identifier) independently for each terminal, is appended with a cyclic redundancy check (CRC), is channel-coded, is then configured as an independent PDCCH, and is then transmitted. The PDCCH may be mapped and transmitted in a control resource set (CORESET) configured for the terminal.

The DL data may be transmitted via a PDSCH, which is a physical channel for DL data transmission. The PDSCH may be transmitted after a control channel transmission period, and scheduling information, such as a detailed mapping position in a frequency domain or a modulation scheme, may be determined based on the DCI transmitted via the PDCCH.

Through an MCS in the control information constituting the DCI, the BS may notify the terminal of a modulation scheme applied to the PDSCH to be transmitted to the terminal and the size of data to be transmitted (e.g., a TBS). In an embodiment, the MCS may be composed of 5 bits, greater than 5 bit, or less than 5 bits. In an embodiment, the TBS may correspond to a size before channel coding for error correction is applied to data (i.e., a transport block (TB)) to be transmitted by the BS.

In the present embodiment, a TB may include a medium access control (MAC) header, a MAC control element (CE), one or more MAC service data units (SDUs), and padding bits. In another example, the TB may indicate a data unit or a MAC protocol data unit (PDU) transmitted from a MAC layer to a physical layer.

Modulation schemes supported in the NR system according to an embodiment may be QPSK, 16QAM, 64QAM, and 256QAM, and their modulation orders (Qm) may correspond to 2, 4, 6, and 8, respectively. That is, 2 bits per symbol may be transmitted for QPSK, 4 bits per symbol may be transmitted for 16QAM, 6 bits per symbol may be transmitted for 64QAM, and 8 bits per symbol may be transmitted for 256 QAM.

Figure 2:
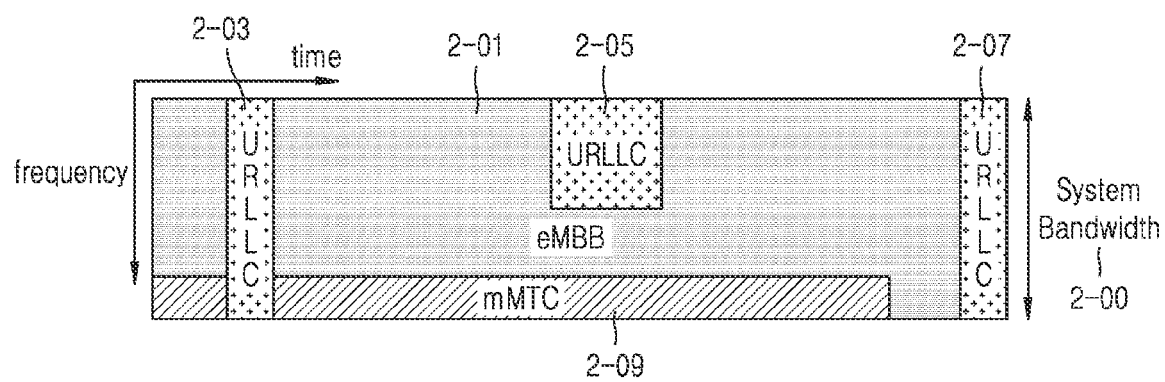
FIG. 2 is a diagram illustrating a case in which data for each enhanced mobile broadband (eMBB), ultra-reliable and low-latency communications (URLLC), and massive machine type communications (mMTC) is assigned in an entire system frequency band, according to an embodiment of the present disclosure.
Figure 3:
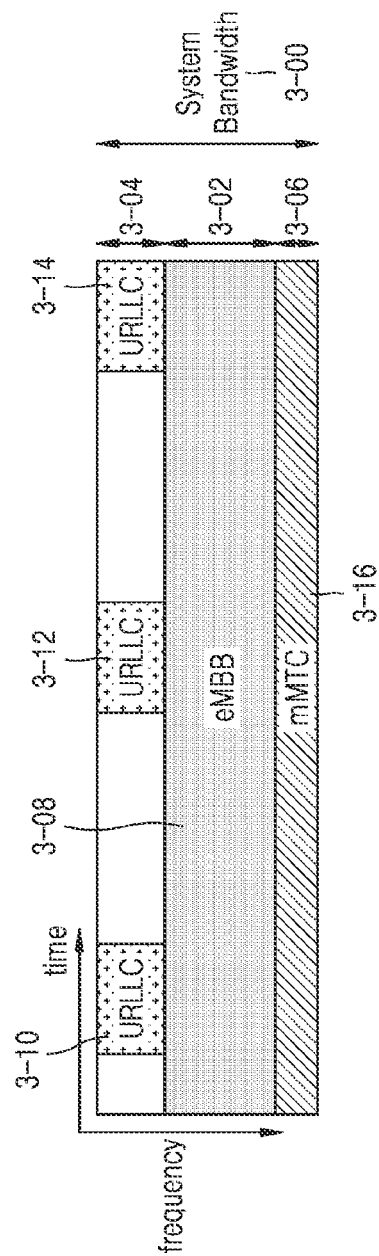
FIG. 3 is a diagram illustrating a method of transmitting a service and data in sub-bands into which an entire system frequency band is divided, according to an embodiment of the present disclosure.

FIGS. 2 and 3 are diagrams each illustrating a state in which data for eMBB, URLLC, and mMTC, which are services considered in a 5G or NR system, is assigned in frequency-time resources, according to an embodiment.

A scheme will be described in which frequency and time resources are assigned for information transmission in each system, with reference to FIGS. 2 and 3.

FIG. 2 is a diagram illustrating a case in which data for each eMBB, URLLC, and mMTC is assigned in an entire system frequency band, according to an embodiment of the present disclosure.

Referring to FIG. 2, when URLLC data 2-03, 2-05, and 2-07 is generated while eMBB data 2-01 and mMTC data 2-09 are assigned to certain frequency bands and transmitted, and thus, transmission of the URLLC data 2-03, 2-05, and 2-07 is required, a BS or a terminal may transmit the URLLC data 2-03, 2-05, and 2-07 without emptying portions already assigned for the eMBB data 2-01 and the mMTC data 2-09 or without transmitting the eMIBB data 2-01 and the mMTC data 2-09. Because URLLC, among the aforementioned services, requires reduction of latency, resources for transmitting the URLLC data 2-03, 2-05, and 2-07 may be assigned to overlap a portion of the resources assigned to the eMBB data 2-01. Naturally, when the URLLC data 2-03, 2-05, and 2-07 is additionally assigned and transmitted by using the resources to which the eMBB data 2-01 is assigned, the eMBB data may not be transmitted in the overlapping frequency-time resources, and thus, the performance of transmission of the eMBB data may be lowered. That is, in this case, transmission of the eMBB data may fail due to the assignment of resources for the URLLC data.

FIG. 3 is a diagram illustrating a method of transmitting a service and data in respective sub-bands into which an entire system frequency band is divided, according to an embodiment of the present disclosure. Sub-band configuration-related information according to an embodiment may be previously determined and may be transmitted from a BS to a terminal through higher layer signaling. In another example, a BS or a network node may arbitrarily divide sub-band-related information, and provide a terminal with services without transmitting separate sub-band configuration information. In FIG. 3, as an example, it is assumed that a sub-band 3-02 is used for transmission of eMBB data 3-08, a sub-band 3-04 is used for transmission of URLLC data 3-10, 3-12, and 3-14, and a sub-band 3-06 is used for transmission of mMTC data 3-16.

In various embodiments, the length of a transmission time interval (TTI) used for transmission of URLLC data may be less than the length of a TTI used for transmission of eMBB data or mMTC data. In addition, a response to URLLC data-related information may be transmitted faster than a response to eMBB data- or mMTC data-related information, and accordingly, information may be transmitted and received with low latency. Respective physical layer channels used for transmitting the aforementioned three types of services or data may have different structures. For example, the physical layer channels may differ in at least one of the length of a TTI, a frequency resource assignment unit, the structure of a control channel, or a method of mapping data.

Although three types of services and three types of data are described above, it would be sufficiently understood by those of ordinary skill in the art that more types of services and corresponding data may exist and the present disclosure is applicable to this case.

To describe a method and an apparatus proposed in the present disclosure, the terms 'physical channel' and 'signal' in an NR system may be used. However, the present disclosure is applicable to other wireless communication systems as well as the NR system.

Figure 4:
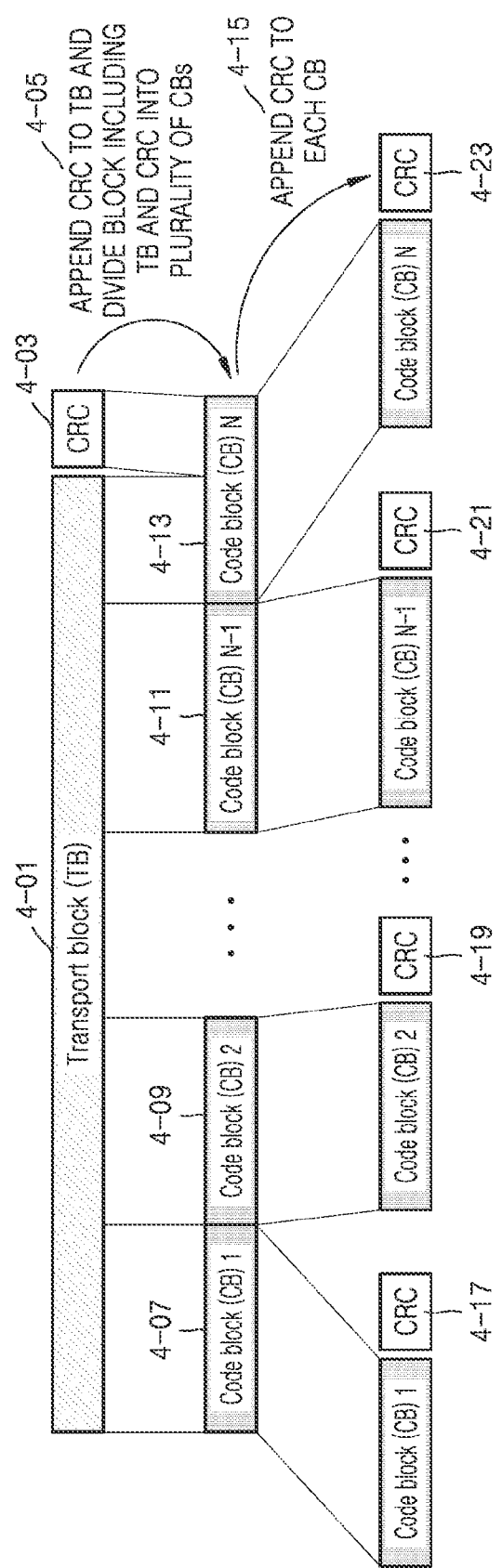
FIG. 4 illustrates a diagram for describing a process in which one transport block is divided into several code blocks and cyclic redundancy checks (CRCs) are appended thereto.

FIG. 4 illustrates a diagram for describing a process in which one TB is divided into several code blocks and CRCs are appended thereto.

Referring to FIG. 4, a CRC 4-03 may be appended to the last or first portion of one TB 4-01 to be transmitted in a UL or a DL. The CRC 4-03 may have 16 bits, 24 bits, or a previously fixed number of bits, or may have a variable number of bits depending on a channel code, etc., and may be used to determine whether channel coding is successful.

In operation 4-05, a block including the TB 4-01 and the CRC 4-03 appended thereto may be divided into several code blocks (CBs) 4-07, 4-09, 4-11, and 4-13. The maximum size of the CB may be previously determined, and in this case, the last CB 4-13 may be smaller in size than the other CBs or may be padded with 0, a random value, or 1 to have the same length as that of the other CBs.

In operation 4-15, CRCs 417, 419, 421, and 423 may be appended to the CBs, respectively. The CRC described above may have 16 bits, 24 bits, or a previously fixed number of bits, and may be used to determine whether channel coding is successful.

The TB 4-01 and a cyclic generator polynomial may be used to generate the CRC 4-03, and the cyclic generator polynomial may be defined in various ways. For example, assuming that a cyclic generator polynomial for a 24-bit CRC is $g_{CRC24A}(D)=[D^{24}+D^{23}+D^{18}+D^{17}+D^{14}+D^{11}+D^{10}+D^{7}+D^{6}+D^{5}+D^{4}+D^{3}+D+1]$ and L=24, a CRC $p_0, p_1, p_2, p_3, \ldots, p_{L-1}$ may be determined, with respect to TB data $a_0, a_1, a_2, a_3, \ldots, a_{A-1}$, to be a value obtained by dividing $a_0 D^{A+23}+a_1 D^{A+22}+ \ldots +a_{A-1}D^{24}+p_0 D^{23}+p_1 D^{22}+ \ldots +p_{22}D^{1}+p_{23}$ by $g_{CRC24A}(D)$ with a remainder of 0. Although the CRC length L is 24 in the description of the above embodiment, the length may be defined variously, e.g., 12, 16, 24, 32, 40, 48, 64, etc.

As described above, in operation 4-05, a transmitter may append a CRC to a TB through the above-described process and then divide the result into N CBs 4-07, 4-09, 4-11, and 4-13. In addition, in operation 4-15, the CRCs 417, 419, 421, and 423 may be appended to the CBs 4-07, 4-09, 4-11, and 4-13, respectively. For a CRC to be appended to a CB, a CRC of a length different from that of a CRC to be appended to a TB, or a cyclic generator polynomial other than that used for generating a CRC to be appended to a TB may be used. However, the CRC 4-03 appended to the TB and the CRCs 417, 419, 421, and 423 appended to the CBs may be omitted depending on the type of a channel code to be applied to the CBs. For example, when a low-density parity-check (LDPC) code, rather than a turbo code, is applied to the CBs, the CRCs 417, 419, 421, and 423 to be appended to respective CBs may be omitted. However, even when LDPC is applied, the CRCs 417, 419, 421, and 423 may be appended to the CBs. Also, even when a polar code is used, the CRCs may be appended or omitted.

As described with reference to FIG. 4, for a TB to be transmitted, the maximum length of one CB may be determined according to the type of channel coding applied thereto. In addition, the TB and the CRC appended to the TB may be divided into CBs according to the maximum length of the CB.

Meanwhile, in an LTE system in the related art, a CRC for a CB is appended to a CB, a data bit and the CRC of the CB are encoded with a channel code to determine coded bits, and, for each of the coded bits, the number of bits to be rate-matched is determined as agreed upon in advance.

Figure 5:
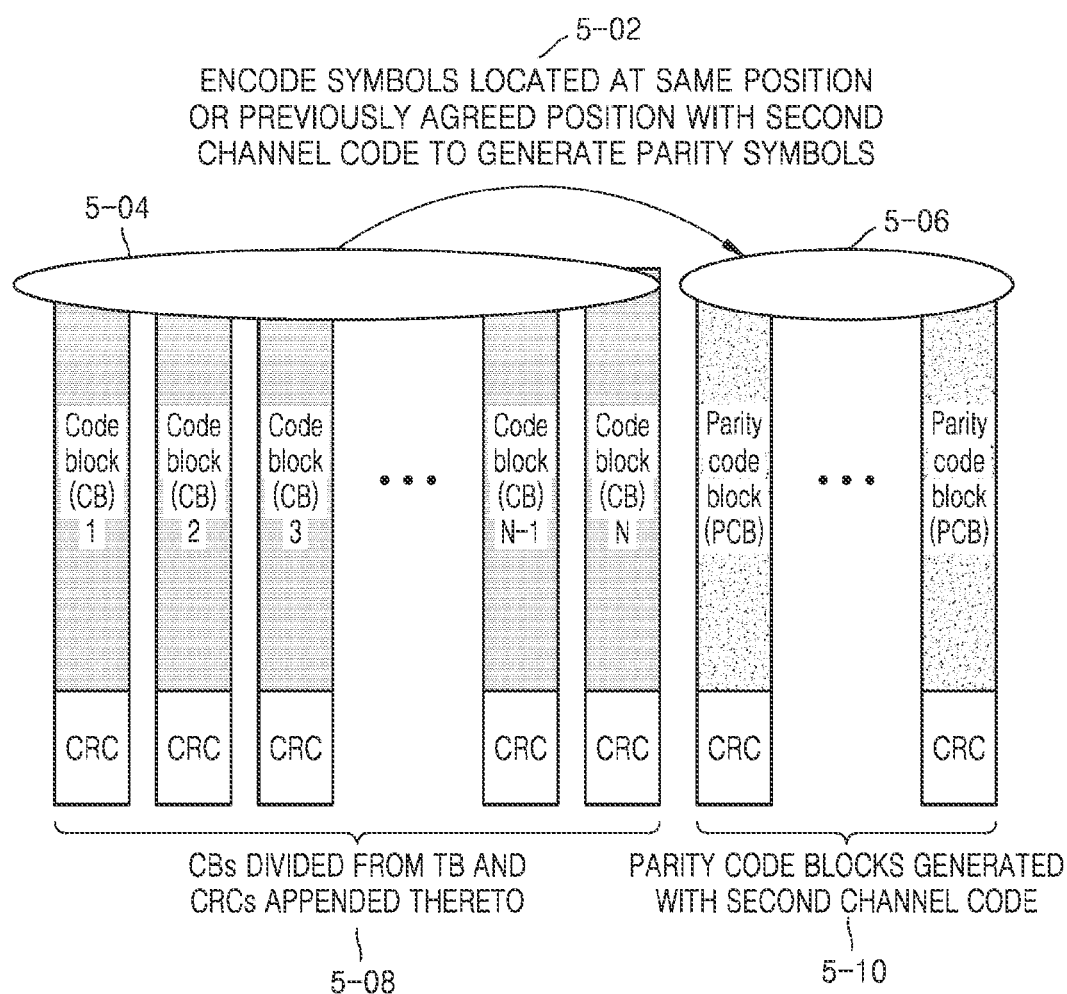
FIG. 5 is a diagram for describing a scheme in which an outer code is used for transmission, according to an embodiment of the present disclosure.
Figure 6:
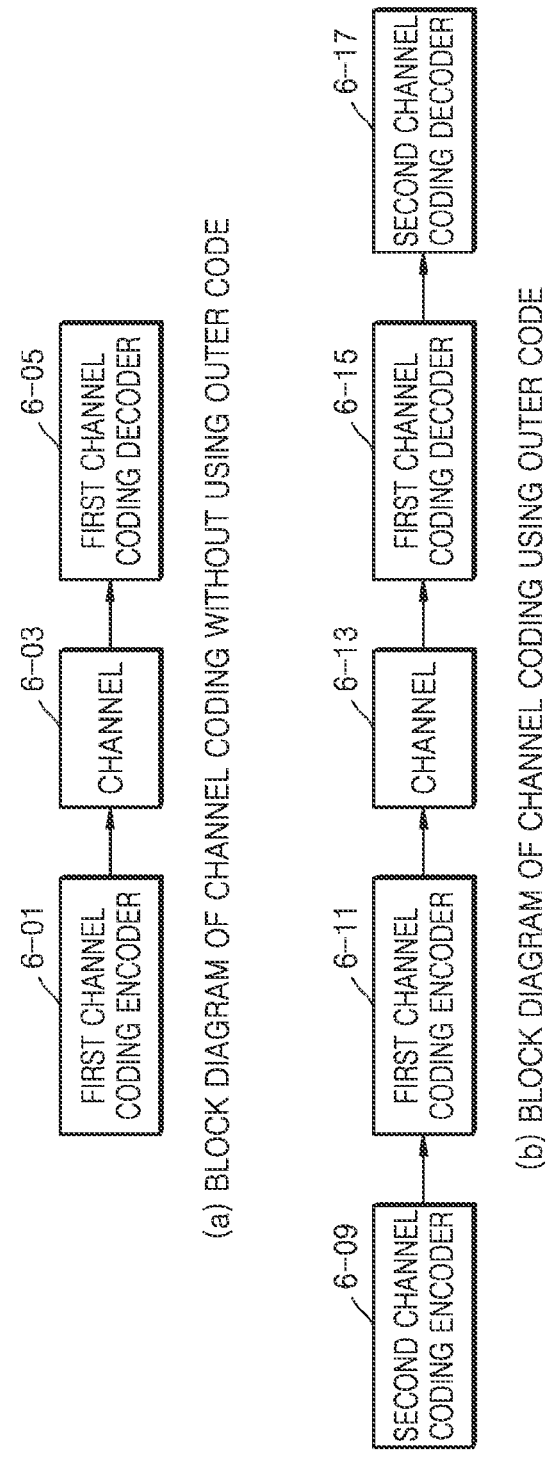
FIG. 6 is a block diagram for describing a structure of a communication system using an outer code, according to an embodiment of the present disclosure.

FIG. 5 is a diagram for describing a scheme in which an outer code is used for transmission, according to an embodiment of the present disclosure. FIG. 6 is a block diagram of a structure of a communication system using an outer code, according to an embodiment of the present disclosure. A method of transmitting a signal by using an outer code will be described with reference to FIGS. 5 and 6.

Referring to FIG. 5, in operation 5-02, after one TB is divided into several CBs, bits or symbols 5-04 located at the same position in the respective CBs may be encoded with a second channel code to generate parity bits or symbols 5-06. Thereafter, CRCs may be appended respectively to the CBs and parity CBs, which are generated by the second channel code encoding (5-08 and 5-10).

Whether to append CRCs may be determined according to the type of the channel code. For example, when a turbo code is used as a first channel code, the CRCs 5-08 and 5-10 may be appended, however, thereafter, each CB and each parity CB may be encoded with the first channel code. In the present disclosure, a convolutional code, an LDPC code, a turbo code, a polar code, and the like may be used as the first channel code. However, this is merely an example, and various channel codes may be applied to the present disclosure as the first channel code. In the present disclosure, for example, a Reed-Solomon code, a Bose-Chaudhuri-Hocquenghem (BCH) code, a Raptor code, a parity bit generation code, and the like may be used as the second channel code. However, this is merely an example, and various channel codes may be applied to the present disclosure as the second channel code.

FIG. 6 is a block diagram for describing a structure of a communication system using an outer code, according to an embodiment of the present disclosure. Referring to FIG. 6, in (a), when an outer code is not used, only a first channel coding encoder 6-01 and a first channel coding decoder 6-05 are used in a transceiver, and a second channel coding encoder and a second channel coding decoder may not be used. On the other hand, even when an outer code is not used, the first channel coding encoder 6-01 and the first channel coding decoder 6-05 may be configured in the same manner as when an outer code, which will be described below, is used.

Referring to FIG. 6, in (b), when an outer code is used, data to be transmitted may pass through a second channel coding encoder 6-09. Bits or symbols having passed through the second channel coding encoder 6-09 may pass through a first channel coding encoder 6-11. When channel-coded symbols pass through the channel 6-13 and are then received by a receiver, the receiver may sequentially operate a first channel coding decoder 6-15 and a second channel coding decoder 6-17 based on a received signal. The first channel coding decoder 6-15 and the second channel coding decoder 6-17 may perform operations corresponding to those of the first channel coding encoder 6-11 and the second channel coding encoder 6-09, respectively.

Figure 7:
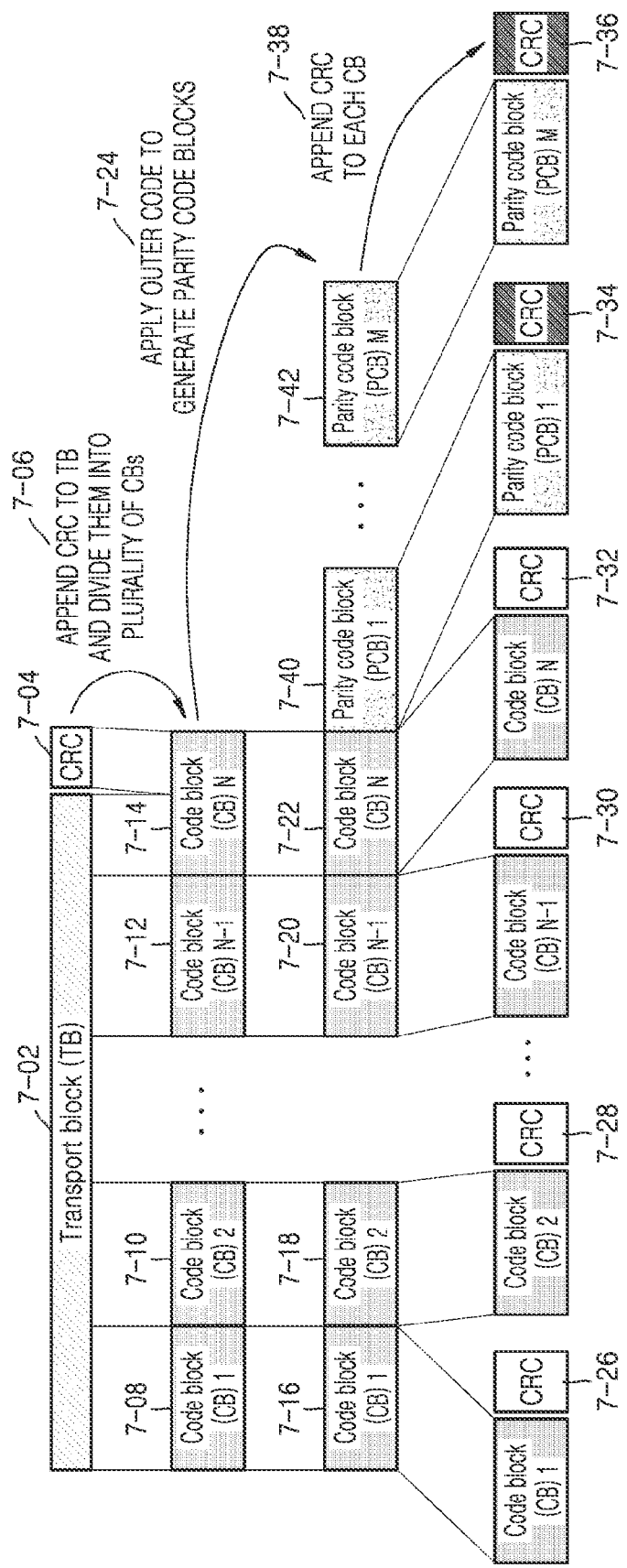
FIG. 7 is a diagram for describing a method of generating parity code blocks with respect to a transport block, according to an embodiment of the present disclosure.

FIG. 7 is a diagram for describing a method of generating parity CBs with respect to a TB, according to an embodiment of the present disclosure. In more detail, FIG. 7 is a diagram for describing a method of generating one or more parity CBs by applying a second channel code or an outer code to several CBs divided from one TB, according to an embodiment.

As described with reference to FIG. 4, one TB may be divided into one or more CBs. In this case, when only one CB is generated according to the size of the TB, a CRC may not be appended to the corresponding CB. When an outer code is applied to CBs to be transmitted, parity CBs 7-40 and 7-42 may be generated as described with reference to operation 7-24. When using the outer code, the parity CBs 7-40 and 7-42 may be located after the last CB.

In operation 7-38, after the outer code, CRCs 7-26, 7-28, 7-30, 7-32, 7-34, and 7-36 may be appended. Thereafter, each CB and parity CB may be encoded with a channel code together with the CRC.

In an NR system, the size of a TB may be calculated through the following operations.

Operation 1: $N'_{RE}$, which is the number of REs assigned to PDSCH mapping in one PRB in the assigned resource, may be calculated.

$N'_{RE}$ may be calculated according to $N'_{RE} = N_{sc}^{RB} \cdot N_{symb}^{sh} - N_{DMRS}^{PRB} - N_{oh}^{PRB}$. Here, $N_{sc}^{RB}$ may be 12, and $N_{symb}^{sh}$ may denote the number of OFDM symbols assigned to a PDSCH. $N_{DMRS}^{PRB}$ denotes the number of REs in one PRB occupied by DMRSs of the same CDM group. $N_{oh}^{PRB}$ is the number of REs occupied by the overhead in one PRB, which is configured via higher layer signaling, and may be configured to be one of 0, 6, 12, and 18. Thereafter, $N_{RE}>>$, which is the total number of REs assigned to the PDSCH, may be calculated. $N_{RE}$ may be calculated according to $N_{RE} = \min(156, N'_{RE}) \cdot n_{PRB}$, and $n_{PRB}$ may denote the number of PRBs assigned to a terminal.

Operation 2: $N_{info}$, which is the number of temporary information bits, may be calculated according to $N_{info} = N_{RE} \cdot R \cdot Q_m \cdot v$. Here, R denotes a code rate, $Q_m$ denotes a modulation order, and information about this value may be transmitted by using an MCS bit field and previously agreed Table in control information. In addition, v denotes the number of assigned layers. If $N_{info} \leq 3824$, the TBS may be calculated through operation 3 below. Otherwise, the TBS may be calculated through operation 4.

Operation 3: $N'_{info}$ may be calculated according to $$N'_{info} = \max\left(24, 2^n \cdot \left\lfloor \frac{N_{info}}{2^n} \right\rfloor\right)$$

and $n = \max(3, \lfloor \log_2(N_{info}) \rfloor - 6)$. The TBS may be determined to be a value closest to $N'_{info}$ among values not less than $N'_{info}$ in Table 6 below.

TABLE 6

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |

TABLE 6-continued

| Index | TBS |
|---|---|
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Operation 4: $N'_{info}$ may be calculated according to $$N'_{info} = \max\left(3840, 2^n \times \text{round}\left(\frac{N_{info} - 24}{2^n}\right)\right)$$

and $n = \lfloor \log_2(N_{info} - 24) \rfloor - 5$. The TBS may be determined by using a value of $N'_{info}$ and Pseudo-code 1 below.

```
[Start Pseudo-code 1]
if R ≤ 1/4
        TBS = 8 * C * ⌈(N'_{info} + 24) / (8 * C)⌉ − 24, where C
              = ⌈(N'_{info} + 24) / 3816⌉
else
    if NP'_{info} > 8424
        TBS = 8 * C * ⌈(N'_{info} + 24) / (8 * C)⌉ − 24, where C
              = ⌈(N'_{info} + 24) / 8424⌉
    else
            TBS = 8 * ⌈(N'_{info} + 24)/8⌉ − 24
    end if
end if
[End Pseudo-code 1]
```

In the NR system, when one CB is input to an LDPC encoder, the CB may be output with parity bits added thereto. In this case, the amount of the parity bits may vary according to an LDPC base graph. A method of transmitting all parity bits generated by LDPC coding for a certain input may be referred to as full buffer rate matching (FBRM). In addition, a method of limiting the number of transmittable parity bits may be referred to as limited buffer rate matching (LBRM). When resources are assigned for data transmission, an output of the LDPC encoder may be generated as a circular buffer, and bits of the generated buffer may be repeatedly transmitted to the extent of the assigned resources. In this case, the length of the circular buffer may be denoted by $N_{cb}$. When the number of all parity bits generated by the LDPC coding is N, $N_{cb}=N$ may be satisfied in an FBRM method. Meanwhile, in an LBRM method, $N_{cb}=\min(N, N_{ref})$ may be satisfied, $N_{ref}$ may satisfy $$N_{ref} = \left\lfloor \frac{TBS_{LBRM}}{C \cdot R_{LBRM}} \right\rfloor,$$

and $R_{LBRM}$ may be determined to be 2/3. $TBS_{LBRM}$ may denote the maximum number of layers supported by a terminal in the corresponding cell, in the method of obtaining a TBS described above. Here, the maximum modulation order configured for the terminal in the corresponding cell may be assumed, or 64QAM may be assumed when the maximum modulation order is not configured, and the code rate may be assumed to be 948/1024 that is the maximum code rate, $N_{RE}$ may be assumed to satisfy, $N_{RE}=156 \cdot n_{PRB}$, and $n_{PRB}$ may be assumed to satisfy $n_{PRB}=n_{PRB,LBRM}$, values of which may be given as in Table 7 below.

TABLE 7

| Maximum number of PRBs across all configured BWPs of a carrier | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In the NR system, the maximum data rate supported by the terminal may be determined according to Equation 1 below.

[Equation 1]

$$\text{data rate (in Mbps)} = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)}) \right)$$

In Equation 1, J may denote the number of carriers grouped by carrier aggregation, $R_{max}=948/1024$, $v_{Layers}^{(j)}$ may denote the maximum number of layers, $Q_m^{(j)}$ may denote the maximum modulation order, $f^{(j)}$ may denote a scaling factor, and μ may denote a subcarrier spacing. $f^{(j)}$ may be one of 1, 0.8, 0.75, and 0.4, which may be reported by the terminal, and μ may be given as in Table 8 below.

TABLE 8

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In addition, $T_s^\mu$ denotes an average OFDM symbol length, $T_s^\mu$ may be calculated according to $$T_s^\mu = \frac{10^{-3}}{14 \cdot 2^\mu},$$

and $N_{PRB}^{BW(j),\mu}$ may denote the maximum number of RBs in $BW^{(j)}$. $OH^{(j)}$ is an overhead value, which may be given as 0.14 in a DL and 0.18 in a UL of FR1 (a band of 6 GHz or less), and as 0.08 in a DL, and 0.10 in a UL of FR2 (a band of greater than 6 GHz). Through Equation 1, the maximum data rate in a DL in a cell having a 100 MHz frequency bandwidth at a 30 kHz subcarrier spacing may be calculated as in Table 9 below.

TABLE 9

| $f^{(j)}$ | $v_{Layers}^{(j)}$ | $Q_m^{(j)}$ | Rmax | $N_{PRB}^{BW(j),\mu}$ | $T_s$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143.E−05 | 0.14 | 1752.8 |
| 0.4 | 4 | 8 | 0.92578125 | 273 | 3.57143E−05 | 0.14 | 934.8 |

In contrast, the actual data rate of a terminal, which may be measured in actual data transmission, may be a value obtained by dividing the amount of data by the data transmission time. This may be a value obtained by dividing a TBS in 1 TB transmission or a sum of TBSs in 2 TB transmission, by the TTI length. For example, as in the assumption to obtain Table 5, the actual maximum data rate in a DL in a cell having a 100 MHz frequency bandwidth at a 30 kHz subcarrier spacing may be determined as shown in Table 10 below according to the number of assigned PDSCH symbols.

TABLE 10

| $N_{symb}^{sh}$ | $N_{DMRS}^{PRB}$ | $N_{RE}'$ | $N_{RE}$ | $N_{info}$ | n | $N_{info}'$ | C | TBS | TTI length (ms) | Data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 615659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,546 | 0.392857 | 2,544.38 |
| 12 | 8 | 136 | 27128 | 1099917.0 | 15 | 1,114,112 | 113 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,592 | 152 | 1,277,992 | 0.500000 | 2,555.98 |

The maximum data rate supported by the terminal may be identified through Table 9, and the actual data rate according to the assigned TBS may be identified through Table 10. Here, the actual data rate may be greater than the maximum data rate depending on scheduling information.

In a wireless communication system, in particular, in an NR system, a data rate supportable by a terminal may be agreed between a BS and the terminal. This may be calculated by using the maximum frequency band, the maximum modulation order, the maximum number of layers, which are supported by the terminal. However, the calculated data rate may be different from a value calculated based on the TBS, which is the size of a TB, and the TTI length, which are used for actual data transmission.

Accordingly, a case may occur in which the terminal is assigned a TBS greater than the value corresponding to the data rate supported by the terminal itself, and, to prevent this case from occurring, there may be a restriction on schedulable TBSs according to the data rate supported by the terminal.

UL control information (UCI), which may include at least one of HARQ-ACK feedback, a channel state report, and a scheduling request, may be transmitted on a PUCCH or a PUSCH. The PUCCH may be transmitted in a resource previously configured via higher layer signaling and/or indicated in DCI. For example, the BS may configure one or more PUCCH resource sets for the corresponding terminal via higher layer signaling. Each PUCCH resource set may include one or more PUCCH resources, and each PUCCH resource may be configured for a certain PUCCH format. Each PUCCH resource may include time resource information such as a start symbol position and the number of mapped symbols in one slot, and frequency resource information including a start PRB position, the number of mapped PRBs, whether frequency hopping is performed, and frequency domain information in frequency hopping, etc. Each PUCCH resource may also include precoding information such as cyclic shift, orthogonal cover code (OCC) information, and discrete Fourier transform. In practice, a PUCCH resource domain for transmission by the terminal may be indicated in a bit field such as a PUCCH resource indicator (PRI) of DCI. The value indicated in the bit field may be information indicating one of a PUCCH resource set and PUCCH resources configured via higher layer signaling.

The terminal may report information about its capability to the BS while connecting to the BS. The aforementioned capability may include parameters supportable by the terminal (e.g., the maximum number of layers, the maximum modulation order, the maximum frequency bandwidth, whether a certain technology is supported, etc.), and the terminal may report the aforementioned information to the BS. To this end, the BS may instruct the terminal to provide the information about the capability by transmitting a UE capability enquiry message, and the terminal may provide the information about the capability by transmitting a UE capability information message. The information about the capability of the terminal may be transmitted to the BS via higher layer signaling such as RRC signaling. The BS or a separate server may store information about the capability of a certain terminal. The information about the capability of the terminal stored in the BS or the separate server may be used for the BS to immediately recognize the capability of the terminal when the terminal connects to the same BS next time.

The UE capability information may include information about minimum time information required for the terminal to receive the PDSCH and transmit the HARQ-ACK feedback with respect to the PDSCH to the BS, and this may be referred to as a minimum processing time. In addition, the UE capability information may also include information about minimum time information required to receive UL scheduling from the BS and transmit a PUSCH based on the UL scheduling. The BS may indicate, to the terminal, an HARQ-ACK feedback timing and a PUSCH transmission timing, based on the UE capability information about a processing time as described above. That is, the BS may indicate the above-described timing information to the terminal with a value greater than the minimum processing time. In an embodiment, a processing capability may be configured for each serving cell in the terminal.

In the 5G or NR system according to an embodiment, when a PDSCH including DL data is transmitted, the BS may indicate a value $K_1$, which is a value corresponding to information about a timing at which the terminal transmits HARQ-ACK information of the PDSCH, in DCI for scheduling the PDSCH. When the HARQ-ACK information includes a timing advance and is not indicated to be transmitted prior to a symbol $L_1$, the terminal may transmit the information to the BS. That is, the HARQ-ACK information may include a timing advance, and may be transmitted from the terminal to the BS at a timing coinciding with or following the symbol $L_1$. When the HARQ-ACK information including a timing advance is indicated to be transmitted prior to the symbol $L_1$, the HARQ-ACK information may not be valid HARQ-ACK information in HARQ-ACK transmission from the terminal to the BS. The symbol $L_1$ may be the first symbol in which a cyclic prefix (CP) starts after $T_{proc,1}$ from the last timing of the PDSCH. $T_{proc,1}$ may be calculated according to Equation 2 below.

$$T_{proc,1} = ((N_1 + d_{1,1} + d_{1,2})(2048 + 144) \cdot \kappa 2^{-\mu}) \cdot T_C \quad \text{[Equation 2]}$$

In Equation 2, $N_1$, $d_{1,1}$, $d_{1,2}$, $\kappa$, $\mu$, and $T_C$ may be defined as follows:
  When the HARQ-ACK information is transmitted through a PUCCH (UL control channel), $d_{1,1}=0$, and when it is transmitted through a PUSCH (UL shared channel, data channel), $d_{1,1}=1$.
  When a plurality of activated component carriers or carriers are configured for the terminal, a maximum timing difference between carriers may be reflected in transmission of a second signal.
  For PDSCH mapping type A, i.e., in the case where the position of the first DMRS symbol is the third or fourth symbol of the slot, if a position index i of the last symbol of the PDSCH is less than 7, it may be defined that $d_{1,2}=7-i$.
  For PDSCH mapping type B, i.e., in the case where the position of the first DMRS symbol is the first symbol of the PDSCH, if the length of the PDSCH is 4 symbols, $d_{1,2}=3$, and, if the length of the PDSCH is 2 symbols, $d_{1,2}0.2=3+d$, where d denotes the number of symbols in which the PDSCH and the PDCCH including a control signal for scheduling the PDSCH overlap each other.

$N_1$ may be defined as in Table 11 below, depending on $\mu$. $\mu=0, 1, 2,$ and 3 may correspond to subcarrier spacings of 15 kHz, 30 kHz, 60 kHz, and 120 kHz, respectively.

TABLE 11

| | PDSCH decoding time $N_1$ [symbols] | |
|---|---|---|
| $\mu$ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

For $N_1$ provided in Table 11, different values may be used depending on the UE capability.

The values in Table 11 may be based on PDSCH processing capability 1, and the values of Table 11-1 may be based on PDSCH processing capability 2.

TABLE 11-1

| | PDSCH decoding time $N_1$ [symbols] |
|---|---|
| $\mu$ | No additional PDSCH DM-RS configured |
| 0 | 3 |
| 1 | 4.5 |
| 2 | 9 for frequency range 1 |

Here, $$T_c = 1/(\Delta f_{max} \cdot N_C), \Delta f_{max} = 480 \cdot 10^3 \text{ Hz}, N_f = 4096, \kappa = T_s/T_c = 64, T_s = 1/(\Delta f_{ref} \cdot N_{f,ref} \Delta f_{ref} = 15 \cdot 10^3 \text{ Hz}, N_{f,ref} = 2048$$

In addition, in the 5G or NR system according to an embodiment, when the BS transmits control information including a UL scheduling grant, the terminal may indicate a value $K_2$ corresponding to timing information for transmitting UL data or a PUSCH.

When the PUSCH includes a timing advance and is not indicated to be transmitted prior to a symbol $L_2$, the terminal may transmit the PUSCH to the BS. That is, the PUSCH may include a timing advance, and may be transmitted from the terminal to the BS at a timing coinciding with or following the symbol $L_2$. When the PUSCH includes a timing advance and is indicated to be transmitted prior to the symbol $L_2$, the terminal may ignore the UL scheduling grant control information from the BS. The symbol $L_2$ may be the first symbol in which a CP of a PUSCH symbol to be transmitted after $T_{proc,2}$ from the last timing of the PDCCH including a scheduling grant starts. $T_{proc,2}$ may be calculated according to Equation 3 below.

$$T_{proc,2} = ((N_2 + d_{2,1})(2048 + 144) \cdot \kappa 2^{-\mu}) \cdot T_C \quad \text{[Equation 3]}$$

In Equation 3, $N_2$, $d_{2,1}$, $\kappa$, $\mu$, and $T_C$ may be defined as follows:
  If the first symbol among PUSCH-assigned symbols may include only a DMRS, $d_{2,1}=0$, otherwise, $d_{2,1}=1$.
  If a plurality of activated component carriers or carriers are configured in the terminal, the maximum timing difference between carriers may be reflected in transmission of a second signal.
  $N_2$ may be defined as in Table 12 below, depending on $\mu$. $\mu=0, 1, 2,$ and 3 may correspond to subcarrier spacings of 15 kHz, 30 kHz, 60 kHz, and 120 kHz, respectively.

TABLE 12

| μ | PUSCH preparation time $N_2$ [symbols] |
|---|---|
| 0 | 10 |
| 1 | 12 |
| 2 | 23 |
| 3 | 36 |

For $N_2$ provided in Table 12, different values may be used depending on the UE capability.

Table 12 may show PUSCH preparation time values based on PUSCH timing capability 1, and Table 12-1 may show PUSCH preparation time values based on PUSCH timing capability 2.

TABLE 12-1

| μ | PUSCH preparation time $N_2$ [symbols] |
|---|---|
| 0 | 5 |
| 1 | 5.5 |
| 2 | 11 for frequency range 1 |

Here, $T_c = 1/(\Delta f_{max} \cdot N_C), \Delta f_{max} = 480 \cdot 10^3$ Hz, $N_f = 4096, \kappa = T_s/T_c = 64, T_s = 1/(\Delta f_{ref} \cdot N_{f,ref}), \Delta f_{ref} = 15 \cdot 10^3$ Hz, $N_{f,ref} = 2048$ Meanwhile, the 5G or NR system according to an embodiment may configure a bandwidth part (hereinafter, also referred to as 'BWP') within one carrier, such that a particular terminal may be designated for transmission and reception in the configured BWP. This may be performed to reduce power consumption of the terminal. The BS may configure a plurality of BWPs, and may change an activated BWP in control information. A time that the terminal may use to change a BWP may be defined as in Table 13 below.

TABLE 13

| Frequency range | Scenario | Type 1 Delay (us) | Type 2 Delay (us) |
|---|---|---|---|
| 1 | 1 | 600 | 2000 |
|   | 2 | 600 | 2000 |
|   | 3 | 600 | 2000 |
|   | 4 | 400 | 950 |
| 2 | 1 | 600 | 2000 |
|   | 2 | 600 | 2000 |
|   | 3 | 600 | 2000 |
|   | 4 | 400 | 950 |

In Table 13, frequency range 1 may denote to a frequency band of 6 GHz or less, and frequency range 2 may denote a frequency band of 6 GHz or greater. In the above-described embodiment, type 1 and type 2 may be determined according to the UE capability. In the above-described embodiment, scenarios 1, 2, 3, and 4 may be given as in Table 14 below.

TABLE 14

|  | Center frequency is changeable | Center frequency is unchangeable |
|---|---|---|
| Frequency bandwidth is changeable | Scenario 3 | Scenario 2 |
| Frequency bandwidth is unchangeable | Scenario 1 | Scenario 4 in case of change in subcarrier spacing |

That a BWP change request exists in control information or a BWP change is triggered may mean that BWP information indicated by a BWP indicator is different from a currently activated BWP such that the BWP may be changed. On the other hand, when the currently activated BWP indicates the same BWP, it may mean that there is no BWP change request.

Hereinafter, embodiments of the present disclosure are described in detail with reference to the accompanying drawings. In addition, in describing the present disclosure, when the detailed description of a relevant function or configuration is determined to unnecessarily obscure the gist of the present disclosure, the detailed description thereof will be omitted. Also, the terms as used herein are those defined by taking into account functions in the present disclosure, and may vary depending on the intention of users or operators, precedents, or the like. Therefore, their definitions should be made based on the description throughout the specification. Hereinafter, a BS is an entity that performs resource assignment of a terminal, and may be at least one of gNode B (gNB), eNode B (eNB), Node B, a wireless access unit, a BS controller, or a node on a network. A terminal may include a UE, an MS, a cellular phone, a smart phone, a computer, or a multimedia system capable of performing a communication function. In the present disclosure, a DL may refer to a wireless transmission path of a signal for transmission from a BS to a terminal, and a UL may refer to a wireless transmission path of a signal for transmission from a terminal to a BS. In addition, while embodiments of the present disclosure are described by using an NR system as an example, the embodiments of the present disclosure may also be applied to other communication systems having a similar technical background or channel form. Also, the embodiments of the present disclosure may also be applied to other communication systems through some modifications within a range that does not largely depart from the scope of the present disclosure based on determination by a skilled person.

In the present disclosure, the terms 'physical channel' and 'signal' may be interchangeably used with the term 'data' or 'control signal'. For example, a PDSCH is a physical channel on which data is transmitted, but in the present disclosure, a PDSCH may be used as data.

Hereinafter, in the present disclosure, higher layer signaling is a method of delivering a signal from a BS to a terminal by using a DL data channel of a physical layer or from the terminal to the BS by using a UL data channel of the physical layer, and may also be referred to as RRC signaling or a MAC CE.

Meanwhile, in the present disclosure, the terms 'peak data rate', 'max data rate', 'maximum data rate', etc., may be used interchangeably.

In a first embodiment of the present disclosure, a method and an apparatus for determining a resource for transmitting a UL PUCCH may be provided.

In an embodiment, PUCCH transmission that may include UL control information may be determined according to DCI transmission. The DCI may deliver resource information for PUCCH transmission. When several pieces of DCI indicate PUCCH resources transmitted at the same timing, the terminal may need to determine in which PUCCH resource to transmit UL control information. Determination of the PUCCH resource may be provided basically in the following manner.

For a PUCCH transmission with HARQ-ACK information, a UE determines a PUCCH resource after determining a set of PUCCH resources for $O_{UCI}$, HARQ-ACK information bits, as described in Subclause 9.2.1. The PUCCH resource determination is based on a PUCCH resource indicator field [5, TS 38.212] in a last DCI format 1_0 or DCI format 1_1. among the DCI formats 1_0 or DCI formats 1_1 that have a value of a PDSCH-to-HARQ_feedback timing indicator field indicating a same slot for the PUCCH t ransmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes. The PUCCH resource indicator field values map to values of a set of PUCCH resource indexes, as defined in Table 9.2.3-2, provided by ResourceList for PUCCH resources from a set of PUCCH resources provided by PUCCH-ResourceSet with a maximum of eight PUCCH resources.

The above-described method may refer to a method of, when a plurality of pieces of DCI related to PUCCHs transmitted at the same timing are detected, first arranging the plurality of pieces of DCI in a serving cell index order, then arranging them in a PDCCH monitoring occasion order, and then determining to use a PUCCH resource indicated by the last piece of DCI.

Figure 8:
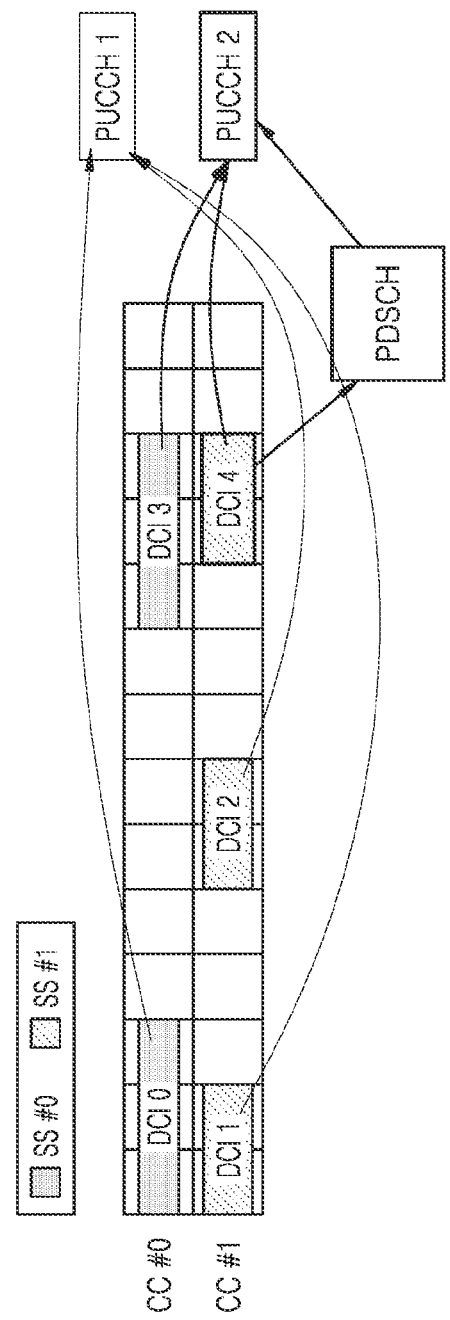
FIG. 8 is a diagram for describing a method of determining a physical uplink control channel (PUCCH) resource, according to an embodiment of the present disclosure.

FIG. 8 is a diagram for describing a method of determining a PUCCH resource, according to an embodiment of the present disclosure.

With reference to FIG. 8, a method of, when PUCCHs on which HARQ-ACK information with respect to PDSCH or semi-persistent scheduling (SPS)-related information scheduled by five pieces of DCI are to be transmitted at the same timing, determining an actually transmitted PUCCH resource may be described.

According to the method of FIG. 8, when a plurality of pieces of DCI related to PUCCHs that are transmitted at the same timing are detected, the plurality of pieces of DCI may be first arranged in a serving cell index order. Then, the plurality of pieces of DCI may be arranged in a PDCCH monitoring occasion order, and thus, may be arranged in the order of DCI 0, DCI 1, DCI 2, DCI 3, and DCI 4. UL control information related to DCI 0, DCI 1, DCI 2, DCI 3, and DCI 4 may be transmitted on PUCCH 2, which is indicated by the last piece of DCI, i.e., DCI 4, according to the defined method.

However, a clear understanding between the BS and the terminal may be required regarding the following aspects:
How to determine the PDCCH monitoring occasion order, and
How to deal with a case where a sufficient processing time is not secured after reception of the last piece of DCI.

A network according to an embodiment may provide the terminal with a PDCCH monitoring resource configuration through PDCCH-Config, a ControlResourceSet information element (IE), a SearchSpace IE, etc. The network may set the length of a CORESET to 1 to 3 symbols by using a parameter such as duration in the ControlResourceSet IE. In addition, a certain CORESET may be associated with a certain SearchSpace through a parameter controlResourceSetId in the SearchSpace IE, and its position on a time axis may be set through parameters such as monitoringSlotPeriodicityAndOffset, duration, and monitoringSymbolsWithinSlot in the SearchSpace IE.

Figure 9:
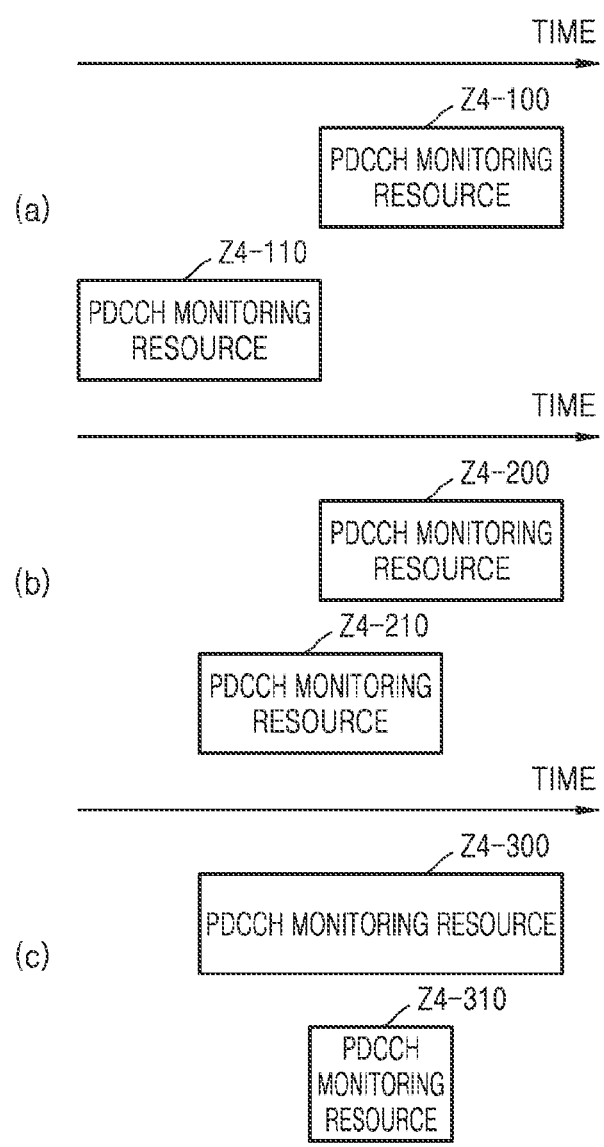
FIG. 9 is a diagram for describing a positional relationship between two physical downlink control channel (PDCCH) monitoring resources on a time axis, based on a network configuration, according to an embodiment of the present disclosure.

FIG. 9 is a diagram for describing a positional relationship between two PDCCH monitoring resources on a time axis, based on a network configuration, according to an embodiment of the present disclosure. Referring to FIG. 9, (a) shows an example in which two PDCCH monitoring resources Z4-100 and Z4-110 do not overlap each other on a time axis, (b) shows an example in which two PDCCH monitoring resources Z4-200 and Z4-210 partially overlap each other on the time axis, and (c) shows an example in which one PDCCH monitoring resource Z4-310 is completely included in another PDCCH monitoring resource Z4-300 on the time axis.

According to an embodiment of the present disclosure, the PDCCH monitoring occasions of PDCCH monitoring resources that do not overlap each other on a time axis may be determined to be different from each other. In addition, PDCCH monitoring occasion indices may be determined to be greater for a later PDCCH monitoring resource on the time axis than for an earlier PDCCH monitoring resource on the time axis. That is, in the case of (a) of FIG. 9, when the PDCCH monitoring occasion index of the PDCCH monitoring resource Z4-110 is k, the PDCCH monitoring occasion index of the PDCCH monitoring resource Z4-100 may be determined to be k+n (n>=1). Meanwhile, when there is no PDCCH monitoring resource between the PDCCH monitoring resources Z4-110 and Z4-100, n may be determined to be 1.

Figure 10:
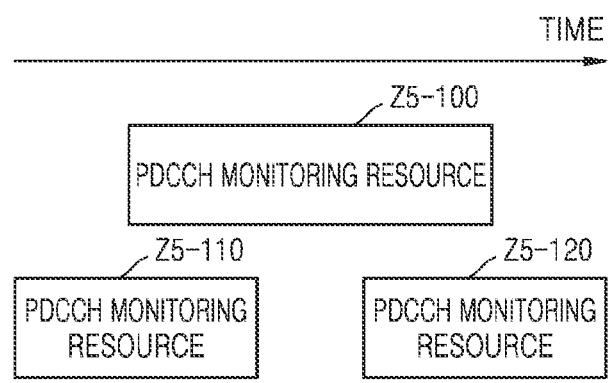
FIG. 10 is a diagram for describing a positional relationship between two PDCCH monitoring resources on a time axis, based on a network configuration, according to an embodiment of the present disclosure.

FIG. 10 is a diagram for describing a positional relationship between two PDCCH monitoring resources on a time axis, based on a network configuration, according to an embodiment of the present disclosure. FIG. 10 illustrates an example in which a PDCCH monitoring resource Z5-110 and a PDCCH monitoring resource Z5-100 partially overlap each other on the time axis, the PDCCH monitoring resource Z5-100 and a PDCCH monitoring resource Z5-120 partially overlap each other on the time axis, and the PDCCH monitoring resource Z5-110 and the PDCCH monitoring resource Z5-120 do not overlap each other on the time axis. As illustrated in FIG. 10, if the PDCCH monitoring occasions of PDCCH monitoring resources partially overlapping each other on a time axis are determined to be equal to each other, the PDCCH monitoring occasions of the PDCCH monitoring resource Z5-110 and the PDCCH monitoring resource Z5-120 may be determined to be equal to each other.

According to an embodiment of the present disclosure, the PDCCH monitoring occasions of PDCCH monitoring resources that partially overlap each other on a time axis may be determined to be different from each other. In addition, PDCCH monitoring occasion indices may be determined to be greater for a later PDCCH monitoring resource on the time axis than for an earlier PDCCH monitoring resource on the time axis. That is, as described above, in the case of (b) of FIG. 9, when the PDCCH monitoring occasion index of the PDCCH monitoring resource Z4-210 is k, the PDCCH monitoring occasion index of the PDCCH monitoring resource Z4-200 may be determined to be k+n (n>=1). When there is no PDCCH monitoring resource between the PDCCH monitoring resources Z4-210 and Z4-200, n may be determined to be 1. Meanwhile, in the case of FIG. 10, when the PDCCH monitoring occasion index of the PDCCH monitoring resource Z5-100 is k, the PDCCH monitoring occasion index of the PDCCH monitoring resource Z5-110 may be determined to be k+n (n>=1), and the PDCCH monitoring occasion index of the PDCCH monitoring resource Z5-120 may be determined to be k+n+o (o>=1).

According to an embodiment of the present disclosure, the PDCCH monitoring occasions of PDCCH monitoring resources that partially overlap each other on a time axis may be determined to be different from each other. In addition, the PDCCH monitoring occasion index may be determined based on the position of some symbols included in the PDCCH monitoring resource, on the time axis. The symbol used to determine the PDCCH monitoring occasion index may be the last symbol of the PDCCH monitoring resource. The PDCCH monitoring occasion index of a PDCCH monitoring resource including a later symbol on the time axis may be determined to be greater than the PDCCH monitoring occasion index of a PDCCH monitoring resource including an earlier symbol on the time axis. That is, in the case of (c) of FIG. 9, when the PDCCH monitoring occasion index of the PDCCH monitoring resource Z4-310 is k, the PDCCH monitoring occasion index of the PDCCH monitoring resource Z4-300 may be determined to be k+n (n>=1).

Figure 11:
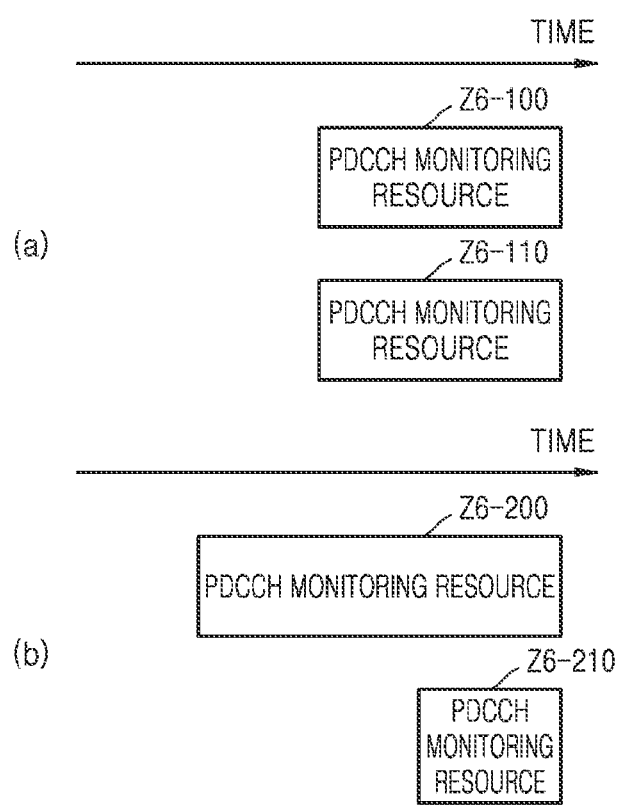
FIG. 11 is a diagram for describing a positional relationship between two PDCCH monitoring resources on a time axis, based on a network configuration, according to an embodiment of the present disclosure.

FIG. 11 is a diagram for describing a positional relationship between two PDCCH monitoring resources on a time axis, based on a network configuration, according to an embodiment of the present disclosure.

Referring to FIG. 11, both (a) and (b) of FIG. 11 illustrate cases where the positions of the last symbols of respective PDCCH monitoring resources are the same in the time axis. According to an embodiment of the present disclosure, the PDCCH monitoring occasion indices of PDCCH monitoring resources in which the positions of the respective last symbols on the time axis are the same may be determined to be equal to each other. That is, a PDCCH monitoring resource Z6-100 and a PDCCH monitoring resource Z6-110 may have the same PDCCH monitoring occasion index. According to an embodiment of the present disclosure, even when PDCCH monitoring resources partially overlap each other on a time axis, if the positions of the last symbols of the respective PDCCH monitoring resources on the time axis are the same, the PDCCH monitoring occasion indices of the corresponding PDCCH monitoring resources may be determined to be equal to each other. That is, a PDCCH monitoring resource Z6-200 and a PDCCH monitoring resource Z6-210 may have the same PDCCH monitoring occasion index.

Figure 12:
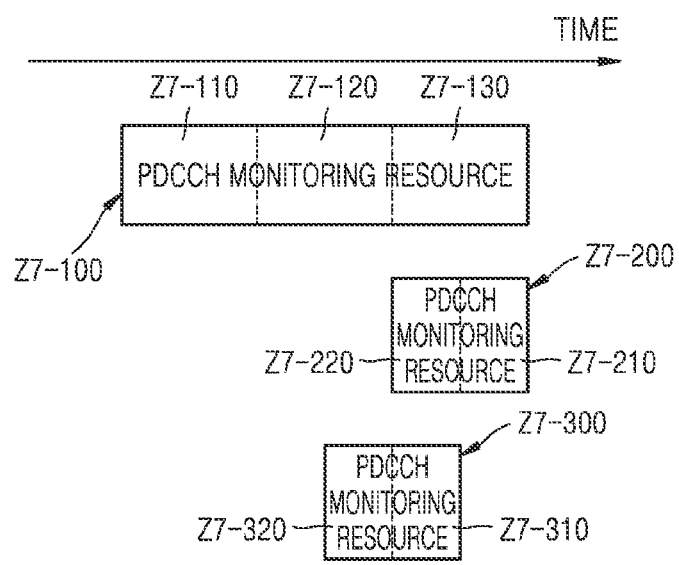
FIG. 12 is a diagram for describing a positional relationship between two PDCCH monitoring resources on a time axis, based on a network configuration, according to an embodiment of the present disclosure.

FIG. 12 is a diagram for describing a positional relationship between two PDCCH monitoring resources on a time axis, based on a network configuration, according to an embodiment of the present disclosure. A network may be configured to use different subcarrier spacings µ for respective BWPs in one carrier. The network may also be configured to use different subcarrier spacings µ for respective carriers. In the case where the subcarrier spacings used by carriers configured and used by the network for a terminal are different from each other, when a plurality of BWPs among BWPs configured by the network for the terminal activated and used, and the subcarrier spacings of the respective BWPs are different from each other, the PDCCH monitoring resources of the terminal may include radio resources having different subcarrier spacings as illustrated in FIG. 12. According to an embodiment of the present disclosure, the PDCCH monitoring occasion index of a PDCCH monitoring resource may be determined according to the position of the rear boundary of the last symbol of the PDCCH monitoring resource on the time axis. In an embodiment, the PDCCH monitoring occasion indices of PDCCH monitoring resources having the same boundary may be determined to be equal to each other. The PDCCH monitoring occasion index of a PDCCH monitoring resource having a later boundary on the time axis may be determined to be greater than the PDCCH monitoring occasion index of a PDCCH monitoring resource having an earlier boundary on the time axis. According to the example illustrated in FIG. 12, because the positions of the rear boundary of a symbol Z7-130 and the rear boundary of a symbol Z7-210 are the same on the time axis, a PDCCH monitoring resource Z7-100 and a PDCCH monitoring resource Z7-200 may be determined to have the same PDCCH monitoring occasion index, and, because the rear boundary of a symbol Z7-310 is earlier than those of the symbol Z7-130 and the symbol Z7-210, the symbol Z7-310 may be determined to have a PDCCH monitoring occasion index less than those of the PDCCH monitoring resource Z7-100 and the PDCCH monitoring resource Z7-200. That is, when the PDCCH monitoring occasion index of a PDCCH monitoring resource Z7-300 is k, the PDCCH monitoring occasion indices of the PDCCH monitoring resource Z7-100 and the monitoring resource Z7-200 may be determined to be k+n (n>=1).

According to an embodiment of the present disclosure, a terminal may attempt to detect DCI in PDCCH monitoring occasion index i and serving cell index 0. When detected DCI format 1_0 or DCI format 1_1 exists, the terminal may determine a slot index of a PUCCH resource indicated by the DCI, and push and store the detected DCI to $STACK_m$ corresponding to the determined slot index m. Meanwhile, the terminal may repeat the above-described operation while incrementing the serving cell index by 1 until the serving cell index is equal to the number of serving cells configured for the terminal. Meanwhile, when the serving cell index is equal to a serving cell index configured for the terminal, the terminal may increment the PDCCH monitoring occasion index by 1, set the serving cell index to 0, and repeat the above-described operation. A PUCCH resource in $Slot_m$ may be determined based on DCI obtained by performing a POP command on $Stack_m$.

According to an embodiment of the present disclosure, a terminal may attempt to detect DCI in PDCCH monitoring occasion index i and serving cell index 0. When detected DCI format 1_0 or DCI format 1_1 exists, the terminal may determine a slot index of a PUCCH resource indicated by the DCI, and store a PUCCH resource indicator indicated by the detected DCI in a variable $PUCCH\_res_m$ corresponding to the determined slot index m. Meanwhile, the terminal may repeat the above-described operation while incrementing the serving cell index by 1 until the serving cell index is equal to the number of serving cells configured for the terminal. Meanwhile, when the serving cell index is equal to a serving cell index configured for the terminal, the terminal may increment the PDCCH monitoring occasion index by 1, set the serving cell index to 0, and repeat the above-described operation. The PUCCH resource in $Slot_m$ may be determined to be $PUCCH\_res_m$.

The network according to an embodiment may configure at least one BWP for the terminal. The BWP may be configured for the terminal through higher layer signaling, e.g., RRC signaling. The network may transmit data through the configured BWP. The network may activate a plurality of BWPs through higher layer signaling (e.g., RRC signaling, MAC CE signaling) or L1 signaling, if necessary.

Figure 13:
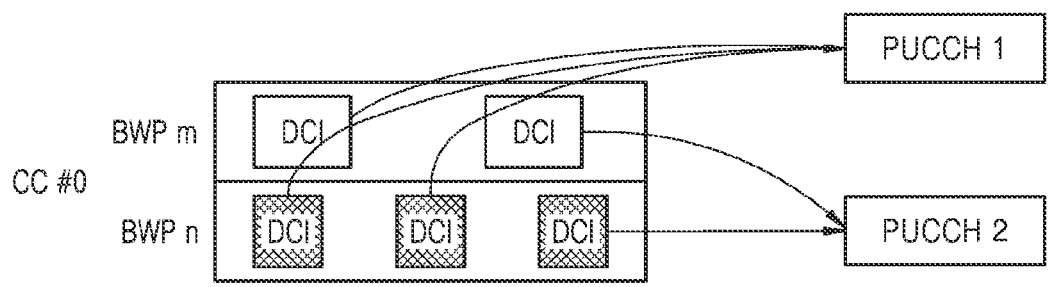
FIG. 13 is a diagram for describing an operation of transmitting downlink control information (DCI) through a plurality of activated bandwidth parts, according to an embodiment of the present disclosure.

FIG. 13 is a diagram for describing an operation of transmitting DCI through a plurality of activated BWPs, according to an embodiment of the present disclosure. Referring to FIG. 13, a plurality of active BWPs may exist in a terminal according to an embodiment, and DCI may be transmitted therethrough. PDSCHs may be scheduled through a plurality of pieces of DCI transmitted through the plurality of BWPs. Also, resources for transmitting HARQ-ACKs with respect thereto may be indicated by the plurality of pieces of DCI described above. When the above-described indicated PUCCH resources for transmitting the HARQ-ACKs have the same timing, the terminal needs to determine which PUCCH resource to use to transmit UL control information.

Figure 14:
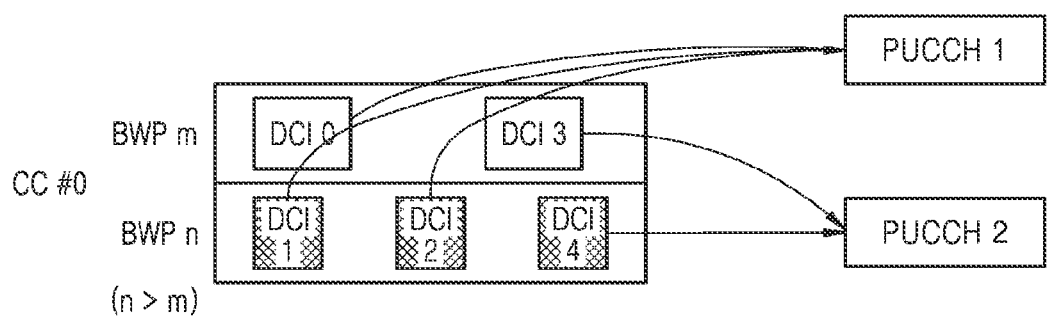
FIG. 14 is a diagram illustrating a transmission method according to an embodiment of the present disclosure.

FIG. 14 is a diagram illustrating a transmission method according to an embodiment of the present disclosure. With reference to FIG. 14, a method of, when PUCCHs on which HARQ-ACK information with respect to PDSCHs scheduled by five pieces of DCI is transmitted, or PUCCHs on which HARQ-ACK information with respect to PDSCHs received based on an SPS configuration is transmitted, have the same timing, determining a PUCCH resource will be described. In the method according to an embodiment, a plurality of pieces of DCI for scheduling PUCCH resources at the same timing may be first arranged by using BWP indices (e.g., in ascending order), and then arranged according to PDCCH monitoring occasions. Through arrangement in the above-described method, they may be arranged, for example, in the order of DCI 0, DCI 1, DCI 2, DCI 3, and DCI 4. UL information related to DCI 0, DCI 1, DCI 2, DCI 3, and DCI 4 may be transmitted in a resource PUCCH 2, which is indicated by the last piece of DCI, i.e., DCI 4, among the arranged plurality of pieces of DCI. In addition, in the resource PUCCH 2 indicated by the last piece of DCI, i.e., DCI 4, among the arranged plurality of pieces of DCI, UL information related to DCI 0, DCI 1, DCI 2, DCI 3, DCI 4, and PDSCHs associated with the PUCCH resource, among the PDSCHs received based on the SPS configuration, may be transmitted.

Figure 15:
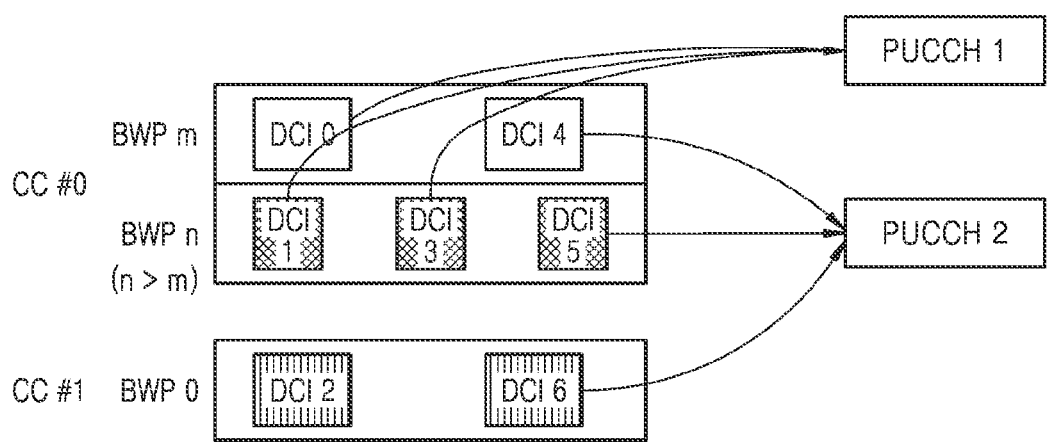
FIG. 15 is a diagram illustrating a transmission method according to an embodiment of the present disclosure.

FIG. 15 is a diagram illustrating a transmission method according to an embodiment of the present disclosure. FIG. 15 illustrates a method of, when PUCCHs on which HARQ-ACK information with respect to PDSCHs scheduled by seven pieces of DCI is transmitted, or PUCCHs on which HARQ-ACK information with respect to PDSCHs received based on an SPS configuration is transmitted, have the same timing, determining a PUCCH resource. In the method according to an embodiment, a plurality of pieces of DCI for scheduling PUCCH resources at the same timing may be first arranged by using BWP indices (e.g., in ascending order), then arranged by using serving cell indices (e.g., in ascending order), and then arranged according to PDCCH monitoring occasions. Through arrangement in the above-described method, they may be arranged, for example, in the order of DCI 0, DCI 1, DCI 2, DCI 3, DCI 4, DCI 5, and DCI 6. UL information related to DCI 0, DCI 1, DCI 2, DCI 3, DCI 4, DCI 5, and DCI 6 may be transmitted in a resource PUCCH 2, which is indicated by the last piece of DCI, i.e., DCI 6, among the arranged plurality of pieces of DCI. In addition, in the resource PUCCH 2 indicated by the last DCI, i.e., DCI 6, among the arranged plurality of pieces of DCI, UL information related to DCI 0, DCI 1, DCI 2, DCI 3, DCI 4, DCI 5, DCI 6, and PDSCHs associated with the PUCCH resource, among the PDSCHs received based on the SPS configuration, may be transmitted.

In a second embodiment of the present disclosure, a method and an apparatus for configuring UL control information and feeding back the configured UL control information to a UL may be provided.

Whether a valid HARQ-ACK regarding success or failure of transmission of a PDSCH is transmitted to the network through the aforementioned PUCCH may be determined through the following method according to a relationship between the PDSCH and the PUCCH. In the following description, when a plurality of PDSCHs are transmitted through a plurality of pieces of DCI, a criterion based on which a valid HARQ-ACK is transmitted is not clear, and thus a clear understanding thereof may be required.

> If the first uplink symbol of the PUCCH which carries the HARQ-ACK information, as defined by the assigned HARQ-ACK timing $K_1$ and the PUCCH resource to be used and including the effect of the timing advance, starts no earlier than at symbol $L_1$, where $L_1$ is defined as the next uplink symbol with its CP starting after $T_{proc,1} = (N_1 + d_{1,1})(2048 + 144) \cdot \kappa 2^{-\mu} \cdot T_C$ after the end of the last symbol of the PDSCH carrying the TB being acknowledged, then the UE shall provide a valid HARQ-ACK message.

According to an embodiment, when the distance, on a time axis, between 'the end of the last symbol of the last PDSCH of a plurality of PDSCHs' and 'the timing obtained by subtracting a timing advance (TA) of a terminal from the start of the CP of the first symbol of a PUCCH transmission resource' is greater than or equal to a certain value (e.g., $T_{proc,1}=(N_1+d_{1,1})(2048+144)\cdot\kappa 2^{-\mu}\cdot T_C$) (i.e., when resources satisfy a time condition), the terminal may multiplex valid HARQ-ACK information regarding the plurality of PDSCHs and transmit the multiplexed information through the PUCCH resource.

According to an embodiment, when the distance, on a time axis, between 'the end of the last symbol of the last PDSCH of a plurality of PDSCHs' and 'the timing obtained by subtracting a TA of a terminal from the start of the CP of the first symbol of PUSCH transmission resources' is greater than or equal to a certain value (e.g., $T_{proc,1}=(N_1+d_{1,1})(2048+144)\cdot\kappa 2^{-\mu}\cdot T_C$) (i.e., when the resources satisfy a time condition), the terminal may multiplex valid HARQ-ACK information and transmit the multiplexed information through the PUSCH resource.

According to an embodiment, when the resources do not satisfy the aforementioned time condition, the terminal may not transmit the valid HARQ-ACK information. According to an embodiment, when there is at least one PDSCH(s) that does not satisfy the time condition, the terminal may not transmit the valid HARQ-ACK information for all PDSCH(s).

> Otherwise the UE is not required to provide valid HARQ-ACK information as defined by the assigned HARQ-ACK timing K1.

According to an embodiment, the terminal may drop PUCCH transmission including at least one piece of invalid HARQ-ACK information. According to an embodiment, the terminal may drop PUSCH transmission including at least one piece of invalid HARQ-ACK information.

According to an embodiment, when PUCCH repetitive transmission is configured for the terminal, the terminal may not perform PUCCH transmission in a resource that does not satisfy the aforementioned time condition, and start PUCCH transmission by preferentially using a resource that at least satisfies the time condition. According to an embodiment, when n times of PUCCH repetitive transmission is configured for the terminal and the number of PUCCH resources that do not satisfy the aforementioned time condition is m, the terminal may perform PUCCH transmission (n−m) times by preferentially using a PUCCH resource that satisfies the time condition (i.e., a later resource on the time axis). According to an embodiment, when n times of PUCCH repetitive transmission is configured for the terminal and the number of PUCCH resources that do not satisfy the aforementioned time condition is m, the terminal may perform PUCCH transmission n times by preferentially using a PUCCH resource that satisfies the time condition. According to an embodiment, the transmission method for the case where PUCCH repetitive transmission is configured for a terminal described above is also applicable to the case where PUSCH repetitive transmission is configured for a terminal.

According to an embodiment, the terminal may configure HARQ-ACK bit(s) for PDSCH(s) that do not satisfy the above-described time condition as NACK(s), and configure HARQ-ACK bit(s) with respect to PDSCH(s) that satisfy the time condition as pieces of valid HARQ-ACK information and transmit them. According to an embodiment, the terminal may basically configure all pieces of HARQ-ACK information with respect to all PDSCH(s) as NACKs, and update corresponding HARQ-ACK information as valid HARQ-ACK information at the time of completion of each PDSCH decoding.

According to an embodiment, the terminal may transmit, as HARQ-ACK information, only the HARQ-ACK bit(s) with respect to the PDSCH(s) that satisfy the above-described time condition. According to an embodiment, when the bitwidth of a HARQ-ACK corresponding to scheduled PDSCH(s) is N bits and the bitwidth of a HARQ-ACK corresponding to PDSCH(s) that does not satisfy the above-described time condition among the scheduled PDSCH(s) is M bits, the terminal may configure a HARQ-ACK codebook with (N−M) bits and transmit the configured codebook.

According to an embodiment, when the PDSCH(s) does not satisfy the above-described time condition, the terminal may process the PDSCH(s) that does not satisfy the time condition as if the PDSCH(s) has not transmitted the terminal. According to an embodiment, when the BS has actually transmitted N PDSCH(s) but M PDSCH(s) among them do not satisfy the time condition, the terminal may process the M PDSCH(s) that do not satisfy the time condition as if they were not transmitted, and thus configure only HARQ-ACK information with respect to (N−M) PDSCH(s), i.e., excluding the M PDSCH(s), as HARQ-ACK information and transmit the configured HARQ-ACK information.

Whether a valid HARQ-ACK regarding success or failure of transmission of a PDSCH is transmitted to the network through the aforementioned PUCCH may be determined through the following method according to a relationship between the PDSCH and the PUCCH. In the following description on processing time, a clear understanding between a BS and a terminal may be required regarding the end of the last symbol of a PDSCH.

---

If the first uplink symbol of the PUCCH which carries the HARQ-ACK information, as defined by the assigned HARQ-ACK timing $K_1$ and the PUCCH resource to be used and including the effect of the timing advance, starts no earlier than at symbol $L_1$, where $L_1$ is defined as the next uplink symbol with its CP starting after $T_{proc,1} = (N_1 + d_{1,1})(2048 + 144) \cdot \kappa 2^{-\mu} \cdot T_C$ after the end of the last symbol of the PDSCH carrying the TB being acknowledged, then the UE shall provide a valid HARQ-ACK message.

---

Figure 16:
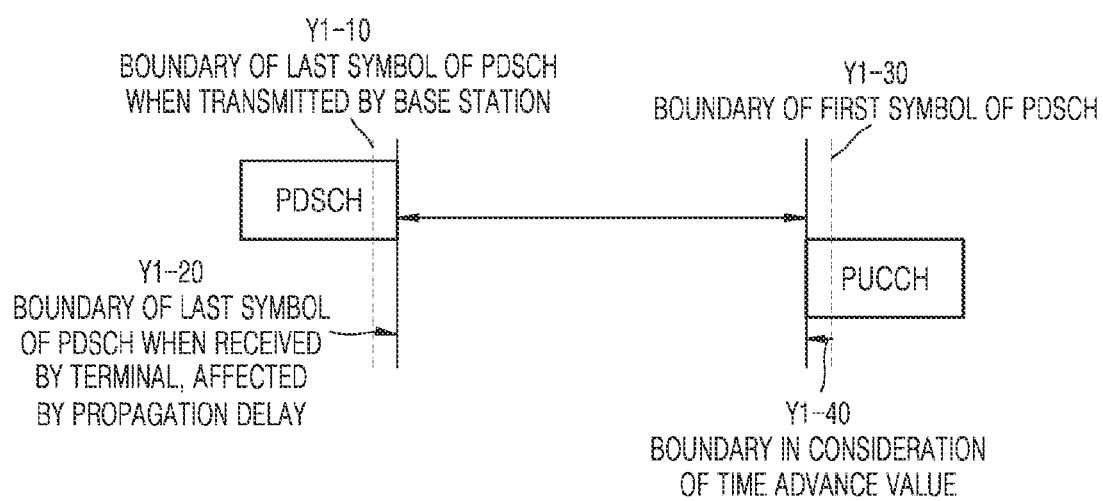
FIG. 16 is a diagram for describing a relationship between a physical downlink shared channel (PDSCH) and a PUCCH resource for transmitting a hybrid automatic repeat request-acknowledgement (HARQ-ACK) corresponding to the PDSCH, according to an embodiment of the present disclosure.

FIG. 16 is a diagram for describing a relationship between a PDSCH and a PUCCH resource for transmitting a HARQ-ACK corresponding to the PDSCH, according to an embodiment of the present disclosure. A propagation delay may occur until a signal transmitted from a BS arrives at a terminal, depending on the positions of the BS and the terminal. According to an embodiment, the end of the last symbol of the PDSCH, which determines whether a valid HARQ-ACK regarding success or failure of transmission of the PDSCH is transmitted to the network, may be a boundary Y1-20 of the last symbol of the PDSCH when received by the terminal.

Figure 17A:
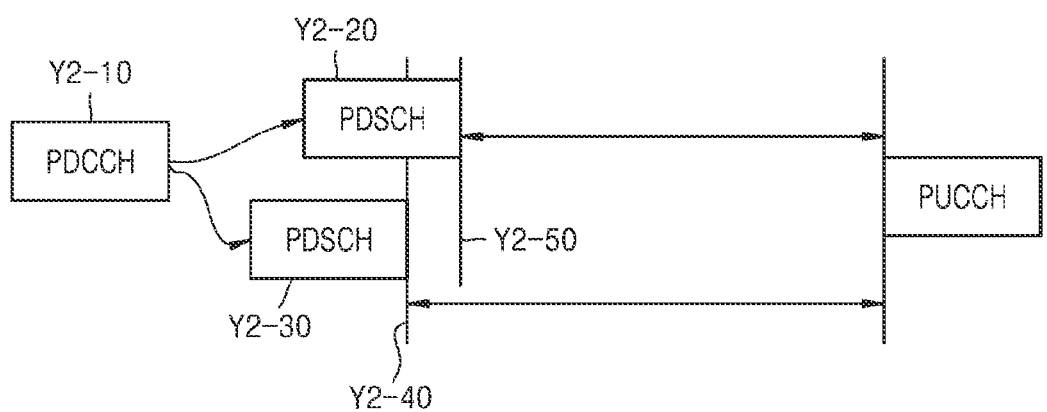
FIG. 17A is a diagram for describing a relationship, when DCI transmitted through one PDCCH has scheduled a plurality of PDSCHs, between the plurality of PDSCHs and a PUCCH resource for transmitting HARQ-ACKs corresponding the PDSCHs, according to an embodiment of the present disclosure.

FIG. 17A is a diagram for describing a relationship, when DCI transmitted through one PDCCH has scheduled a plurality of PDSCHs, between the plurality of PDSCHs and a PUCCH resource for transmitting HARQ-ACKs corresponding the PDSCHs, according to an embodiment of the present disclosure.

Referring to FIG. 17A, PDSCHs Y2-20 and Y2-30 may contain the same TB. According to an embodiment, the end of the last symbol of the PDSCH, which determines whether a valid HARQ-ACK regarding success or failure of transmission of the PDSCHs is transmitted to the network, may be determined to be the boundary of a last symbol Y2-20 of the PDSCH received last by the terminal among the plurality of PDSCHs. According to an embodiment, the end of the last symbol of the PDSCH, which determines whether a valid HARQ-ACK regarding success or failure of transmission of the PDSCH is transmitted to the network, may be determined based on an index of a time resource to which the plurality of PDSCHs are mapped. For example, the time resource index (i.e., a slot number or a symbol number) of the last symbol of the PDSCH Y2-20 and the time resource index of the last symbol of the PDSCH Y2-30 may be compared with each other to determine the later symbol on the time axis as the last symbol.

Meanwhile, the PDSCHs Y2-20 and Y2-30 may contain different TBs. According to an embodiment, whether valid HARQ-ACKs regarding success or failure of transmission of TBs transmitted through PDSCHs are transmitted to the network may be determined based on the boundary of the last symbol of each PDSCH. For example, whether a valid HARQ-ACK regarding transmission of the TB transmitted through the PDSCH Y2-20 may be determined based on the point of Y2-50, and whether a valid HARQ-ACK regarding transmission of the TB transmitted through the PDSCH Y2-30 may be determined based on the point of Y2-40.

The terminal may configure a HARQ-ACK corresponding to the above-described PDSCH as a NACK before PDSCH decoding. When the PDSCH decoding is successfully completed, the terminal may update the aforementioned HARQ-ACK to be an ACK. The terminal may transmit, when the PDSCH decoding is completed before a HARQ-ACK transmission timing and HARQ-ACK information is updated, the updated information, and transmit, when the HARQ-ACK information is not updated, previously configured HARQ-ACK information. Even when the decoding is not completed until the HARQ-ACK transmission timing, the terminal may continue the decoding to generate HARQ-ACK information. Thereafter, the terminal may determine whether a PDSCH scheduled by DCI transmitted by the network through a PDCCH corresponds to retransmission, and, when the PDSCH corresponds to retransmission, and HARQ-ACK information generated by continuing the above-described decoding is an ACK, the terminal may transmit the ACK in a newly determined HARQ-ACK information transmission resource without receiving or decoding the retransmitted PDSCH. When the PDSCH corresponds to retransmission, and HARQ-ACK information generated by continuing the above-described decoding is an NACK, the terminal may receive the retransmitted PDSCH and perform PDSCH decoding through a combining operation based on a designated HARQ scheme.

In a third embodiment of the present disclosure, a method and an apparatus for analyzing and determining HARQ-ACK feedback timing information may be provided.

PUCCH transmission including UL control information such as HARQ-ACK information regarding success or failure of transmission of a PDSCH according to an embodiment may be determined by DCI transmitted through a PDCCH. When a plurality of pieces of DCI indicate PUCCH transmission at the same timing and plurality of pieces of DCI indicating PUCCH transmission at the same timing indicate different PUCCH resources, the terminal may need to determine which resource among the PUCCH resources to use to transmit the UL control signal. This determination may be performed by the following method.

> For a PUCCH transmission with HARQ-ACK information, a UE determines a PUCCH resource after determining a set of PUCCH resources for $O_{UCI}$ HARQ-ACK information bits, as described in Subclause 9.2.1. The PUCCH resource determination is based on a PUCCH resource indicator field [5, TS 38.212] in a last DCI format 1_0 or DCI format 1_1, among the DCI formats 1_0 or DCI formats 1_1 that have a value of a PDSCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes.

DCI format 1_0 may fixedly include a PDSCH-to-HARQ_feedback timing indicator of 3 bits. Meanwhile, the number of bits of a PDSCH-to-HARQ_feedback timing indicator included in DCI format 1_1 may be determined by higher layer signaling (e.g., RRC signaling). For example, when the number of entries of a parameter dl-DataToUL-ACK included in RRC signaling is I, DCI format 1_1 may include a PDSCH-to-HARQ_feedback timing indicator of $\lceil \log_2(I) \rceil$ bits. The network according to an embodiment may set the number of entries of a parameter dl-DataToUL-ACK for the terminal to 1. In this case, DCI format 1_1 of a PDCCH to be monitored by the terminal may have a PDSCH-to-HARQ_feedback timing indicator of 0 bits.

In an embodiment in which a PDSCH-to-HARQ_feedback timing indicator is 0 bits, the network may set the number of entries of a parameter dl-DataToUL-ACK for the terminal to 1. In this case, a field for a PDSCH-to-HARQ_feedback timing indicator may not exist in DCI format 1_1 of a PDCCH to be monitored by the terminal. In this case, in determining a PUCCH transmission resource, a problem may occur in regard to how to process such DCI.

Figure 17B:
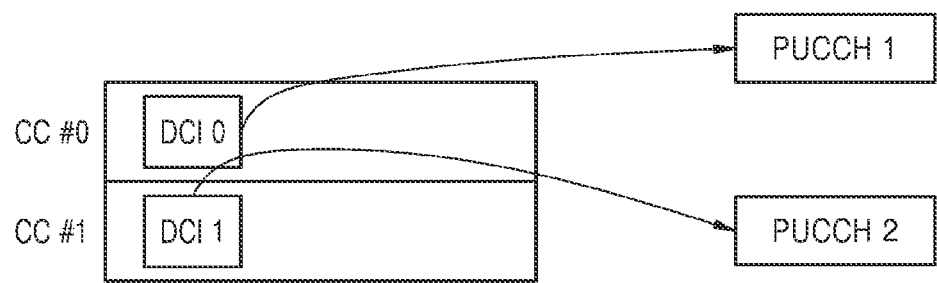
FIG. 17B is a diagram illustrating a DCI transmission process according to an embodiment of the present disclosure.

FIG. 17B is a diagram illustrating a DCI transmission process according to an embodiment. In detail, FIG. 17B illustrates a case where a plurality of serving cells are configured for a terminal, and DCI 0 and DCI 1 in which a field for a PDSCH-to-HARQ_feedback timing indicator does not exist are transmitted in the same PDCCH monitoring occasion of each serving cell. In this case, because a field for a PDSCH-to-HARQ_feedback timing indicator does not exist in DCI 0 and DCI 1, a problem may occur in that it is unable to determine a PUCCH resource by using the method described in Table above.

According to an embodiment, when the number of entries of a parameter dl-DataToUL-ACK configured by the network for the terminal is 1, the terminal or the BS may regard the configured one value of the parameter dl-DataToUL-ACK as the value of a PDSCH-to-HARQ_feedback timing indicator, and perform processing.

According to an embodiment, when a PDSCH-to-HARQ_feedback timing indicator is 0 bits, i.e., it does not actually exist, the terminal or the BS may perform processing under the assumption that a virtual PDSCH-to-HARQ_feedback timing indicator field exists. In addition, the terminal or the BS may process the value of the virtual PDSCH-to-HARQ_feedback timing indicator field as a particular value. According to an embodiment, the particular value may be a value designated through higher layer signaling (e.g., RRC signaling). According to an embodiment, the particular value may be processed as a value of a parameter dl-DataToUL-ACK designated through RRC signaling. According to an embodiment, when a field for a PDSCH-to-HARQ_feedback timing indicator does not actually exist in a process of determining a PUCCH transmission resource, the terminal and the BS may perform processing under the assumption that the value of dl-DataToUL-ACK designated through RRC signaling exists in a PDSCH-to-HARQ_feedback timing indicator field. According to an embodiment, a method of transmitting a UL control signal may be determined as follows:

> For a PUCCH transmission with HARQ-ACK information, a UE determines a PUCCH resource after determining a set of PUCCH resources for OUCI HARQ-ACK information bits, as described in Subclause 9.2.1. The PUCCH resource determination is based on a PUCCH resource indicator field [5, TS 38.212] in a last DCI format 1_0 or DCI format 1_1, among the DCI formats 1_0 or DCI formats 1_1 with a value of a PDSCH-to-HARQ_feedback timing indicator field, if present, or provided by dl-DataToUL-ACK indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes.

That is, through the above-described embodiments, even when a field for a PDSCH-to-HARQ_feedback timing indicator does not exist in DCI, the terminal may determine a PUCCH resource. For example, in the case of FIG. 17B, a transmission resource may be determined to be PUCCH 2 indicated by DCI 1 as in the above-described embodiment.

In determining a PUCCH transmission resource, a first control-channel element (CCE) index $n_{CCE,p}$ to which a PDCCH is mapped, a value of 'PUCCH resource indicator' field in DCI transmitted through the PDCCH, etc. may be used, and a slot in which a PUCCH is transmitted may be determined based on a value of a 'PDSCH-to-HARQ_feedback timing indicator' field. In this case, when the 'PDSCH-to-HARQ_feedback timing indicator' field does not exist in the DCI transmitted through the PDCCH, i.e., when the corresponding field is 0 bits, a problem may occur in that it is unable to determine the slot.

According to an embodiment, when the 'PDSCH-to-HARQ_feedback timing indicator' field does not exist, the terminal and the BS may assume that the corresponding field exists and use a value of a parameter dl-DataToUL-ACK designated through RRC signaling as the value of the corresponding field.

> For the first set of PUCCH resources and when the size $R_{PUCCH}$ of resourceList is larger than eight, when a UE provides HARQ-ACK information in a PUCCH transmission in response to detecting a last DCI format 1_0 or DCI format 1_1 in a PDCCH reception, among DCI formats 1_0 or DCI formats 1_1 with a value of the PDSCH-to-HARQ_feedback timing indicator field if present, or provided by dl-DataToUL-ACK indicating a same slot for the PUCCH transmission, the UE determines a PUCCH resource with index $r_{PUCCH}$, $0 \leq r_{PUCCH} \leq R_{PUCCH} - 1$, as $$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

where $N_{CCE,p}$ is a number of CCEs in CORESET p of the PDCCH reception for the DCI format 1_0 or DCI format 1_1 as described in Subclause 10.1, $n_{CCE,p}$ is the index of a first CCE for the PDCCH reception, and $\Delta_{PRI}$ is a value of the PUCCH resource indicator field in the DCI format 1_0 or DCI format 1_1.

The BS according to an embodiment may set a parameter pdsch-HARQ-ACK-Codebook to semi-static such that the terminal and the BS use a type-U HARQ-ACK codebook. In this case, a PDSCH-to-HARQ_feedback timing indicator field may be used to determine whether to map HARQ-ACK information or a NACK value to the values of respective bits constituting the type-1 HARQ-ACK codebook. In this case, when the corresponding field does not exist, a problem may occur in that it is unable to determine the values of the bits constituting the HARQ-ACK codebook.

According to an embodiment, when the 'PDSCH-to-HARQ_feedback timing indicator' field does not exist, the terminal and the BS may assume that the corresponding field exists, and use a value of a parameter dl-DataToUL-ACK designated through RRC signaling as the value of the corresponding field.

---

A UE reports HARQ-ACK information for a corresponding PDSCH reception or SPS PDSCH release only in a HARQ-ACK codebook that the UE transmits in a slot indicated by a value of a PDSCH-to-HARQ_feedback timing indicator field in a corresponding DCI format 1_0 or DCI format 1_1 or, for DCI format 1_1, provided by dl-DataToUL-ACK if the PDSCH-to-HARQ feedback timing indicator field is not present. The UE reports NACK value(s) for HARQ-ACK information bit(s) in a HARQ-ACK codebook that the UE transmits in a slot not indicated by a value of a PDSCH-to-HARQ_feedback timing indicator field in a corresponding DCI format 1_0 or DCI format 1_1 or, for DCI format 1_1, provided by dl-DataToUL-ACK if the PDSCH-to-HARQ_feedback timing indicator field is not present.

---

The terminal according to an embodiment may multiplex HARQ-ACK information, scheduling request (SR) information, and channel state information (CSI) through a PUCCH resource and transmit the result. In this case, the PUCCH resource may be determined through a value of a 'PUCCH resource indicator' field in the last piece of DCI having a value of a 'PDSCH-to-HARQ_feedback timing indicator' field. In this case, when the 'PDSCH-to-HARQ_feedback timing indicator' field does not exist, a problem may occur in that it is unable to determine the PUCCH resource.

According to an embodiment, when the 'PDSCH-to-HARQ_feedback timing indicator' field does not exist, the terminal and the BS may assume that the corresponding field exists, and use a value of a parameter dl-DataToUL-ACK designated through RRC signaling as the value of the corresponding field.

---

If a UE has HARQ-ACK, SR and wideband or sub-band CSI reports to transmit and the UE determines a PUCCH resource with PUCCH format 2, or the UE has HARQ-ACK, SR and wideband CSI reports [6, TS 38.214] to transmit and the UE determines a PUCCH resource with PUCCH format 3 or PUCCH format 4, where
the UE determines the PUCCH resource using the PUCCH resource indicator field [5, TS 38.212] in a last DCI format 1_0 or DCI format 1_1,
from DCI formats 1_0 or DCI formats 1_1 that have a value of a PDSCH-to-HARQ_feedback timing indicator field, if present, or provided by dl-DataToUL-ACK indicating a same slot for the PUCCH transmission, from a PUCCH resource set provided to the UE for HARQ-ACK transmission, and
the UE determines the PUCCH resource set as described in Subclause 9.2.1 and Subclause 9.2.3 for $O_{UCI}$ UCI bits
If a UE has HARQ-ACK, SR and sub-band CSI reports to transmit and the UE determines a PUCCH resource with PUCCH format 3 or PUCCH format 4, where
the UE determines the PUCCH resource using the PUCCH resource indicator field [5, TS 38.212] in a last DCI format 1_0 or DCI format 1_1, from DCI formats 1_0 or DCI formats 1_1 that have a value of a PDSCH-to-HARQ_feedback timing indicator field, if present, or provided by dl-DataToUL-ACK indicating a same slot for the PUCCH transmission, from a PUCCH resource set provided to the UE for HARQ-ACK transmission, and
the UE determines the PUCCH resource set as described in Subclause 9.2.1 and Subclause 9.2.3 for $O_{UCI}$ UCI bits

---

According to an embodiment, when the size of a PDSCH-to-HARQ_feedback timing indicator field in DCI is 0 bits, the terminal and the BS may perform processing under the assumption that the value of the PDSCH-to-HARQ_feedback timing indicator field is set to the value of dl-DataToUL-ACK.

---

If PDSCH-to-HARQ feedback timing indicator field is not present in a DCI format, a UE assumes that a value PDSCH-to-HARQ_feedback timing indicator field is provided by a value of dl-DataToUL-ACK.

---

When a plurality of serving cells are configured by the BS for the terminal according to an embodiment, the respective serving cell(s) may be activated through an activation command transmitted through a PDSCH. When the activation command is received in slot n, the terminal may apply the corresponding activation command after slot n+k. k may be calculated by $k_1 + 3 \cdot N_{slot}^{subframe, \mu} + 1$. Here, $\mu$ may denote a subcarrier spacing, and $N_{slot}^{subframe, \mu}$ may denote the number of slot per subframe for the subcarrier spacing $\mu$. In addition, $k_1$ may denote a value of a PDSCH-to-HARQ_feedback timing indicator field in DCI scheduling the PDSCH. A problem may occur in regard to how to deal with a case where the PDSCH-to-HARQ feedback timing indicator field does not exist in the DCI.

According to an embodiment, when a PDSCH-to-HARQ_feedback timing indicator field exists in DCI scheduling a PDSCH for transmitting an activation command of serving cell(s), the terminal and the BS may calculate $k = k_1 + 3 \cdot N_{slot}^{subframe, \mu} + 1$ by using the value of the field as $k_1$, and, when the PDSCH-to-HARQ_feedback timing indicator field does not exist, the terminal and the BS may calculate k by using the value of dl-DataToUL-ACK configured in a higher layer, e.g., an RRC layer.

With reference to slots for PUCCH transmissions, when a UE receives in a PDSCH an activation command [11, TS 38.321] for a secondary cell ending in slot n, the UE applies the corresponding actions in [11, TS 38.321] no later than the minimum requirement defined in [10, TS 38.133] and no earlier than slot n + k, except for the following:
the actions related to CSI reporting on a serving cell that is active in slot n + k
the actions related to the sCellDeactivationTimer associated with the secondary cell [11, TS 38.321] that the UE applies in slot n + k
the actions related to CSI reporting on a serving cell which is not active in slot n + k that the UE applies in the earliest slot after n + k in which the serving cell is active.
The value of k is $k_1 + 3 \cdot N_{slot}^{subframe, \mu} + 1$ where $k_1$ is a number of slots for a PUCCH transmission with HARQ-ACK information for the PDSCH reception and is indicated by the PDSCH-to-HARQ feedback timing indicator field in the DCI format scheduling the PDSCH reception or provided by dl-DataToUL-ACK if the PDSCH-to-HARQ feedback timing indicator field is not present in the DCI format as described in Subclause 9.2.3 and $N_{slot}^{subframe, \mu}$ is a number of slots per subframe for the SCS configuration μ of the PUCCH transmission.

Figure 17C:
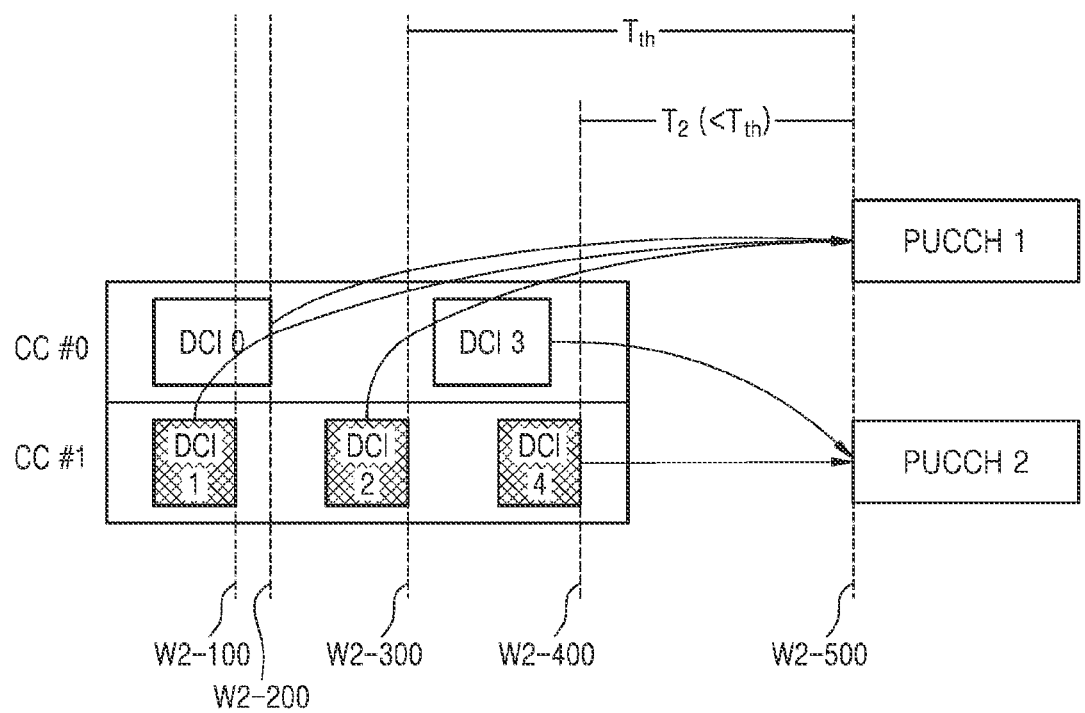
FIG. 17C is a diagram illustrating a method of indicating, by DCI, a PUCCH resource, according to an embodiment of the present disclosure.

FIG. 17C is a diagram illustrating a method of indicating, by DCI, a PUCCH resource, according to an embodiment. In more detail, FIG. 17C is a diagram illustrating a case where all pieces of DCI indicate PUCCH resources located in the same slot. When DCI 3 and DCI 4 are received at a timing that does not satisfy a processing time condition of the terminal (i.e., $T_{th} = N_1 \cdot (2048+144) \cdot \kappa \cdot 2^{-\mu} \cdot T_C$), DCI 3 and DCI 4 may be included in a set of a plurality of pieces of DCI, which are used for determining a PUCCH transmission resource for transmitting HARQ-ACK information. In this case, PUCCH resource 2 indicated by DCI 4 is used according to the rule in Table above, and, when DCI 3 and DCI 4 are not included in the set, PDCCH resource 1 indicated by DCI 2 may be used. According to Table above, it may not be clear which pieces of DCI are included in the set of the plurality of pieces of DCI, which are transmitted through PDCCHs and are used for determining the PUCCH transmission resource for transmitting the HARQ-ACK information, and thus it is necessary to clarify this.

According to an embodiment, all pieces of DCI indicating PUCCH resources located in the same slot may be included in a set of plurality of pieces of DCI, which are transmitted through PDCCHs and are used for determining a PUCCH transmission resource for transmitting HARQ-ACK information, regardless of a processing time condition of the terminal. That is, in the case of FIG. 17C, the distance, on the time axis, of a reception timing W2-400 of DCI 3 and DCI 4 from a start timing W2-500 of the first symbols of the PUCCH resources may be less than $N_3 \cdot (2048+144) \cdot \kappa \cdot 2^{-\mu} \cdot T_C$, however, in determining the PUCCH transmission resource, DCI3 and DCI 4 may be included and considered, and in this case, the PUCCH transmission resource may be determined to be PUCCH 2 indicated b dc DCI 4.

For a PUCCH transmission with HARQ-ACK information, a UE determines a PUCCH resource after determining a set of PUCCH resources for $O_{UCI}$ HARQ-ACK information bits, as described in Subclause 9.2.1. The PUCCH resource determination is based on a PUCCH resource indicator field [5, TS 38.212] in a last DCI format 1_0 or DCI format 1_1, among the DCI formats 1_0 or DCI formats 1_1 that have a value of a PDSCH-to-HARQ_feedback timing indicator field, if present, or provided by dl-DataToUL-ACK indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes, where the PDCCH receptions that includes detected DCI formats are not earlier than $N_3 \cdot$ (2048 + 144) $\cdot \kappa \cdot 2^{-\mu} \cdot T_C$ from the beginning of a first symbol of the first resource for PUCCH transmission in the slot where κ and $T_C$ are defined in subclause 4.1 of [4, TS 38.211] and μ corresponds to the smallest SCS configuration among the SCS configurations of the PDCCHs providing the DCI formats and the SCS configuration of the PUCCH. If processingType2Enabled of PDSCH-ServingCellConfig is set to enable for the serving cell with the second DCI format and for all serving cells with corresponding HARQ-ACK information multiplexed in the PUCCH transmission in the slot, $N_3 = 3$ for μ = 0, $N_3 = 4.5$ for μ = 1, $N_3 = 9$ for μ = 2; otherwise, $N_3 = 8$ for μ = 0, $N_3 = 10$ for μ = 1, $N_3 = 17$ for μ = 2, $N_3 = 20$ for μ = 3.

According to an embodiment, the processing time of the terminal may be considered in determining a PUCCH transmission resource. For example, the processing time of the terminal may be considered in determining the set of the plurality of pieces of DCI, which are transmitted through PDCCHs and are used for determining the PUCCH transmission resource. In the above-described embodiment, a PUCCH transmission resource in which a plurality of pieces of DCI included in 'the set of the plurality of pieces of DCI used for determining the PDCCH transmission resource' are transmitted may be located in advance of the beginning of the first symbol of the PUCCH transmission resource by at least a certain time period. In addition, the end of the last symbol of the PUCCH transmission resource in which the plurality of pieces of DCI included in 'the set of the plurality of pieces of DCI used for determining the PDCCH transmission resource' are transmitted may be located in advance of the beginning of the first symbol of the PUCCH transmission resource by at least a certain time period. A plurality of pieces of DCI transmitted through a PDCCH transmission resource that does not satisfy the above time condition may not be included in the set of the plurality of pieces of DCI used for determining the PUCCH transmission resource.

That is, in the case of FIG. 17C, the distances, on the time axis, of a reception timing W2-100 of DCI 0, a reception timing W2-200 of DCI 1, and a reception timing W2-300 of DCI 2, from the start timing W2-500 of the first symbols of the PUCCH resources are greater than or equal to $N_3 \cdot (2048+144) \cdot \kappa \cdot 2^{-\mu} \cdot T_C$, respectively, and thus, DCI 0, DCI 1, and DCI 2 may be included in the set, whereas, the distances, on the time axis, of the reception timing W2-400 of DCI 3 and the reception timing W2-400 of DCI 4, from the start timing W2-300 of the first symbols of the PUCCH resources are less than $N_3 \cdot (2048+144) \cdot \kappa \cdot 2^{-\mu} \cdot T_C$, respectively, DCI 3 and DCI 4 may not be included in the set. Referring to FIG. 17C, the PUCCH transmission resource may be determined to be a resource PDCCH 1 indicated by DCI 2, which is transmitted in the last PUCCH monitoring resource among DCI 0, DCI 1, and DCI 2 included in 'the set of the plurality of pieces of DCI used for determining the PUCCH transmission resource'.

According to an embodiment, when a plurality of pieces of DCI related to PUCCHs that are transmitted at the same timing are detected, the plurality of pieces of DCI may be first arranged in a serving cell index order. Then, the plurality of pieces of DCI may be arranged in a PDCCH monitoring occasion order. In this case, the terminal may expect that the reception of the PDCCHs carrying the plurality of pieces of DCIs is earlier than at least $N_3 \cdot (2048+144) \cdot \kappa \cdot 2^{-\mu} \cdot T_C$ from the beginning of the first symbol of the PUCCH resource. That is, the pieces of DCI, which satisfy the condition that the distance, on the time axis, between the start point of the first symbol of the PUCCH resource and the reception timing of the PDCCH is greater than at least $N_3 \cdot (2048+144) \cdot \kappa \cdot 2^{-\mu} \cdot T_C$, are arranged according to the arrangement rule, and the plurality of pieces of DCI, which do not satisfy the condition, may be ignored. Alternatively, the plurality of pieces of DCI, which satisfy the condition that the distance, on the time axis, between the start point of the first symbol of the PUCCH resource and the reception timing of the PDCCH is greater than or equal to at least $N_3 \cdot (2048+144) \cdot \kappa \cdot 2^{-\mu} \cdot T_C$, are arranged according to the arrangement rule, and the plurality of pieces of DCI, which do not satisfy the condition, may be ignored. κ may be equal to 64, which is a value obtained by dividing $T_s$ by $T_c$, and $T_s$ may be equal to $1/(\Delta f_{ref} \cdot N_{f,ref})$. Here, $\Delta f_{ref}$ may be $15 \cdot 10^3$ Hz, and $N_{f,ref}$ may be equal to 2048. $T_c$ may be equal to $1/(\Delta f_{max} \cdot N_f)$, where $\Delta f_{max}$ may be $480 \cdot 10^3$ Hz and $N_f$ may be equal to 4096. μ may correspond to the smallest value among the SCS configuration of the PDCCH providing the last piece of DCI and the SCS configuration of the PUCCH. $N_3$ may be determined by μ and processingType2Enabled in PDSCH-ServingCellConfig as shown in Table 15.

TABLE 15

|  | μ = 0 | μ = 1 | μ = 2 | μ = 3 |
|---|---|---|---|---|
| processingType2Enabled = 'enable' | 3 | 4.5 | 9 |  |
| processingType2Enabled = 'disable' | 8 | 10 | 17 | 20 |

For a PUCCH transmission with HARQ-ACK information, a UE determines a PUCCH resource after determining a set of PUCCH resources for $O_{UCI}$ HARQ-ACK information bits, as described in Subclause 9.2.1. The PUCCH resource determination is based on a PUCCH resource indicator field [5, TS 38.212] in a last DCI format 1_0 or DCI format 1_1, among the DCI formats 1_0 or DCI formats 1_1 that have a value of a PDSCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes. The UE expects that the PDCCH reception that includes the last DCI format is earlier than $N_3 \cdot (2048 + 144) \cdot \kappa \cdot 2^{-\mu} T_C$ from the beginning of a first symbol of the determined PUCCH resource in the slot where κ and $T_C$ are defined in subclause 4.1 of [4, TS 38.211] and μ corresponds to the smallest SCS configuration among the SCS configurations of the PDCCH providing the last DCI format and the SCS or of the PUCCH. If processingType2Enabled of PDSCH-ServingCellConfig is set to enable for the serving cell with the last DCI format and for all serving cells with corresponding HARQ-ACK information multiplexed in the PUCCH transmission in the slot, $N_3$ = 3 for μ = 0, $N_3$ = 4.5 for μ = 1, $N_3$ = 9 for μ = 2; otherwise, $N_3$ = 8 for μ = 0 , $N_3$ = 10 for μ = 1, $N_3$ = 17 for μ = 2, $N_3$ = 20 for μ = 3.

Figure 18:
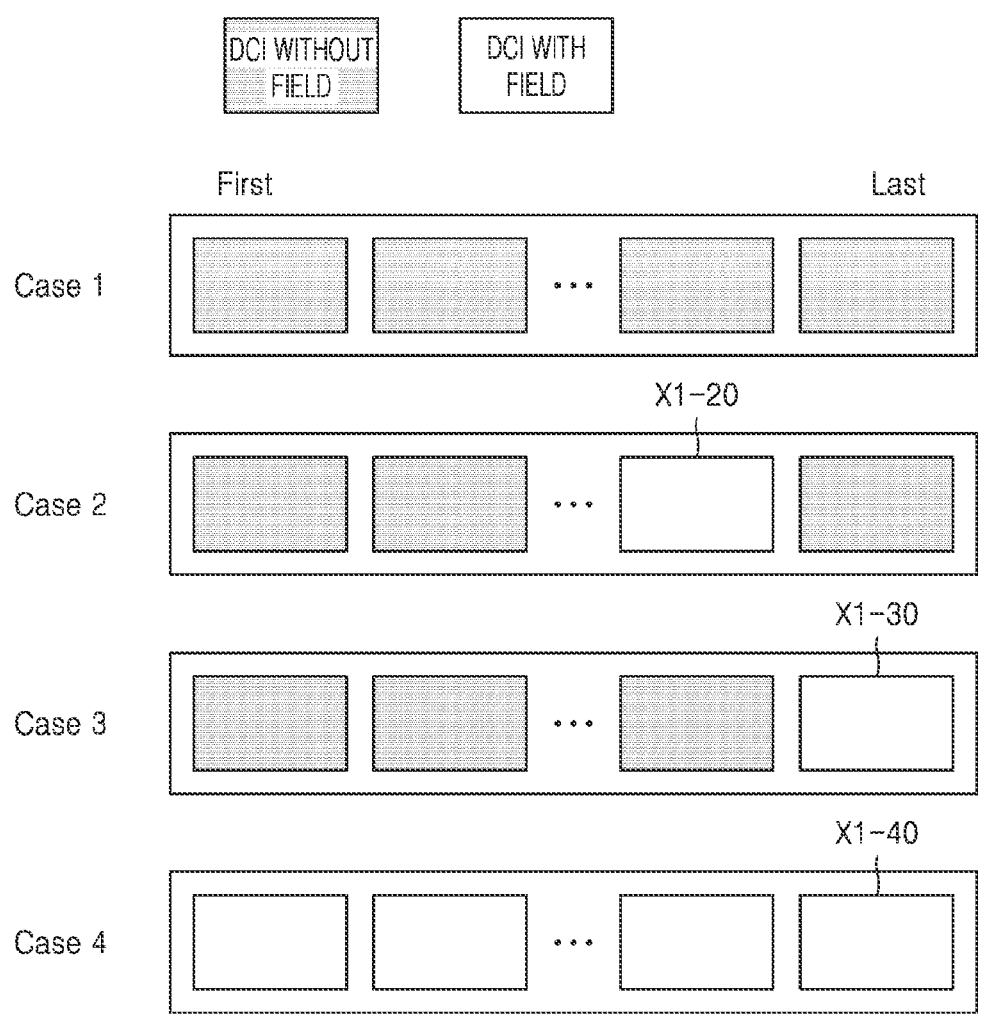
FIG. 18 is a diagram for describing a method of arranging a plurality of pieces of DCI indicating PUCCH transmission at the same timing, according to an embodiment of the present disclosure.

FIG. 18 is a diagram for describing a method of arranging a plurality of pieces of DCI indicating PUCCH transmission at the same timing, according to an embodiment of the present disclosure. Referring to FIG. 18, the plurality of pieces of DCI indicating PUCCH transmission at the same timing may be initially arranged in a serving cell index order, and then arranged in a PDCCH monitoring occasion order. For example, as illustrated in FIG. 18, there may be a case where a PDSCH-to-HARQ_feedback timing indicator field does not exist in all of the pieces of DCI, a case where a PDSCH-to-HARQ_feedback timing indicator field does not exist in the last piece of DCI after the arrangement, a case where a PDSCH-to-HARQ_feedback timing indicator exists in the last piece of DCI after the arrangement, and a case where a PDSCH-to-HARQ_feedback timing indicator exists in all of the pieces of DCI. According to an embodiment, the terminal uses a PUCCH resource indicated by the last one of DCI format 1_0 or DCI format 1_1 having a value of a PDSCH-to-HARQ_feedback timing indicator. Accordingly, because there is no such DCI in Case 1, the terminal is unable to determine the PUCCH resource. Meanwhile, in Case 2, the terminal may use a PUCCH resource indicated by DCI corresponding to X1-20, in Case 3, the terminal may use a PUCCH resource indicated by DCI corresponding to X1-30, and in Case 4, the terminal may use a PUCCH resource indicated by DCI corresponding to X1-40. DCI used for determining a PUCCH resource may not exist or may be changed according to a DCI format for scheduling a PDSCH or an order of DCI arrangement, and accordingly, the complexity of the terminal and the BS may increase.

Figure 19:
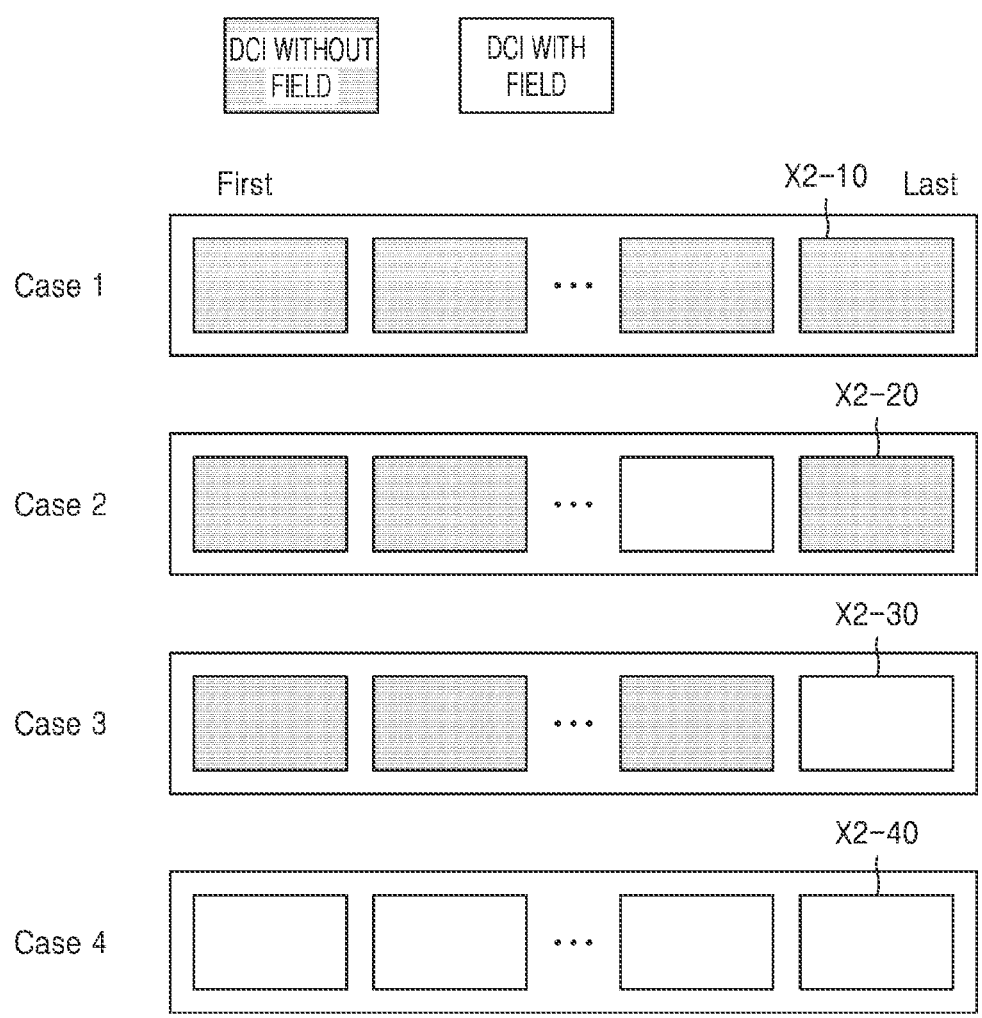
FIG. 19 is a diagram for describing a method of arranging a plurality of pieces of DCI indicating PUCCH transmission at the same timing, according to an embodiment of the present disclosure.

FIG. 19 is a diagram for describing a method of arranging a plurality of pieces of DCI indicating PUCCH transmission at the same timing, according to an embodiment of the present disclosure. Referring to FIG. 19, the method described with reference to FIG. 18 may be improved. According to the method described with reference to FIG. 19, the plurality of pieces of DCI indicating PUCCH transmission at the same timing may be initially arranged in a serving cell index order, and then arranged in a PDCCH monitoring occasion order. Thereafter, the last piece of DCI among the arranged plurality of pieces of DCI described above may be used for determining the PUCCH resource regardless of whether a PDSCH-to-HARQ_feedback timing indicator field exists in the last piece of DCI. That is, regardless of DCI formats for scheduling PDSCHs or an order of DCI arrangement, the last pieces of DCI X2-10, X2-20, X2-30, and X2-40 after the arrangement may be used for determining PUCCH transmission resources, respectively.

Figure 20A:
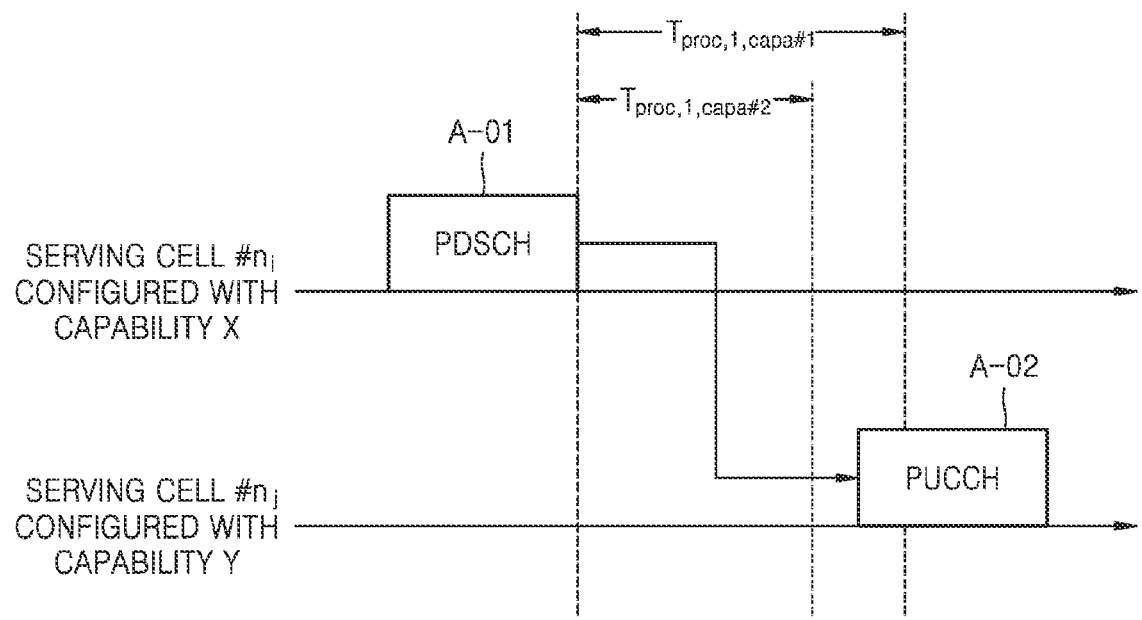
FIG. 20A is a diagram illustrating a method of determining a processing time of a terminal in a situation where a plurality of cells are configured, according to an embodiment of the present disclosure.

FIG. 20A is a diagram illustrating a method of determining a processing time of a terminal in a situation where a plurality of cells are configured, according to an embodiment of the present disclosure.

In an embodiment, a processing capability may be configured for each serving cell in the terminal. When a plurality of serving cells are configured in the terminal, the processing times configured for the respective serving cells may be equal to or different from each other.

In a cross-carrier scheduling situation, when the processing capabilities configured for a scheduling cell and a scheduled cell through higher layer signaling (e.g., RRC signaling) are different from each other, a mutual understanding between the terminal and the BS may be required in relation to various operations.

For example, when the processing capabilities of a 'serving cell for transmitting a PDSCH' and a 'serving cell for transmitting a PUCCH for informing of success or failure of reception of the PDSCH' are set to be different from each other, it may be necessary to understand a 'PDSCH processing procedure time'. In addition, when the processing capabilities of a 'serving cell for transmitting a PDCCH' and a 'cell for transmitting a PUSCH' are set to be different from each other, it may be necessary to understand a 'PUSCH preparation procedure time'. When the terminal and the BS understand the above concepts unclearly or differently from each other, problems may occur in relation to 'HARQ-ACK feedback delivery', 'PUSCH transmission', and the like.

According to an embodiment, the terminal and the BS may understand and operate based on, among two different configured capabilities, the capability configured for a particular one cell.

According to an embodiment, when a plurality of serving cells are configured by the BS and different processing capabilities are configured for the respective serving cells, the terminal may understand that a serving cell including a UL transmission carrier is configured to have the same processing capability as that of a serving cell including a DL transmission carrier.

According to an embodiment, when a plurality of serving cells are configured by the BS and different processing capabilities are configured for the respective serving cells, the terminal may understand that, in a cross-carrier scheduling situation, a serving cell including a UL transmission carrier is configured to have the same processing capability as that of a serving cell including a DL transmission carrier.

According to an embodiment, when a plurality of serving cells are configured by the BS and different processing capabilities are configured for the respective serving cells, the terminal may understand that a serving cell including a DL transmission carrier is configured to have the same processing capability as that of a serving cell including a UL transmission carrier.

According to an embodiment, when a plurality of serving cells are configured by the BS and different processing capabilities are configured for the respective serving cells, the terminal may understand that, in a cross-carrier scheduling situation, a serving cell including a DL transmission carrier is configured to have the same processing capability as that of a serving cell including a UL transmission carrier.

According to an embodiment, when a plurality of serving cells are configured by the BS and different processing capabilities are configured for the respective serving cells, the terminal may understand that all of the serving cells are configured to have a high (fast) processing capability.

According to an embodiment, when a plurality of serving cells are configured by the BS and different processing capabilities are configured for the respective serving cells, the terminal may understand that, in a cross-carrier scheduling situation, all of the serving cells are configured to have a high (fast) processing capability.

According to an embodiment, when a plurality of serving cells are configured by the BS and different processing capabilities are configured for the respective serving cells, the terminal may understand that all of the serving cells are configured to have a low (slow) processing capability.

According to an embodiment, when a plurality of serving cells are configured by the BS and different processing capabilities are configured for the respective serving cells, the terminal may understand that, in a cross-carrier scheduling situation, all of the serving cells are configured to have a low (slow) processing capability.

According to an embodiment, when a plurality of serving cells are configured by the BS and different processing capabilities are configured for the respective serving cells, the terminal may understand that serving cells associated with particular scheduling (e.g., a serving cell in which PDCCH transmission is performed, a serving cell in which PDSCH transmission is performed, a serving cell in which PUCCH transmission is performed, and a serving cell in which PUSCH transmission is performed) are configured to have a high (fast) processing capability among those of the serving cells associated with the specific scheduling.

According to an embodiment, when a plurality of serving cells are configured by the BS and different processing capabilities are configured for the respective serving cells, the terminal may understand that, in a cross-carrier scheduling situation, serving cells associated with the scheduling (e.g., a serving cell in which PDCCH transmission is performed, a serving cell in which PDSCH transmission is performed, a serving cell in which PUCCH transmission is performed, and a serving cell in which PUSCH transmission is performed) are configured to have a high (fast) processing capability among those of the serving cells associated with the specific scheduling.

According to an embodiment, when a plurality of serving cells are configured by the BS and different processing capabilities are configured for the respective serving cells, the terminal may understand that serving cells associated with particular scheduling (e.g., a serving cell in which PDCCH transmission is performed, a serving cell in which PDSCH transmission is performed, a serving cell in which PUCCH transmission is performed, and a serving cell in which PUSCH transmission is performed) are configured to have a low (slow) processing capability among those of the serving cells associated with the specific scheduling.

According to an embodiment, when a plurality of serving cells are configured by the BS and different processing capabilities are configured for the respective serving cells, the terminal may understand that, in a cross-carrier scheduling situation, serving cells associated with the scheduling (e.g., a serving cell in which PDCCH transmission is performed, a serving cell in which PDSCH transmission is performed, a serving cell in which PUCCH transmission is performed, and a serving cell in which PUSCH transmission is performed) are configured to have a low (slow) processing capability among those of the serving cells associated with the specific scheduling.

According to an embodiment, when configuring a plurality of serving cells in the terminal, the BS may configure the same processing capability for the respective serving cells in the terminal.

According to an embodiment, when a plurality of serving cells are configured by the BS, the terminal may not expect that the serving cells are configured to have different processing capabilities, respectively. When different processing capabilities are configured, the terminal may regard this as an error case.

According to an embodiment, when a plurality of serving cells are configured by the BS and different processing capabilities are configured for the respective serving cells, the terminal may understand that the capability configured for one particular cell is configured for all of the serving cells. For example, the terminal may understand that the capability configured for a primary cell (PCell) or a primary secondary cell (PSCell) is configured for all of the serving cells.

As illustrated in FIG. 20A, a plurality of serving cells $n_i$ and $n_j$ may be configured for a terminal by a BS, and different processing capabilities X and Y may be configured for the respective serving cells. The terminal may receive a PDSCH A-01 in the serving cell $n_i$, and transmit HARQ-ACK feedback regarding success or failure of transmission of the PDSCH through a PUCCH A-02 in the serving cell $n_j$. As described above with reference to the above-described various embodiments, when the distance, on the time axis, between the PDSCH A-01 and the PUCCH A-02 is greater than or equal to a particular value (e.g., $T_{proc,1}$), a valid HARQ-ACK may be transmitted. $T_{proc,1}$ may be defined according to Equation 2, and $N_1$ may be a value as shown in Table 11 or Table 11-1 according to the PDSCH processing capability of the terminal. Assuming that the terminal has PDSCH processing capability 2 for HARQ-ACK transmission with respect to the PDSCH A-01, the terminal may transmit a valid HARQ-ACK through the PUCCH A-02, and, assuming that the terminal has PDSCH processing capability 2, the terminal may not transmit a valid HARQ-ACK through the PUCCH A-02. Accordingly, a clear understanding between the BS and the terminal may be required regarding this aspect. According to one embodiment, FIG. 20A illustrates a PDSCH processing procedure time.

The following embodiments are applicable to a situation in which the processing capabilities configured for at least two of a cell for transmitting a PDCCH, a cell for transmitting a PDSCH, and a cell for transmitting a PUCCH are different from each other. Also, the following embodiments are applicable to a situation in which the processing capabilities configured for at least two of a cell for transmitting a PDCCH, a cell for transmitting a PDSCH, and a cell for transmitting HARQ-ACK information are different from each other. The terminal and the BS operate by at least one of the following methods:

Method A-1: According to an embodiment, when a cell for transmitting a PDSCH and a cell for transmitting a PUCCH are configured to have different processing capabilities, the terminal and the BS may calculate or set $T_{proc,1}$ based on the processing capability associated with the cell for transmitting a PDSCH.

Method A-2: According to an embodiment, when the cell for transmitting a PDSCH and the cell for transmitting a PUCCH are configured to have different processing capabilities, $T_{proc,1}$ may be calculated or set based on a particular processing capability, e.g., processing capability 1.

Method A-3: According to an embodiment, the BS may configure the cell for transmitting a PDSCH and the cell for transmitting a PUCCH to have the same processing capability.

Method A-4: According to an embodiment, the terminal may not expect that the cell for transmitting a PDSCH and the cell for transmitting a PUCCH are configured to have different processing capabilities.

Method A-5: According to an embodiment, when the cell for transmitting a PDCCH, the cell for transmitting a PDSCH, and cells for transmitting HARQ-ACK information are not configured to have the same processing capability, the terminal and the BS may calculate or set $T_{proc,1}$ based on a particular processing capability, e.g., processing capability 1.

Method A-6: According to an embodiment, when the cell for transmitting a PDCCH, the cell for transmitting a PDSCH, and the cells for transmitting HARQ-ACK information are not configured to have the same processing capability, the terminal and the BS may calculate or set $T_{proc,1}$ based on a particular processing capability, e.g., processing capability 2.

Method A-7: According to an embodiment, when the cell for transmitting a PDCCH, the cell for transmitting a PDSCH, and the cells for transmitting HARQ-ACK information are not configured to have the same processing capability, the terminal and the BS may calculate or set $T_{proc,1}$ based on the processing capability associated with the cell for transmitting a PDSCH.

Method A-8: According to an embodiment, when the cell for transmitting a PDCCH, the cell for transmitting a PDSCH, and the cells for transmitting HARQ-ACK information are not configured to have the same processing capability, the terminal and the BS may calculate or set $T_{proc,1}$ based on the processing capability associated with the cell for transmitting HARQ-ACK information.

Method A-9: According to an embodiment, the BS may configure, for the terminal, the cell for transmitting a PDCCH, the cell for transmitting a PDSCH, and the cell for transmitting a PUCCH to have the same processing capability.

Method A-10: According to an embodiment, the terminal may not expect that at least two of the cell for transmitting a PDCCH, the cell for transmitting a PDSCH, and the cell for transmitting a PUCCH are configured to have different processing capabilities. When such a situation occurs, the terminal regards this as an error case.

Alternatively, the terminal may operate with at least one option in Table AA below. The BS may understand that the terminal operates with the at least one option in Table AA and operate according thereto.

TABLE AA 5.3 UE PDSCH processing procedure time

If the first uplink symbol of the PUCCH which carries the HARQ-ACK information, as defined by the assigned HARQ-ACK timing Ky and the PUCCH resource to be used and including the effect of the timing advance, starts no earlier than at symbol $L_1$, where $L_1$ is defined as the next uplink symbol with its CP starting after $T_{proc,1} = (N_1 + d_{1,1})(2048 + 144) \cdot \kappa 2^{-\mu} \cdot T_C$ after the end of the last symbol of the PDSCH carrying the TB being acknowledged, then the UE shall provide a valid HARQ-ACK message.

- $N_1$ is based on $\mu$ of table 5.3-1 and table 5.3-2 for UE processing capability 1 and 2 respectively, where $\mu$ corresponds to the one of ($\mu_{PDCCH}$, $\mu_{PDSCH}$, $\mu_{UL}$) resulting with the largest $T_{proc,1}$, where the $\mu_{PDCCH}$ corresponds to the subcarrier spacing of the PDCCH scheduling the PDSCH, the $\mu_{PDSCH}$ corresponds to the subcarrier spacing of the scheduled PDSCH, and $\mu_{UL}$ corresponds to the subcarrier spacing of the uplink channel with which the HARQ-ACK is to be transmitted, and $\kappa$ is defined in subclause 4.1 of [4, TS 38.211].
- If the PDSCH DM-RS position $l_1$ for the additional DM-RS in Table 7.4.1.1.2-3 in subclause 7.4.1.1.2 of [4, TS 38.211] is $l_1 = 12$ then $N_{1,0}=14$ in Table 5.3-1, otherwise $N_{1,0}=13$.
- If the UE is configured with multiple active component carriers, the first uplink symbol which carries the HARQ-ACK information further includes the effect of timing difference between the component carriers as given in [11, TS 38.133].
- For the PDSCH mapping type A as given in subclause 7.4.1.1 of [4, TS 38.211]: if the last symbol of PDSCH is on the i-th symbol of the slot where i < 7, then $d_{1,1} = 7 - i$, otherwise $d_{1,1} = 0$ TABLE AA-continued

- For UE processing capability 1: If the PDSCH is mapping type B as given in subclause 7.4.1.1 of [4, TS 38.211], and
  - if the number of PDSCH symbols allocated is 7, then $d_{1,1} = 0$,
  - if the number of PDSCH symbols allocated is 4, then $d_{1,1} = 3$
  - if the number of PDSCH symbols allocated is 2, then $d_{1,1} = 3+d$, where d is the number of overlapping symbols of the scheduling PDCCH and the scheduled PDSCH.
- For UE processing capability 2: If the PDSCH is mapping type B as given in subclause 7.4.1.1 of [4, TS 38.211],
  - if the number of PDSCH symbols allocated is 7, then $d_{1,1} = 0$,
  - if the number of PDSCH symbols allocated is 4, then $d_{1,1}$ is the number of overlapping symbols of the scheduling PDCCH and the scheduled PDSCH,
  - if the number of PDSCH symbols allocated is 2,
    - if the scheduling PDCCH was in a 3-symbol CORESET and the CORESET and the PDSCH had the same starting symbol, then $d_{1,1} = 3$,
    - otherwise $d_{1,1}$ is the number of overlapping symbols of the scheduling PDCCH and the scheduled PDSCH.
- For UE processing capability 2 with scheduling limitation when $\mu_{PDSCH} = 1$, if the scheduled RB allocation exceeds 136 RBs, the UE defaults to capability 1 processing time. The UE may skip decoding a number of PDSCHs with last symbol within 10 symbols before the start of a PDSCH that is scheduled to follow Capability 2, if any of those PDSCHs are scheduled with more than 136 RBs with 30kHz SCS and following Capability 1 processing time.
- For a UE that supports capability 2 on a given cell, the processing time according to UE processing capability 2 is applied if the high layer parameter processingType2Enabled in PDSCH-ServingCellConfig is configured for the cell and set to enable.
- If this PUCCH resource is overlapping with another PUCCH or PUSCH resource, then HARQ-ACK is multiplexed following the procedure in subclause 9.2.5 of [9, TS 38.213], otherwise the HARQ-ACK message is transmitted on PUCCH.

For a cell for PDSCH transmission and a cell for HARQ-ACK transmission are different,
- (option a-1) If a cell for PDSCH transmission and a cell for HARQ-ACK transmission are configured to have different processing capabilities, a UE assumes to follows the processing time capability configured in a cell for PDSCH transmissison.
- (option a-2) If a cell for PDSCH transmission and a cell for HARQ-ACK transmission are configured to have different processing capabilities, a UE assumes to follows the processing time capability configured in a cell for HARQ-ACK transmissison.
- (option a-3) If a cell for PDSCH transmission and a cell for HARQ-ACK transmission are configured to have different processing capabilities, a UE assumes to follows the processing time capability 1.
- (option a-4) If a cell for PDSCH transmission and a cell for HARQ-ACK transmission are configured to have different processing capabilities, a UE assumes to follows the processing time capability 2.
- (option a-5) UE does not assume that a cell for PDSCH transmission and a cell for HARQ-ACK transmission are configured to have different processing capabilities.
- (option a-6) If a cell for PDCCH transmission and a cell for PDSCH transmission and a cell for HARQ-ACK transmission are not configured to have same processing capability, a UE assumes to follows the processing time capability 1.
- (option a-7) If a cell for PDCCH transmission and a cell for PDSCH transmission and a cell for HARQ-ACK transmission are not configured to have same processing capability, a UE assumes to follows the processing time capability 2.
- (option a-8) UE does not assume that a cell for PDCCH transmission and a cell for PDSCH transmission and a cell for HARQ-ACK transmission are not configured to have same processing capability.

Otherwise the UE may not provide a valid HARQ-ACK corresponding to the scheduled PDSCH. The value of $T_{proc,1}$ is used both in the case of normal and extended cyclic prefix.

Table 5.3-1: PDSCH processing time for PDSCH processing capability 1

| | PDSCH decoding time $N_1$ [symbols] | |
|---|---|---|
| $\mu$ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

TABLE AA-continued

Table 5.3-2: PDSCH processing time for PDSCH processing capability 2

| μ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

Figure 20B:
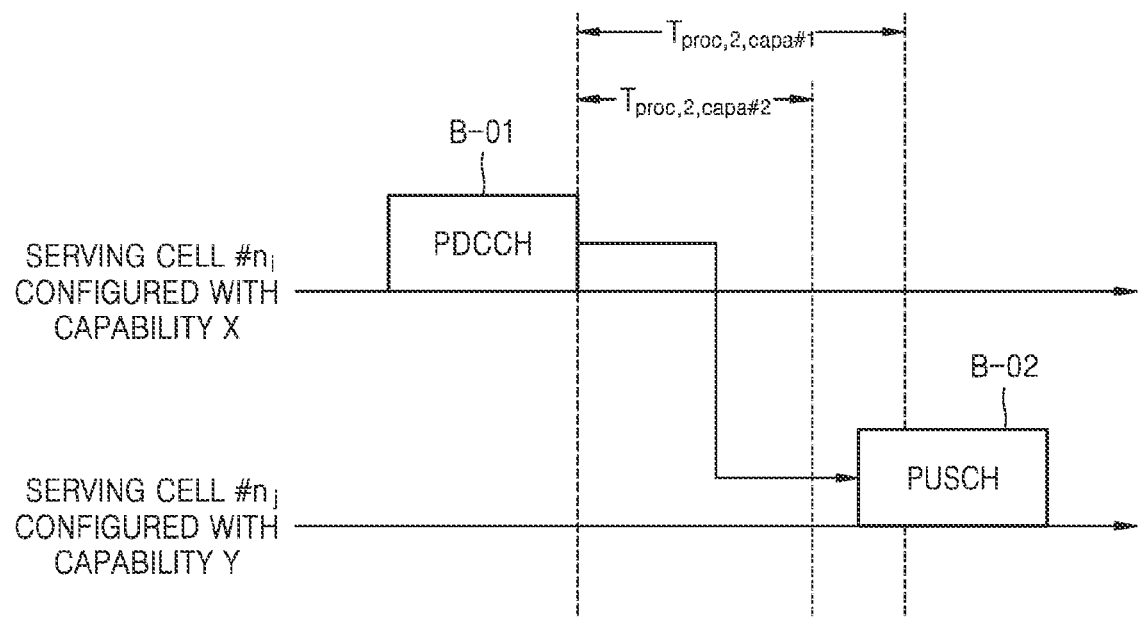
FIG. 20B is a diagram illustrating a method of determining a processing time of a terminal in a situation where a plurality of cells are configured, according to an embodiment of the present disclosure.

FIG. 20B is a diagram illustrating a method of determining a processing time of a terminal in a situation where a plurality of cells are configured, according to an embodiment of the present disclosure.

As illustrated in FIG. 20B, a plurality of serving cells $n_i$ and $n_j$ may be configured for the terminal by a BS, and different processing capabilities X and Y may be configured for the respective serving cells. The terminal may receive a PDCCH B-01 in the serving cell $n_i$ and transmit UL data through a PUSCH B-02 in the serving cell $n_j$. As described above with reference to the above-described various embodiments, when the distance, on the time axis, between the PDCCH B-01 and the PUSCH B-02 is greater than or equal to a particular value (e.g., $T_{proc,2}$), the PUSCH may be transmitted. $T_{proc,2}$ may be defined according to Equation 3, and $N_2$ may be a value as shown in Table 12 or Table 12-1 according to the PDSCH timing capability of the terminal. Assuming that the terminal has PUSCH timing capability 2 for PUSCH transmission by the PDCCH B-01, the terminal may transmit the PUSCH B-02, and, assuming that the terminal has PUSCH timing capability 1, the terminal may not transmit the PUSCH. Accordingly, a clear understanding between the BS and the terminal may be required regarding this aspect. In an embodiment, FIG. 20B illustrates a PUSCH preparation procedure time.

The following embodiments are applicable to a situation in which the processing capabilities configured for a cell for transmitting a PDCCH and a cell for transmitting a PUSCH are different from each other. The terminal and the BS operate by at least one of the following methods:

Method B-1: According to an embodiment, when the cell for transmitting a PDCCH and the cell for transmitting a PUSCH are configured to have different processing capabilities, and cross-carrier scheduling is used, the terminal and the BS may calculate or set $T_{proc,2}$ based on the processing capability associated with the cell for transmitting a PDCCH.

Method B-2: According to an embodiment, when the cell for transmitting a PDCCH and the cell for transmitting a PUSCH are configured to have different processing capabilities, and cross-carrier scheduling is used, the terminal and the BS may calculate or set $T_{proc,2}$ based on the processing capability associated with the cell for transmitting a PUSCH.

Method B-3: According to an embodiment, when the cell for transmitting a PDCCH and the cell for transmitting a PUSCH are configured to have different processing capabilities, and cross-carrier scheduling is used, $T_{proc,2}$ may be calculated or set based on a particular processing capability, e.g., processing capability 1.

Method B-4: According to an embodiment, when the cell for transmitting a PDCCH and the cell for transmitting a PUSCH are configured to have different processing capabilities, and cross-carrier scheduling is used, $T_{proc,2}$ may be calculated or set based on a particular processing capability, e.g., processing capability 2.

Method B-5: According to an embodiment, the BS may configure the cell for transmitting a PDCCH and the cell for transmitting a PUSCH to have the same processing capability.

Method B-6: According to an embodiment, the terminal may not expect to configure the cell for transmitting a PDCCH and the cell for transmitting a PUSCH to have different processing capabilities. When such a situation occurs, the terminal regards this as an error case.

Alternatively, the terminal may operate with at least one option in Table BB below. The BS may understand that the terminal operates with the at least one option in Table BB and operate according thereto.

TABLE BB 6.4 UE PUSCH preparation procedure time
If the first uplink symbol in the PUSCH allocation for a transport block, including the DM-RS, as defined by the slot offset $K_2$ and the start and length indicator SLIV of the scheduling DCI and including the effect of the timing advance, is no earlier than at symbol $L_2$, where $L_2$ is defined as the next uplink symbol with its CP starting $T_{proc,2} = \max((N_2 + d_{2,1})(2048 + 144) \cdot \kappa 2^{-\mu} \cdot T_C, d_{2,2})$ after the end of the reception of the last symbol of the PDCCH carrying the DCI scheduling the PUSCH, then the UE shall transmit the transport block.
 - $N_2$ is based on μ of Table 6.4-1 and Table 6.4-2 for UE processing capability 1 and 2 respectively, where μ corresponds to the one of ($μ_{DL}$, $μ_{UL}$) resulting with the largest $T_{proc,2}$, where the $μ_{DL}$ corresponds to the subcarrier spacing of the downlink with which the PDCCH carrying the DCI scheduling the PUSCH was transmitted and $μ_{UL}$ corresponds to the subcarrier spacing of the uplink channel with which the PUSCH is to be transmitted, and κ is defined in subclause 4.1 of [4, TS 38.211].
 - If the first symbol of the PUSCH allocation consists of DM-RS only, then $d_{2,1}= 0$, otherwise $d_{2,1}= 1$.
 - If the UE is configured with multiple active component carriers, the first uplink symbol in the PUSCH allocation further includes the effect of timing difference between component carriers as given in [11, TS 38.133].
 - If the scheduling DCI triggered a switch of BWP, $d_{2,2}$ equals to the switching time as defined in [11, TS 38.133], otherwise $d_{2,2}=0$.

TABLE BB-continued

- For a UE that supports capability 2 on a given cell, the processing time according to UE processing capability 2 is applied if the high layer parameter processingType2Enabled in PUSCH-ServingCellConfig is configured for the cell and set to enable,
- If the PUSCH indicated by the DCI is overlapping with one or more PUCCH channels, then the transport block is multiplexed following the procedure in subclause 9.2.5 of [9, TS 38.213], otherwise the transport block is transmitted on the PUSCH indicated by the DCI.

For a cell for PDCCH transmission and a cell for PUSCH transmission are different,
- (option b-1) For cross-carrier scheduling, if a cell for PDCCH transmission and a cell for PUSCH transmission are configured to have different processing time capabilities, a UE assumes to follow processing time capability configured in a cell for PDCCH transmission.
- (option b-2) For cross-carrier scheduling, if a cell for PDCCH transmission and a cell for PUSCH transmission are configured to have different processing time capabilities, a UE assumes to follow processing time capability configured in a cell for PUSCH transmission.
- (option b-3) For cross-carrier scheduling, if a cell for PDCCH transmission and a cell for PUSCH transmission are configured to have different processing time capabilities, a UE assumes to follow processing time capability 1
- (option b-4) For cross-carrier scheduling, if a cell for PDCCH transmission and a cell for PUSCH transmission are configured to have different processing time capabilities, a UE assumes to follow processing time capability 2
- (option b-5) For cross-carrier scheduling, a UE does not assume that a cell for PDCCH transmission and a cell for PUSCH transmission are configured to have different processing time capabilities.

Otherwise the UE may ignore the scheduling DCI.
The value of $T_{proc,2}$ is used both in the case of normal and extended cyclic prefix.

Table 6.4-1: PUSCH preparation time for PUSCH timing capability 1

| μ | PUSCH preparation time $N_2$ [symbols] |
|---|---|
| 0 | 10 |
| 1 | 12 |
| 2 | 23 |
| 3 | 36 |

Table 6.4-2: PUSCH preparation time for PUSCH timing capability 2

| μ | PUSCH preparation time $N_2$ [symbols] |
|---|---|
| 0 | 5 |
| 1 | 5.5 |
| 2 | 11 for frequency range 1 |

The BS may configure DL SPS for a serving cell through SPS-Config, set a particular bitfield(s) of DCI to a particular value(s), scramble a CRC with a configured scheduling RNTI (CS-RNTI), and transmit the scrambled CRC through a PDCCH to transmit a DL SPS activation command or release command to the terminal. The terminal may transmit a HARQ-ACK with respect to the 'SPS release command' after N symbols from the end of the last symbol of the PDCCH providing the SPS release command. Here, N may be given according to the processing capability of the terminal and a subcarrier spacing as shown in Table 16.

TABLE 16

| Subcarrier spacing | N terminal processing capability 1 | N terminal processing capability 2 |
|---|---|---|
| 15 kHZ | 10 | 5 |
| 30 kHz | 12 | 5.5 |
| 60 kHZ | 22 | 11 |
| 120 kHz | 25 | |

Figure 20C:
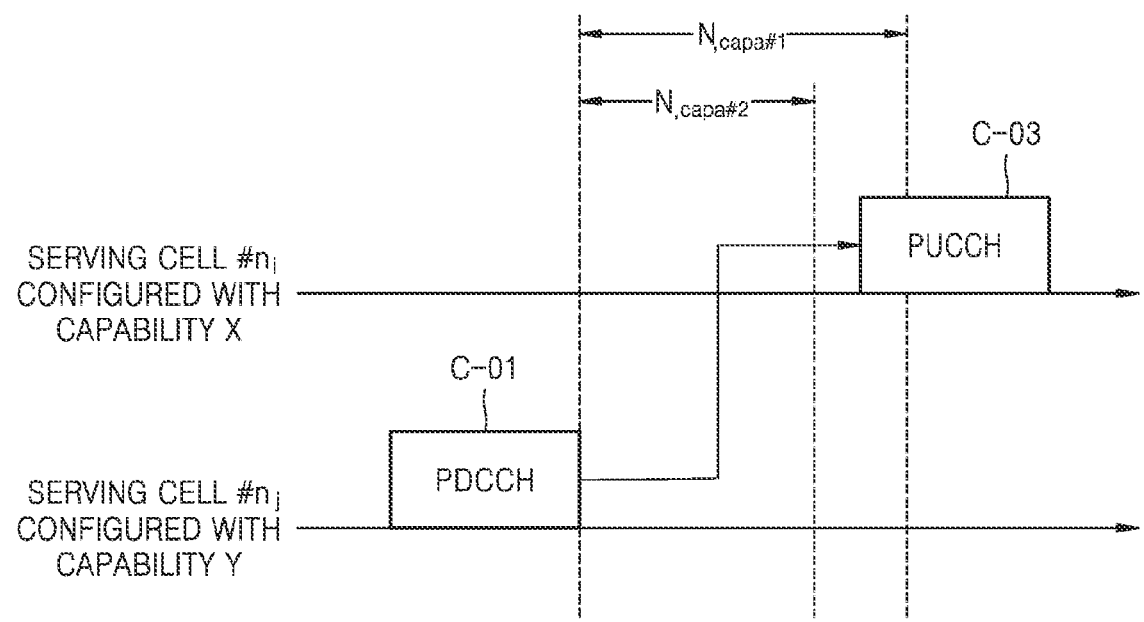
FIG. 20C is a diagram illustrating a method of determining a processing time of a terminal in a situation where a plurality of cells are configured, according to an embodiment of the present disclosure.

As illustrated in FIG. 20C, a plurality of serving cells $n_i$ and $n_j$ may be configured for a terminal by a BS, and different processing capabilities X and Y may be configured for the respective serving cells. The terminal may receive a PDCCH C-01 including an SPS release command in the serving cell $n_i$, and transmit a HARQ-ACK with respect thereto after N symbols. Assuming that the terminal has processing capability 1, a PUCCH C-03 may not be transmitted, and, assuming that the terminal has processing capability 2, the PUCCH C-03 may be transmitted. Accordingly, a clear understanding between the BS and the terminal may be required regarding this aspect. According to an embodiment, FIG. 20C illustrates SPS release command HARQ-ACK 1.

Figure 20D:
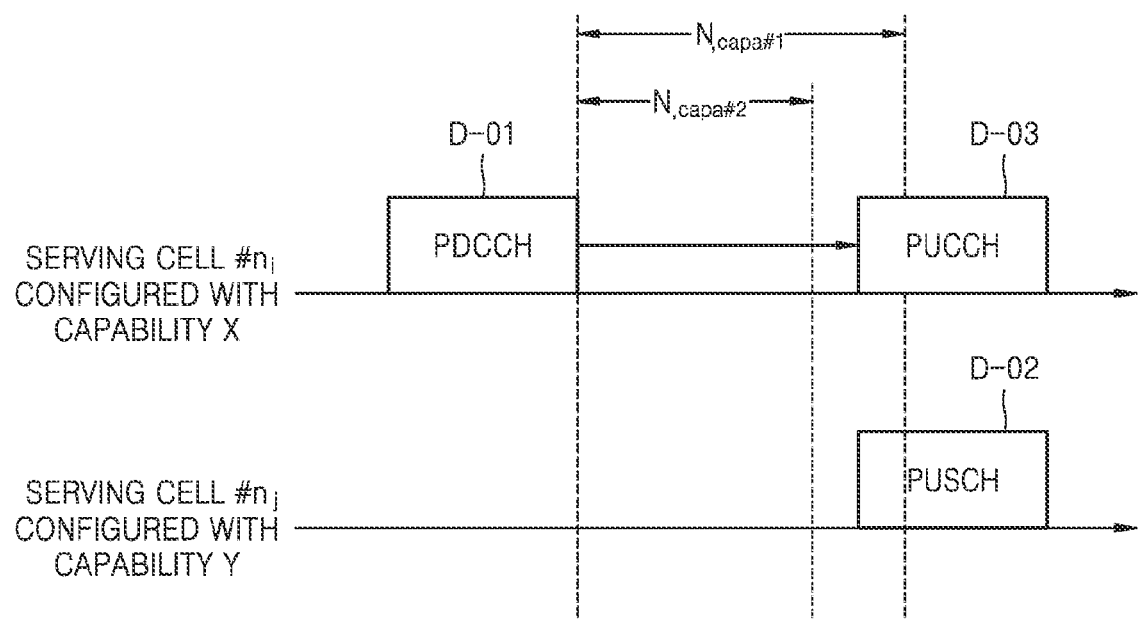
FIG. 20D is a diagram illustrating a method of determining a processing time of a terminal in a situation where a plurality of cells are configured, according to an embodiment of the present disclosure.

As illustrated in FIG. 20D, a plurality of serving cells $n_i$ and $n_j$ may be configured for a terminal by a BS, and different processing capabilities X and Y may be configured for the respective serving cells. The terminal may receive a PDCCH D-01 including an SPS release command in the serving cell $n_i$, and transmit a HARQ-ACK with respect thereto after N symbols. The 'HARQ-ACK with respect to the SPS release command' may be transmitted through a 'PUSCH D-02 scheduled through another DCI or configured through ConfiguredGrantConfig' for a reason, e.g., that a 'PUCCH resource D-03 for transmitting the HARQ-ACK with respect to the SPS release command' overlaps the PUSCH D-02 on the time axis. Assuming that the terminal has processing capability 1, the PUSCH D-02 may not be transmitted, and, assuming that the terminal has processing capability 2, the PUSCH D-02 may be transmitted. Accordingly, a clear understanding between the BS and the terminal may be required regarding this aspect. According to an embodiment, FIG. 20D illustrates SPS release command HARQ-ACK 2.

Figure 20E:
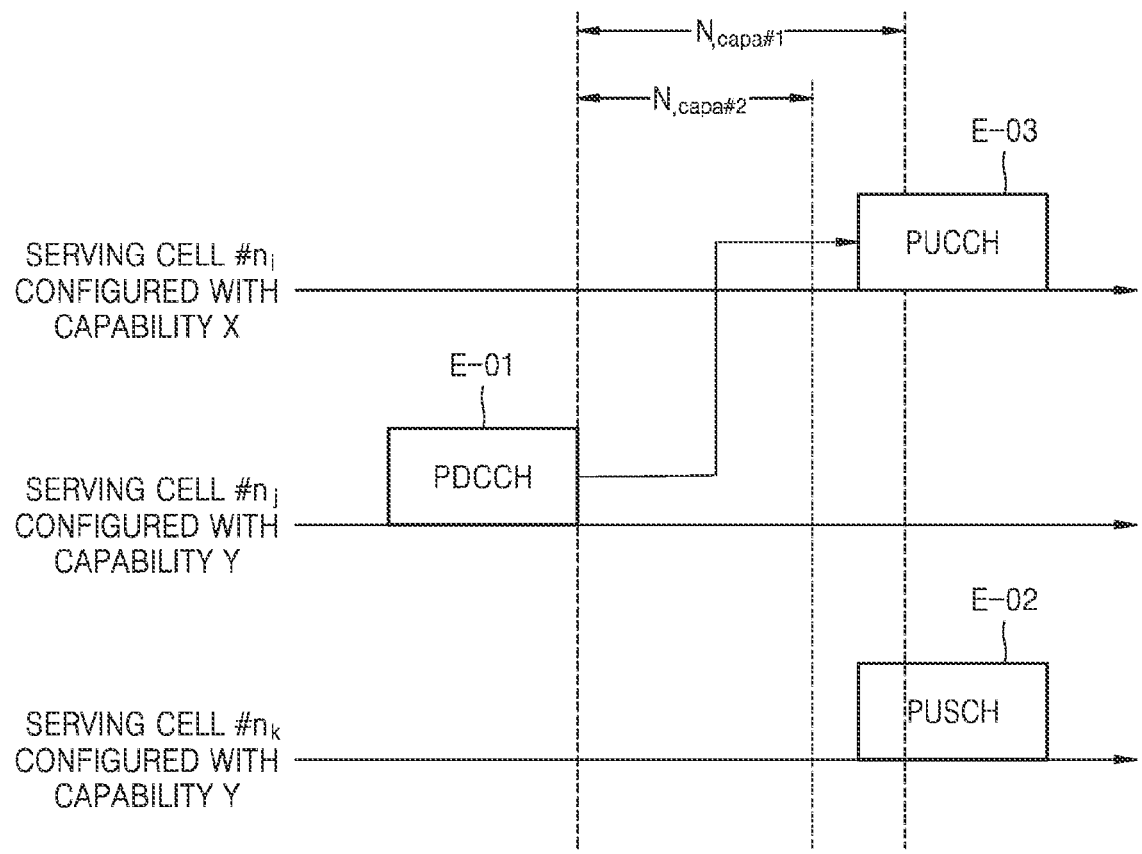
FIG. 20E is a diagram illustrating a method of determining a processing time of a terminal in a situation where a plurality of cells are configured, according to an embodiment of the present disclosure.

As illustrated in FIG. 20E, a plurality of serving cells $n_i$, $n_j$, and $n_k$ may be configured for a terminal by a BS, and different processing capabilities X and Y may be configured for the respective serving cells. The terminal may receive a PDCCH E-01 including an SPS release command in the serving cell $n_j$, and transmit a HARQ-ACK with respect thereto after N symbols. The 'HARQ-ACK with respect to the SPS release command' may be transmitted through a 'PUSCH E-02 scheduled through another DCI or configured through ConfiguredGrantConfig' for a reason, e.g., that a 'PUCCH resource E-03 for transmitting the HARQ-ACK with respect to the SPS release command' overlaps the PUSCH E-02 on the time axis. Assuming that the terminal has processing capability 1, the PUSCH E-02 may not be transmitted, and, assuming that the terminal has processing capability 2, the PUSCH E-02 may be transmitted. Accordingly, a clear understanding between the BS and the terminal may be required regarding this aspect. According to an embodiment, FIG. 20E illustrates SPS release command HARQ-ACK 3.

As described above with reference to FIGS. 20C, 20D, and 20E, the following embodiments are applicable to a situation in which the processing capabilities configured for a cell for transmitting a PDCCH and a cell for transmitting a HARQ-ACK with respect to an SPS PDSCH release are different from each other. The terminal and the BS operate by at least one of the following methods:

Method C-1: According to an embodiment, when the cell for transmitting a PDCCH and the cell for transmitting HARQ-ACK information with respect to an SPS PDSCH release are configured to have different processing capabilities, the terminal and the BS may determine N based on the processing capability associated with the cell for transmitting a PDCCH.

Method C-2: According to an embodiment, when the cell for transmitting a PDCCH and the cell for transmitting HARQ-ACK information with respect to an SPS PDSCH release are configured to have different processing capabilities, the terminal and the BS may determine N based on the processing capability associated with the cell for transmitting HARQ-ACK information.

Method C-3: According to an embodiment, when the cell for transmitting a PDCCH and the cell for transmitting HARQ-ACK information with respect to an SPS PDSCH release are configured to have different processing capabilities, N (or $T_{proc,2}$) may be calculated or set based on a particular processing capability, e.g., processing capability 1.

Method C-4: According to an embodiment, when the cell for transmitting a PDCCH and the cell for transmitting HARQ-ACK information with respect to an SPS PDSCH release are configured to have different processing capabilities, N (or $T_{proc,2}$) may be calculated or set based on a particular processing capability, e.g., processing capability 2.

Method C-5: The terminal does not expect that the cell for transmitting a PDCCH and the cell for transmitting HARQ-ACK information with respect to an SPS PDSCH release are configured to have different processing capabilities. When such a situation occurs, the terminal regards this as an error case.

Alternatively, the terminal may operate with at least one option in Table CC below. The BS may understand that the terminal operates with the at least one option in Table CC and operate according thereto.

TABLE CC 10.2  PDCCH validation for DL SPS and UL grant Type 2
A UE validates, for scheduling activation or scheduling release, a DL SPS assignment PDCCH or configured UL grant Type 2 PDCCH if
- the CRC of a corresponding DCI format is scrambled with a CS-RNTI provided by cs-RNTI, and
- the new data indicator field for the enabled transport block is set to '0'.
Validation of the DCI format is achieved if all fields for the DCI format are set according to Table 10.2-1 or Table 10.2-2.
If validation is achieved, the UE considers the information in the DCI format as a valid activation or valid release of DL SPS or configured UL grant Type 2. If validation is not achieved, the UE discards all the information in the DCI format.

Table 10.2-1: Special fields for DL SPS and UL grant Type 2 scheduling activation PDCCH validation

|  | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block: set to '00' |

Table 10.2-2: Special fields for DL SPS and UL grant Type 2 scheduling release PDCCH validation

|  | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |
| Frequency domain resource assignment | set to all '1's | set to all '1's |

TABLE CC-continued

A UE is expected to provide HARQ-ACK information in response to a SPS PDSCH release
after N symbols from the last symbol of a PDCCH providing the SPS PDSCH release. If
processingType2Enabled of PDSCH-ServingCellConfig is set to enable for the serving cell
with the PDCCH providing the SPS PDSCH release, N = 5 for $\mu$ = 0, N = 5.5 for $\mu$ = 1,
and N = 11 for $\mu$ = 2, otherwise, N = 10 for $\mu$ = 0, N = 12 for $\mu$ = 1, N = 22 for
$\mu$ = 2, and N = 25 for $\mu$ = 3, wherein $\mu$ corresponds to the smallest SCS configuration
between the SCS configuration of the PDCCH providing the SPS PDSCH release and the SCS
configuration of a PUCCH carrying the HARQ-ACK information in response to a SPS
PDSCH release.
For a cell for PDCCH providing the SPS PDSCH release and a cell for PUCCH
transmission carrying the HARQ-ACK information in response to a SPS PDSCH release
are different,
- (Option c-1) If a cell for PDCCH providing the SPS PDSCH release and a cell for
  PUCCH transmission carrying the HARQ-ACK information in response to a SPS
  PDSCH release are configured to have different processing time capabilities, a UE
  assumes to follow N = 5 for $\mu$ = 0, N = 5.5 for $\mu$ = 1, and N = 11 for $\mu$ =
  2.
- (Option c-2) If a cell for PDCCH providing the SPS PDSCH release and a cell for
  PUCCH transmission carrying the HARQ-ACK information in response to a SPS
  PDSCH release are configured to have different processing time capabilities, a UE
  assumes to follow N = 10 for $\mu$ = 0, N = 12 for $\mu$ = 1, N = 22 for $\mu$ = 2,
  and N = 25 for $\mu$ = 3.
- (Option c-3) If a cell for PDCCH providing the SPS PDSCH release and a cell for
  PUCCH transmission carrying the HARQ-ACK information in response to a SPS
  PDSCH release are configured to have different processing time capabilities, a UE
  assumes to follow N = 5 for $\mu$ = 0, N = 5.5 for $\mu$ = 1, and N = 11 for $\mu$ =
  2.
- (option c-4) A UE does not expect that a cell for PDCCH providing the SPS PDSCH
  release and a cell for PUCCH transmission carrying the HARQ-ACK information
  in response to a SPS PDSCH release are configured to have different processing
  time capabilities.

When the terminal detects first DCI indicating a 'first PUCCH transmission resource' for transmission of HARQ-ACK in slot n and subsequently detects second DCI indicating a 'second PUCCH transmission resource' for transmission of HARQ-ACK in slot n, and a 'timing of reception of a PDCCH on which the second DCI is transmitted' is not earlier than $N_3 \cdot (2048+144) \cdot \kappa \cdot 2^{-\mu} \cdot T_C$ from the 'beginning of the first symbol of the first PUCCH transmission resource', the terminal may not multiplex the 'HARQ-ACK information corresponding to the second DCI'. $\kappa$ may be equal to 64, which is a value obtained by dividing $T_s$ by $T_c$, and $T_s$ may be equal to $1/(\Delta f_{ref} \cdot N_{f,ref})$. Here, $\Delta f_{ref}$ may be $10 \cdot 10^3$ Hz, and $N_{f,ref}$ may be equal to 2048. $T_c$ may be equal to $1/(\Delta f_{max} \cdot N_f)$, where $\Delta f_{max}$ may be $480 \cdot 10^3$ Hz and $N_f$ may be equal to 4096. $\mu$ may correspond to the smallest value among the SCS configuration of the PDCCH providing the DCI and the SCS configuration of the PUCCH. $N_3$ may be determined by $\mu$ and processingType2Enabled in PDSCH-ServingCellConfig as shown in Table 15.

Figure 20F:
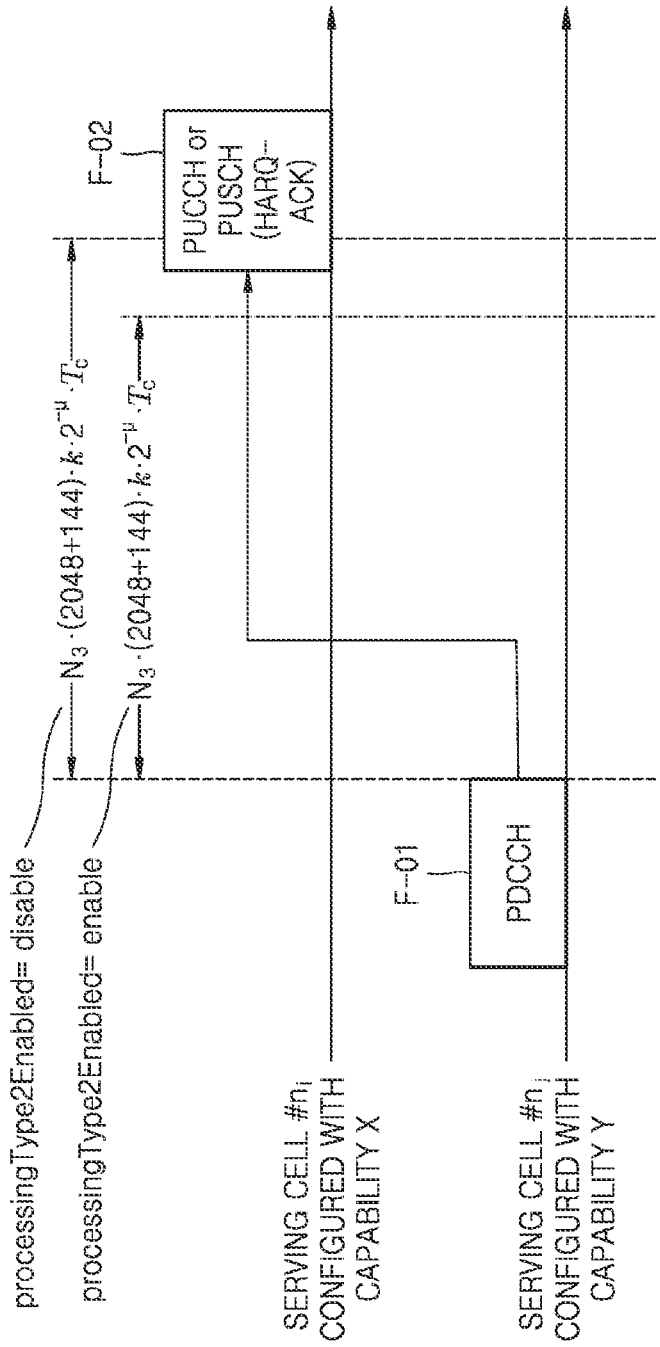
FIG. 20F is a diagram illustrating a method of determining a processing time of a terminal in a situation where a plurality of cells are configured, according to an embodiment of the present disclosure.

As illustrated in FIG. 20F, a plurality of serving cells $n_i$ and $n_j$ may be configured for a terminal by a BS, and different processing capabilities X and Y may be configured for the respective serving cells. For example, the values of processingType2Enabled of PDSCH-ServingCellConfig configured for the serving cell $n_j$ and the serving cell $n_{j'}$, respectively, may be different from each other. The terminal may receive a PDCCH F-01 in the serving cell $n_j$ and determine whether to multiplex a HARQ-ACK for a PDSCH (not shown) indicated by the PDCCH F-01 and transmit the multiplexed HARQ-ACK to a PUCCH/PUSCH F-02. Assuming processing capability 1 (i.e., assuming that processingType2Enabled is 'disable'), the terminal may not multiplex the HARQ-ACK for the PDSCH to the PUCCH/PUSCH F-02, and, assuming processing capability 2 (i.e., assuming that processingType2Enabled is 'enable'), the terminal may multiplex the HARQ-ACK with respect to the PDSCH and transmit the multiplexed HARQ-ACK to the PUCCH/PUSCH F-02. Accordingly, a clear understanding between the BS and the terminal may be required regarding this aspect. According to an embodiment, FIG. 20F illustrated a reporting HARQ-ACK.

The following embodiments are applicable to a situation in which at least one of the processing capabilities configured for cells for transmitting respective PDCCHs and a cell for transmitting a HARQ-ACK is different from the others. The terminal and the BS operate by at least one of the following methods:

Method D-1: According to an embodiment, when a cell for transmitting a PDCCH and a cell for transmitting HARQ-ACK information are configured to have different processing capabilities, the terminal and the BS may determine $N_3$ based on the processing capability associated with the cell for transmitting a PDCCH.

Method D-2: According to an embodiment, when the cell for transmitting a PDCCH and the cell for transmitting HARQ-ACK information are configured to have different processing capabilities, the terminal and the BS may determine $N_3$ based on the processing capability associated with the cell for transmitting HARQ-ACK information.

Method D-3: According to an embodiment, when the values of processingType2Enabled of PDSCH-ServingCellConfig configured for the cell for transmitting a PDCCH and the cell for transmitting HARQ-ACK information, respectively, are different from each other, the terminal and the BS may determine $N_3$ based on the value of processingType2Enabled of PDSCH-ServingCellConfig configured for the cell for transmitting a PDCCH.

Method D-4: According to an embodiment, when the values of processingType2Enabled of PDSCH-ServingCellConfig configured for the cell for transmitting a PDCCH and the cell for transmitting HARQ-ACK information, respectively, are different from each other, the terminal and the BS may determine $N_3$ based on the value of processingType2Enabled of PDSCH-ServingCellConfig configured for the cell for transmitting HARQ-ACK information.

Method D-5: According to an embodiment, when the cell for transmitting a PDCCH and the cell for transmitting HARQ-ACK information are configured to have different processing capabilities, $N_3$ may be calculated or set based on a particular processing capability, e.g., processing capability 1.

Method D-6: According to an embodiment, when the cell for transmitting a PDCCH and the cell for transmitting HARQ-ACK information are configured to have different processing capabilities, $N_3$ may be calculated or set based on a particular processing capability, e.g., processing capability 2.

Method D-7: The terminal does not expect that the cell for transmitting a PDCCH and the cell for transmitting HARQ-ACK information are configured to have different processing capabilities. When such a situation occurs, the terminal regards this as an error case.

Alternatively, the terminal may operate with at least one option in Table DD below. The BS may understand that the terminal operates with the at least one option in Table DD and operate according thereto.

information of the PUSCH, or a semi persistent scheduling (SPS) release command, the PUCCH may include at least one of hybrid automatic repeat request-acknowledgement (HARQ-ACK) feedback information regarding reception of the PDSCH or HARQ-ACK feedback information regarding reception of the PDCCH, and the PUSCH may include at least one of uplink data scheduled by the PDCCH or HARQ-ACK feedback information regarding reception of the PDSCH.

According to an embodiment, the determining of the time interval related to the timing at which the PUCCH or the PUSCH is transmitted may include determining, based on a processing capability of the first serving cell, a first time interval related to the timing at which the PUCCH or the PUSCH is transmitted in the second serving cell, from the last timing at which the PDSCH or the PDCCH is received in the first serving cell.

According to an embodiment, the determining of the time interval related to the timing at which the PUCCH or the PUSCH is transmitted may include determining, based on a processing capability of the second serving cell, a second time interval related to the timing at which the PUCCH or the PUSCH is transmitted in the second serving cell, from

TABLE DD

If a UE detects a first DCI format 1_0 or DCI for 1_1 indicating a first resource for a PUCCH transmission with corresponding HARQ-ACK information in a slot and also detects at a later time a second DCI format 1_0 or DCI format 1_1 indicating a second resource for a PUCCH transmission with corresponding HARQ-ACK information in the slot, the UE does not expect to multiplex HARQ-ACK information corresponding to the second DCI format in a PUCCH resource in the slot if the PDCCH reception that includes the second DCI format is not earlier than
$N_3 \cdot (2048 + 144) \cdot \kappa \cdot 2^{-\mu} \cdot T_c$ from the beginning of a first symbol of the first resource for PUCCH transmission in the slot where, $\kappa$ and $T_c$ are defined in subclause 4.1 of [4. TS 38.211] and $\mu$ corresponds to the smallest SCS configuration among the SCS configurations of the PDCCHs providing the DCI formats and the SCS configuration of the PUCCH. If processingType2Enabled of PDSCH-ServingCellConfig is set to enable for the serving cell with the second DCI format and for all serving cells with corresponding HARQ-ACK information multiplexed in the PUCCH transmission in the slot, $N_3 = 3$ for $\mu = 0$, $N_3 = 4.5$ for $\mu = 1$, $N_3 = 9$ for $\mu = 2$; otherwise, $N_3 = 8$ for $\mu = 0$, $N_3 = 10$ for $\mu = 1$, $N_3 = 17$ for $\mu = 2$, $N_3 = 20$ for $\mu = 3$.
For a case that at least two cells among cells of PDCCHs providing the DCI formats and a cell of PUCCH are configured to have different processing time capabilities,
- (option d-1) UE assumes to follows $N_3 = 3$ for $\mu = 0$, $N_3 = 4.5$ for $\mu = 1$, $N_3 = 9$ for $\mu = 2$
- (option d-2) UE assumes to follows $N_3 = 8$ for $\mu = 0$, $N_3 = 10$ for $\mu = 1$, $N_3 = 17$ for $\mu = 2$, $N_3 = 20$ for $\mu = 3$
- (option d-3) UE does not expext that cells of PDCCHs providing the DCI formats and a cell of PUCCH are configured to have different processing time capabilities.

According to an embodiment of the present disclosure, a method performed by a terminal in a wireless communication system may comprise receiving a physical downlink shared channel (PDSCH) or a physical downlink control channel (PDCCH) from a first serving cell among a plurality of serving cells configured for the terminal, the plurality of serving cells including the first serving cell and a second serving cell for transmitting a physical uplink control channel (PUCCH) or a physical uplink shared channel (PUSCH), in case that different processing capabilities are configured for each of the plurality of serving cells, determining a time interval related to a timing at which the PUCCH or the PUSCH is transmitted in the second serving cell, from a last timing at which the PDSCH or the PDCCH is received in the first serving cell, and transmitting the PUCCH or the PUSCH to a base station based on the determined time interval.

According to an embodiment, the PDCCH may include at least one of information indicating the PDSCH, scheduling the last timing at which the PDSCH or the PDCCH is received in the first serving cell.

According to an embodiment, the determining of the time interval related to the timing at which the PUCCH or the PUSCH is transmitted may include determining, based on a predetermined processing capability, a third time interval related to the timing at which the PUCCH or the PUSCH is transmitted in the second serving cell, from the last timing at which the PDSCH or the PDCCH is received in the first serving cell.

According to an embodiment, the transmitting of the PUCCH or the PUSCH to the base station based on the determined time interval may include transmitting the PUCCH or the PUSCH to the base station after the determined time interval from the last timing at which the PDSCH or the PDCCH is received in the first serving cell.

According to an embodiment, in case that the processing capabilities are PDSCH processing capabilities of the terminal, the time interval indicates a time interval between the last timing at which the PDSCH is received and a timing at which the PUCCH including HARQ-ACK feedback information with respect to the PDSCH is transmitted, and in case that the processing capabilities are PUSCH timing capabilities of the terminal, the time interval indicates a time interval between the last timing at which the PDCCH is received and a timing at which the PUSCH including uplink data scheduled by the PDCCH is transmitted.

According to an embodiment, in case that the PDCCH includes the SPS release command, the time interval may indicate a time interval between the last timing at which the PDCCH is received and a timing at which at least one of the PUCCH or the PUSCH is transmitted, and at least one of the PUCCH or the PUSCH may include HARQ-ACK feedback information for the PDCCH including the SPS release command.

According to an embodiment, in case that the PDCCH includes the information indicating the PDSCH, the time interval may indicate a time interval between a timing at which the PDCCH is received and a timing at which at least one of the PUCCH or the PUSCH is transmitted, and at least one of the PUCCH or the PUSCH may include HARQ-ACK feedback information for the PDSCH indicated by the PDCCH.

According to an embodiment of the present disclosure, a terminal in a wireless communication system may include a transceiver, and at least one processor configured to receive a physical downlink shared channel (PDSCH) or a physical downlink control channel (PDCCH) from a first serving cell among a plurality of serving cells configured for the terminal, the plurality of serving cells including the first serving cell and a second serving cell for transmitting a physical uplink control channel (PUCCH) or a physical uplink shared channel (PUSCH), in case that different processing capabilities are configured for each of the plurality of serving cells, determine a time interval related to a timing at which the PUCCH or the PUSCH is transmitted in the second serving cell, from a last timing at which the PDSCH or the PDCCH is received in the first serving cell, and, and transmit the PUCCH or the PUSCH to a base station by using the transceiver, based on the determined time interval.

According to an embodiment, the PDCCH may include at least one of information indicating the PDSCH, scheduling information of the PUSCH, or a semi persistent scheduling (SPS) release command, the PUCCH may include at least one of hybrid automatic repeat request acknowledgement (HARQ-ACK) feedback information regarding reception of the PDSCH or HARQ-ACK feedback information regarding reception of the PDCCH, and the PUSCH may include at least one of uplink data scheduled by the PDCCH or HARQ-ACK feedback information regarding reception of the PDSCH.

According to an embodiment, the at least one processor may be further configured to determine, based on at least one of a processing capability of the first serving cell, a processing capability of the second serving cell, or a predetermined processing capability, a first time interval related to the timing at which the PUCCH or the PUSCH is transmitted in the second serving cell, from the last timing at which the PDSCH or the PDCCH is received in the first serving cell.

According to an embodiment, in case that the processing capabilities are PDSCH processing capabilities of the terminal, the time interval indicates a time interval between the last timing at which the PDSCH is received and a timing at which the PUCCH including HARQ-ACK feedback information with respect to the PDSCH is transmitted, and in case that the processing capabilities are PUSCH timing capabilities of the terminal, the time interval indicates a time interval between the last timing at which the PDCCH is received and a timing at which the PUSCH including uplink data scheduled by the PDCCH is transmitted.

According to an embodiment, in case that the PDCCH includes the SPS release command, the time interval may indicate a time interval between the last timing at which the PDCCH is received and a timing at which at least one of the PUCCH or the PUSCH is transmitted, and at least one of the PUCCH or the PUSCH may include HARQ-ACK feedback information for the PDCCH including the SPS release command.

According to an embodiment, in case that the PDCCH includes the information indicating the PDSCH, the time interval may indicate a time interval between a timing at which the PDCCH is received and a timing at which at least one of the PUCCH or the PUSCH is transmitted, and at least one of the PUCCH or the PUSCH may include HARQ-ACK feedback information for the PDSCH indicated by the PDCCH.

Figure 21:
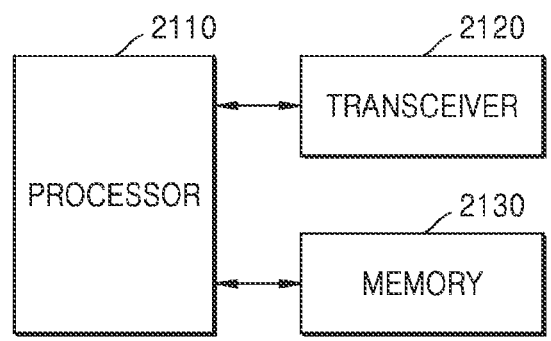
FIG. 21 is a block diagram of a terminal according to an embodiment of the present disclosure.
Figure 22:
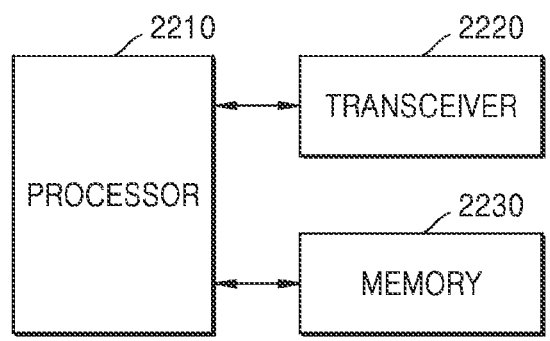
FIG. 22 is a block diagram of a base station according to an embodiment of the present disclosure.

FIGS. 21 and 22 illustrate transmitters, receivers, and processors of a terminal and a BS for performing the embodiments of the present disclosure, respectively. In order to calculate an actual data rate and perform a transmission/reception method in the first embodiment or the second embodiment, the receivers, the processors, and the transmitters of the BS and the terminal may operate according to the above-described embodiment.

FIG. 21 is a block diagram of a terminal according to an embodiment.

As illustrated in FIG. 21, the terminal of the present disclosure may include a processor 2110, a transceiver 2120, and a memory 2130. The transceiver 2120 may include a receiver and a transmitter. The transceiver 2120 may transmit and receive signals to and from a BS. Here, the signal may include control information and data. To this end, the transceiver 2120 may include an RF transmitter for up-converting and amplifying a frequency of a signal being transmitted, and an RF receiver for low-noise-amplifying a received signal and down-converting a frequency of the received signal.

Also, the transceiver 2120 may receive a signal through a radio channel and output the signal to the processor 2110, and may transmit a signal output from the processor 2110 through a radio channel.

The processor 2110 may control a series of operations to allow the terminal to operate according to the above-described embodiments of the present disclosure. For example, components of the terminal may be controlled to perform the method of determining a processing time of a terminal in a wireless communication system according to an embodiment of the present disclosure. For example, the transceiver 2120 may receive data and control information including scheduling information for data transmission from the BS. In an embodiment, the processor 2110 may determine a UL control channel and a signal resource based on the above-described control information, and perform signal processing according thereto. Thereafter, the transceiver 2120 may transmit, to the BS, signals required to be transmitted.

FIG. 22 is a block diagram of a BS according to an embodiment.

As illustrated in FIG. 22, the BS of the present disclosure may include a processor 2210, a transceiver 2220, and a memory 2230. The transceiver 2220 may include a receiver and a transmitter. The transceiver may transmit and receive signals to and from a terminal. Here, the signal may include control information and data. To this end, the transceiver 2220 may include an RF transmitter for up-converting and amplifying a frequency of a signal being transmitted, and an RF receiver for low-noise-amplifying a received signal and down-converting a frequency of the received signal. Also, the transceiver 2220 may receive a signal through a radio channel and output the signal to the processor 2210, and may transmit a signal output from the processor 2210 through a radio channel.

The processor 2210 may control a series of operations to allow the BS to operate according to the above-described embodiments of the present disclosure. For example, components of the BS may be controlled to perform the method of determining a processing time of a terminal in a wireless communication system according to an embodiment of the present disclosure. For example, the processor 2210 according to an embodiment may generate control information by using at least some of pieces of information such as the processing time of the terminal, the radio resource scheduling status, etc.

Thereafter, the transceiver 2220 may transmit the generated control information or receive feedback or a UL data signal from the terminal.

Methods according to claims or embodiments described in the specification of the present disclosure may be implemented in hardware, software, or a combination of hardware and software.

When implemented in software, a computer-readable storage medium or a computer program product storing one or more programs (software modules) may be provided. The one or more programs stored in the computer-readable storage medium or computer program product are configured for execution by one or more processors in an electronic device. The one or more programs include instructions that cause the electronic device to execute the methods according to the embodiments described in claims or the specification of the present disclosure.

The programs (e.g., software modules or software) may be stored in non-volatile memory including random-access memory (RAM) or flash memory, read-only memory (ROM), electrically erasable programmable ROM (EEPROM), a magnetic disc storage device, a compact disc-ROM (CD-ROM), a digital versatile disc (DVD) or other optical storage device, or a magnetic cassette. Alternatively, the programs may be stored in memory including a combination of some or all of the above-mentioned storage media. In addition, a plurality of such memory units may be included.

Also, the programs may be stored in an attachable storage device accessible through any or a combination of communication networks such as the Internet, an intranet, a local area network (LAN), a wide LAN (WLAN), or a storage area network (SAN). The storage device may access, via an external port, a device for performing an embodiment of the present disclosure. Furthermore, a separate storage device on a communication network may access the device for performing an embodiment of the present disclosure.

In the present disclosure, the term "computer program product" or "computer-readable recording medium" is used to generally refer to a medium such as memory, a hard disc installed in a hard disc drive, or a signal. The "computer program product" or the "computer-readable recording medium" is for providing the method of determining a processing time of a terminal according to the present disclosure.

In the embodiments of the present disclosure described above, the elements included in the present disclosure have been expressed in the singular or plural form according to the suggested embodiments of the present disclosure. However, the expression in the singular or plural form is appropriately selected according to the suggested situations for convenience of explanation and is not intended to limit the present disclosure to the single or plural elements, and even when a certain element is expressed in the plural form, it may be provided with a single element, and even when a certain element is expressed in the singular form, it may be provided with a plurality of elements.

Meanwhile, the embodiments of the present disclosure disclosed in the present specification and the drawings are only particular examples for clearly describing the technical aspects of the present disclosure and helping understanding of the present disclosure, and are not intended to limit the scope of the present disclosure. That is, it would be obvious to one of skill in the art that other modifications based on the technical spirit of the present disclosure may be implemented. In addition, the above-described embodiments may be combined with one another and operated as necessary. For example, the first embodiment and the second embodiment may be combined with each other and applied, or part of the first embodiment and part of the second embodiment may be combined with each other and applied. Also, other modifications based on the technical spirit of the embodiments described herein may be applied to an LTE system, a 5G system, etc.

Although certain embodiments have been described in the detailed description of the present disclosure, various modifications may be made without departing from the scope of the present disclosure. Therefore, the scope of the present disclosure should not be limited to the above-described embodiments of the present disclosure and should be determined by the appended claims and the equivalents thereof.

The invention claimed is:

1. A method performed by a terminal in a wireless communication system, the method comprising:
receiving a physical downlink shared channel (PDSCH) or a physical downlink control channel (PDCCH) from a first serving cell among a plurality of serving cells configured for the terminal, the plurality of serving cells including the first serving cell and a second serving cell for transmitting a physical uplink control channel (PUCCH) or a physical uplink shared channel (PUSCH);
in case that different processing capabilities are configured for each of the plurality of serving cells, determining a minimum time interval for transmitting the PUCCH or the PUSCH in the second serving cell based on a last timing at which the PDSCH or the PDCCH is received in the first serving cell and one of a processing capability of the first serving cell, a processing capability of the second serving cell, or a predetermined processing capability; and
transmitting the PUCCH or the PUSCH to a base station, based on the determined time interval.

2. The method of claim 1, wherein:
the PDCCH includes at least one of information indicating the PDSCH, scheduling information of the PUSCH, or a semi persistent scheduling (SPS) release command,
the PUCCH includes at least one of hybrid automatic repeat request-acknowledgement (HARQ-ACK) feedback information regarding reception of the PDSCH or HARQ-ACK feedback information regarding reception of the PDCCH, and the PUSCH includes at least one of uplink data scheduled by the PDCCH or HARQ-ACK feedback information regarding reception of the PDSCH.

3. The method of claim 1, wherein transmitting the PUCCH or the PUSCH to the base station based on the determined time interval comprises:
transmitting the PUCCH or the PUSCH to the base station after the determined time interval from the last timing at which the PDSCH or the PDCCH is received in the first serving cell.

4. The method of claim 1, wherein:
in case that the processing capabilities are PDSCH processing capabilities of the terminal, the minimum time interval indicates a time interval between the last timing at which the PDSCH is received and a timing at which the PUCCH including HARQ-ACK feedback information with respect to the PDSCH is transmitted, and
in case that the processing capabilities are PUSCH timing capabilities of the terminal, the minimum time interval indicates a time interval between the last timing at which the PDCCH is received and a timing at which the PUSCH including uplink data scheduled by the PDCCH is transmitted.

5. The method of claim 1, wherein, in case that the PDCCH includes the SPS release command, the minimum time interval indicates a time interval between the last timing at which the PDCCH is received and a timing at which at least one of the PUCCH or the PUSCH is transmitted, and at least one of the PUCCH or the PUSCH includes HARQ-ACK feedback information for the PDCCH including the SPS release command.

6. The method of claim 1, wherein, in case that the PDCCH includes the information indicating the PDSCH, the minimum time interval indicates a time interval between a timing at which the PDCCH is received and a timing at which at least one of the PUCCH or the PUSCH is transmitted, and at least one of the PUCCH or the PUSCH comprises HARQ-ACK feedback information for the PDSCH indicated by the PDCCH.

7. A terminal in a wireless communication system, the terminal comprising:
a transceiver; and
at least one processor configured to:
receive a physical downlink shared channel (PDSCH) or a physical downlink control channel (PDCCH) from a first serving cell among a plurality of serving cells configured for the terminal, the plurality of serving cells including the first serving cell and a second serving cell for transmitting a physical uplink control channel (PUCCH) or a physical uplink shared channel (PUSCH),
in case that different processing capabilities are configured for each of the plurality of serving cells, determine a minimum time interval for transmitting the PUCCH or the PUSCH in the second serving cell based on last timing at which the PDSCH or the PDCCH is received in the first serving cell and one of a processing capability of the first serving cell, a processing capability of the second serving cell, or a predetermined processing capability, and
transmit the PUCCH or the PUSCH to a base station by using the transceiver, based on the determined time interval.

8. The terminal of claim 7, wherein:
the PDCCH includes at least one of information indicating the PDSCH, scheduling information of the PUSCH, or a semi persistent scheduling (SPS) release command,
the PUCCH includes at least one of hybrid automatic repeat request-acknowledgement (HARQ-ACK) feedback information regarding reception of the PDSCH or HARQ-ACK feedback information regarding reception of the PDCCH, and
the PUSCH includes at least one of uplink data scheduled by the PDCCH or HARQ-ACK feedback information regarding reception of the PDSCH.

9. The terminal of claim 7, wherein:
in case that the processing capabilities are PDSCH processing capabilities of the terminal, the minimum time interval indicates a time interval between the last timing at which the PDSCH is received and a timing at which the PUCCH including HARQ-ACK feedback information with respect to the PDSCH is transmitted, and
in case that the processing capabilities are PUSCH timing capabilities of the terminal, the minimum time interval indicates a time interval between the last timing at which the PDCCH is received and a timing at which the PUSCH including uplink data scheduled by the PDCCH is transmitted.

10. The terminal of claim 7, wherein, in case that the PDCCH includes the SPS release command, the minimum time interval indicates a time interval between the last timing at which the PDCCH is received and a timing at which at least one of the PUCCH or the PUSCH is transmitted, and at least one of the PUCCH or the PUSCH includes HARQ-ACK feedback information for the PDCCH including the SPS release command.

11. The terminal of claim 7, wherein, in case that the PDCCH includes the information indicating the PDSCH, the minimum time interval indicates a time interval between a timing at which the PDCCH is received and a timing at which at least one of the PUCCH or the PUSCH is transmitted, and at least one of the PUCCH or the PUSCH comprises HARQ-ACK feedback information for the PDSCH indicated by the PDCCH.

* * * * *